United States Patent
Ellis et al.

(10) Patent No.: US 12,530,670 B1
(45) Date of Patent: *Jan. 20, 2026

(54) MOBILE WALLET CARD CONTROL

(71) Applicant: Wells Fargo Bank, N.A., San Francisco, CA (US)

(72) Inventors: Stephen M. Ellis, Tahoe City, CA (US); Ashish B. Kurani, Hillsborough, CA (US); Steven E. Puffer, Champlin, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 533 days.

This patent is subject to a terminal disclaimer.

(21) Appl. No.: 17/991,787

(22) Filed: Nov. 21, 2022

Related U.S. Application Data

(63) Continuation of application No. 15/604,370, filed on May 24, 2017, now Pat. No. 11,507,935.
(Continued)

(51) Int. Cl.
G06Q 20/32 (2012.01)
G06Q 20/22 (2012.01)
(Continued)

(52) U.S. Cl.
CPC ......... *G06Q 20/325* (2013.01); *G06Q 20/223* (2013.01); *G06Q 20/322* (2013.01);
(Continued)

(58) Field of Classification Search
CPC ........ G06Q 40/00; G06Q 40/02; G06Q 20/10; G06Q 20/102; G06Q 20/40; G06Q 20/105; G06Q 20/108
(Continued)

(56) References Cited

U.S. PATENT DOCUMENTS 6,014,645 A 1/2000 Cunningham
6,324,524 B1 11/2001 Lent et al.
(Continued)

FOREIGN PATENT DOCUMENTS

KR 20130093233 A 8/2013
WO WO-2013/044175 A1 3/2013

OTHER PUBLICATIONS

Aljohani, A. (2014). A unified mobile payment transaction exchange service (UMTES) for next-generation mobile networks. Available from ProQuest Dissertations and Theses Professional. (1913431587). Retrieved from https://dialog.proquest.com/professional/docview/1913431587?accountid= 131444. Year 2014.
(Continued)

*Primary Examiner* — Hani M Kazimi
(74) *Attorney, Agent, or Firm* — Foley & Lardner LLP

(57) ABSTRACT

A mobile device comprising a processor and a memory coupled to the processor, the memory having a client application, the client application including instructions executable by the processor that are structured to cause the processor to receive a user input to access the client application; identify a first transaction card and a second transaction card held by the user, wherein the first transaction card is activated and the second transaction card is deactivated; present an interface to the user including a first depiction of the first transaction card and a second depiction of the second transaction card, wherein the second depiction includes a contrasting aspect relative to the first depiction; and receive an input to activate the second transaction card thereby (i) tokenizing the second transaction card and (ii) reducing or removing the contrasting aspect of the second depiction to indicate an activation of the second transaction card.

20 Claims, 17 Drawing Sheets

Related U.S. Application Data

(60) Provisional application No. 62/458,937, filed on Feb. 14, 2017.

(51) Int. Cl.
*G06Q 20/36* (2012.01)
*G06Q 20/40* (2012.01)

(52) U.S. Cl.
CPC .......... *G06Q 20/326* (2020.05); *G06Q 20/36* (2013.01); *G06Q 20/3672* (2013.01); *G06Q 20/3676* (2013.01); *G06Q 20/4012* (2013.01)

(58) Field of Classification Search
USPC ...................................................... 705/39–42
See application file for complete search history.

(56) References Cited

U.S. PATENT DOCUMENTS

| | | |
|---|---|---|
| 6,795,812 B1 | 9/2004 | Lent et al. |
| 6,980,969 B1 | 12/2005 | Tuchler et al. |
| 7,155,411 B1 | 12/2006 | Blinn et al. |
| 7,200,577 B2 | 4/2007 | Zissimopoulos et al. |
| 7,233,926 B2 | 6/2007 | Durand et al. |
| 7,366,694 B2 | 4/2008 | Lazerson |
| 7,469,151 B2 | 12/2008 | Khan et al. |
| 7,472,088 B2 | 12/2008 | Taylor et al. |
| 7,512,565 B2 | 3/2009 | Li |
| 7,657,489 B2 | 2/2010 | Stambaugh |
| 7,698,712 B2 | 4/2010 | Schreter |
| 7,784,684 B2 | 8/2010 | Labrou et al. |
| 7,802,719 B2 | 9/2010 | Johnson et al. |
| 7,822,688 B2 | 10/2010 | Labrou et al. |
| 7,849,003 B2 | 12/2010 | Egnatios et al. |
| 7,899,438 B2 | 3/2011 | Baker et al. |
| 7,926,711 B2 | 4/2011 | Taylor et al. |
| 7,930,244 B2 | 4/2011 | Zarin et al. |
| 8,016,192 B2 | 9/2011 | Messerges et al. |
| 8,027,914 B2 | 9/2011 | White et al. |
| 8,060,413 B2 | 11/2011 | Castell et al. |
| 8,078,140 B2 | 12/2011 | Baker et al. |
| 8,170,952 B2 | 5/2012 | White et al. |
| 8,175,923 B2 | 5/2012 | Gerken et al. |
| 8,175,967 B2 | 5/2012 | O'Leary et al. |
| 8,239,304 B1 | 8/2012 | Ahmad |
| 8,285,329 B1 | 10/2012 | Zhu |
| 8,429,047 B2 | 4/2013 | Hurst |
| 8,442,914 B2 | 5/2013 | Killian et al. |
| 8,467,766 B2 | 6/2013 | Rackley et al. |
| 8,468,576 B2 | 6/2013 | Doman et al. |
| 8,473,355 B2 | 6/2013 | Quigley et al. |
| 8,510,220 B2 | 8/2013 | Rackley et al. |
| 8,523,054 B2 | 9/2013 | Yankovich et al. |
| 8,533,031 B2 | 9/2013 | Lefebvre et al. |
| 8,561,172 B2 | 10/2013 | Buss et al. |
| 8,566,239 B2 | 10/2013 | Arthur et al. |
| 8,571,983 B1 | 10/2013 | Blackhurst et al. |
| 8,577,803 B2 | 11/2013 | Chatterjee et al. |
| 8,639,621 B1 | 1/2014 | Ellis et al. |
| 8,645,971 B2 | 2/2014 | Carlson et al. |
| 8,671,055 B2 | 3/2014 | Spodak et al. |
| 8,693,993 B2 | 4/2014 | Stifelman |
| 8,781,923 B2 | 7/2014 | Pitroda et al. |
| 8,788,333 B2 | 7/2014 | Alba et al. |
| 8,799,148 B2 | 8/2014 | Chandran |
| 8,825,872 B2 | 9/2014 | Reisman |
| 8,839,142 B2 | 9/2014 | Chaudhri et al. |
| 8,893,250 B2 | 11/2014 | Mattsson et al. |
| 8,903,737 B2 | 12/2014 | Cameron et al. |
| 8,918,338 B1 | 12/2014 | Bornhofen et al. |
| 8,919,658 B2 | 12/2014 | Diamond |
| 8,923,827 B2 | 12/2014 | Wentker et al. |
| 8,924,292 B1 | 12/2014 | Ellis et al. |
| 8,930,271 B1 | 1/2015 | Ellis et al. |
| 8,954,871 B2 | 2/2015 | Louch et al. |
| 9,015,066 B2 | 4/2015 | Scipioni et al. |
| 9,053,474 B2 | 6/2015 | White |
| 9,064,247 B2 | 6/2015 | Baer et al. |
| 9,064,281 B2 | 6/2015 | Ballard et al. |
| 9,087,428 B1 | 7/2015 | Velline et al. |
| 9,088,423 B2 | 7/2015 | Allen et al. |
| 9,092,776 B2 | 7/2015 | Dessert |
| 9,117,242 B1 | 8/2015 | Ellis et al. |
| 9,152,739 B2 | 10/2015 | Aasen et al. |
| 9,189,787 B1 | 11/2015 | Koh et al. |
| 9,208,488 B2 | 12/2015 | Liberty |
| 9,235,831 B2 | 1/2016 | Rolf |
| 9,235,839 B2 | 1/2016 | Dua |
| 9,256,871 B2 | 2/2016 | Anderson et al. |
| 9,280,765 B2 | 3/2016 | Hammad |
| 9,285,954 B2 | 3/2016 | Yang et al. |
| 9,317,849 B2 | 4/2016 | Pitroda et al. |
| 9,330,388 B2 | 5/2016 | Pitroda et al. |
| 9,355,393 B2 | 5/2016 | Purves et al. |
| 9,356,894 B2 | 5/2016 | Appelman et al. |
| 9,361,606 B2 | 6/2016 | Hertel et al. |
| 9,380,403 B2 | 6/2016 | Khan |
| 9,390,414 B2 | 7/2016 | Wall et al. |
| 9,406,011 B2 | 8/2016 | Bartenstein et al. |
| 9,406,065 B2 | 8/2016 | Bondesen et al. |
| 9,430,768 B2 | 8/2016 | Graylin et al. |
| 9,516,487 B2 | 12/2016 | Powell et al. |
| 9,524,500 B2 | 12/2016 | Dave et al. |
| 9,524,501 B2 | 12/2016 | Weber |
| 9,542,172 B2 | 1/2017 | Alsina et al. |
| 9,886,691 B2 | 2/2018 | Desai et al. |
| 10,114,534 B2 | 10/2018 | Kasterstein et al. |
| 10,255,625 B2 | 4/2019 | Liberty et al. |
| 10,262,320 B2 | 4/2019 | Moghadam |
| 10,296,907 B1 | 5/2019 | Nolte et al. |
| 10,839,376 B1 | 11/2020 | Kurani et al. |
| 2002/0016769 A1 | 2/2002 | Barbara et al. |
| 2002/0122076 A1 | 9/2002 | Nakaki |
| 2002/0156723 A1 | 10/2002 | Lilly et al. |
| 2003/0046222 A1 | 3/2003 | Bard et al. |
| 2003/0179237 A1 | 9/2003 | Nelson et al. |
| 2004/0111367 A1 | 6/2004 | Gallagher et al. |
| 2004/0117300 A1 | 6/2004 | Jones et al. |
| 2004/0267664 A1 | 12/2004 | Nam et al. |
| 2007/0300185 A1 | 12/2007 | Macbeth et al. |
| 2008/0006685 A1 | 1/2008 | Rackley, III et al. |
| 2008/0208741 A1 | 8/2008 | Arthur |
| 2010/0030651 A1 | 2/2010 | Matotek et al. |
| 2010/0076833 A1 | 3/2010 | Nelsen |
| 2010/0088188 A1 | 4/2010 | Kumar et al. |
| 2010/0114731 A1 | 5/2010 | Kingston et al. |
| 2010/0125495 A1 | 5/2010 | Smith et al. |
| 2012/0022944 A1 | 1/2012 | Volpi |
| 2012/0029674 A1 | 2/2012 | Hida |
| 2012/0036042 A1 | 2/2012 | Graylin et al. |
| 2012/0095852 A1 | 4/2012 | Bauer et al. |
| 2012/0116967 A1 | 5/2012 | Klein et al. |
| 2012/0136732 A1 | 5/2012 | Mcmillen et al. |
| 2012/0158584 A1 | 6/2012 | Behren et al. |
| 2012/0193434 A1 | 8/2012 | Grigg et al. |
| 2012/0197691 A1 | 8/2012 | Grigg et al. |
| 2012/0197794 A1 | 8/2012 | Grigg et al. |
| 2012/0234912 A1 | 9/2012 | Yankovich et al. |
| 2012/0239529 A1 | 9/2012 | Low et al. |
| 2012/0290376 A1 | 11/2012 | Dryer et al. |
| 2012/0290446 A1 | 11/2012 | England et al. |
| 2012/0290449 A1 | 11/2012 | Mullen et al. |
| 2012/0310826 A1 | 12/2012 | Chatterjee |
| 2013/0013499 A1 | 1/2013 | Kalgi |
| 2013/0024364 A1 | 1/2013 | Shrivastava et al. |
| 2013/0024371 A1 | 1/2013 | Hariramani et al. |
| 2013/0054336 A1 | 2/2013 | Graylin |
| 2013/0054470 A1 | 2/2013 | Campos et al. |
| 2013/0103685 A1 | 4/2013 | Preneel et al. |
| 2013/0124349 A1 | 5/2013 | Khan et al. |
| 2013/0159080 A1 | 6/2013 | Wu et al. |
| 2013/0159178 A1 | 6/2013 | Colon et al. |
| 2013/0173456 A1 | 7/2013 | Grigg et al. |
| 2013/0191278 A1 | 7/2013 | O'Leary et al. |

(56) References Cited

U.S. PATENT DOCUMENTS

| | | |
|---|---|---|
| 2013/0191397 A1 | 7/2013 | Avadhanam et al. |
| 2013/0246258 A1 | 9/2013 | Dessert |
| 2013/0246260 A1 | 9/2013 | Barten et al. |
| 2013/0254028 A1 | 9/2013 | Salci |
| 2013/0254102 A1 | 9/2013 | Royyuru |
| 2013/0268885 A1 | 10/2013 | Lim et al. |
| 2013/0317928 A1 | 11/2013 | Laracey |
| 2013/0332343 A1 | 12/2013 | Desai et al. |
| 2013/0339234 A1 | 12/2013 | Prakash et al. |
| 2014/0012751 A1 | 1/2014 | Kuhn et al. |
| 2014/0032394 A1 | 1/2014 | Liberty et al. |
| 2014/0040052 A1 | 2/2014 | Arthur et al. |
| 2014/0040127 A1 | 2/2014 | Chatterjee et al. |
| 2014/0040802 A1 | 2/2014 | Abanami et al. |
| 2014/0046784 A1 | 2/2014 | Prakash et al. |
| 2014/0052634 A1 | 2/2014 | Baron et al. |
| 2014/0074569 A1 | 3/2014 | Francis et al. |
| 2014/0074637 A1 | 3/2014 | Hammad |
| 2014/0089119 A1 | 3/2014 | Fahn et al. |
| 2014/0089185 A1 | 3/2014 | Desai et al. |
| 2014/0114706 A1 | 4/2014 | Blakely |
| 2014/0122097 A1 | 5/2014 | Taylor et al. |
| 2014/0122331 A1 | 5/2014 | Vaish et al. |
| 2014/0122563 A1 | 5/2014 | Singh et al. |
| 2014/0129435 A1 | 5/2014 | Pardo et al. |
| 2014/0143089 A1 | 5/2014 | Campos et al. |
| 2014/0200983 A1 | 7/2014 | Bacastow et al. |
| 2014/0207680 A1 | 7/2014 | Rephlo |
| 2014/0222597 A1 | 8/2014 | Nadella et al. |
| 2014/0222670 A1 | 8/2014 | Concannon |
| 2014/0244462 A1 | 8/2014 | Maenpaa et al. |
| 2014/0244480 A1 | 8/2014 | Kanjlia et al. |
| 2014/0244495 A1 | 8/2014 | Davis et al. |
| 2014/0279566 A1 | 9/2014 | Verma et al. |
| 2014/0282971 A1 | 9/2014 | Gustavson et al. |
| 2014/0310151 A1 | 10/2014 | Shishkov et al. |
| 2014/0324690 A1 | 10/2014 | Allen et al. |
| 2014/0337222 A1 | 11/2014 | Damola et al. |
| 2014/0344153 A1 | 11/2014 | Raj et al. |
| 2014/0351147 A1 | 11/2014 | Castrechini et al. |
| 2014/0372299 A1 | 12/2014 | Singh et al. |
| 2014/0372300 A1 | 12/2014 | Blythe |
| 2015/0006271 A1 | 1/2015 | Oppenheim et al. |
| 2015/0012425 A1 | 1/2015 | Mathew |
| 2015/0019313 A1 | 1/2015 | Alba et al. |
| 2015/0019421 A1 | 1/2015 | Low et al. |
| 2015/0026024 A1 | 1/2015 | Calman et al. |
| 2015/0026049 A1 | 1/2015 | Theurer et al. |
| 2015/0058213 A1 | 2/2015 | Lee Kim-Koon et al. |
| 2015/0066688 A1 | 3/2015 | Blackhurst et al. |
| 2015/0066691 A1 | 3/2015 | Ready et al. |
| 2015/0073983 A1 | 3/2015 | Bartenstein et al. |
| 2015/0081540 A1 | 3/2015 | Grigg et al. |
| 2015/0088631 A1 | 3/2015 | Mitchell |
| 2015/0088753 A1 | 3/2015 | Van Der Schueren |
| 2015/0100486 A1 | 4/2015 | Green et al. |
| 2015/0121308 A1 | 4/2015 | Zhong et al. |
| 2015/0149308 A1 | 5/2015 | Lin |
| 2015/0170141 A1 | 6/2015 | Klingen |
| 2015/0186871 A1 | 7/2015 | Laracey |
| 2015/0186872 A1 | 7/2015 | Sobol et al. |
| 2015/0193093 A1 | 7/2015 | Grover et al. |
| 2015/0206136 A1 | 7/2015 | Maddocks et al. |
| 2015/0213545 A1 | 7/2015 | Gomez-Rosado et al. |
| 2015/0220247 A1 | 8/2015 | Bari et al. |
| 2015/0220914 A1 | 8/2015 | Purves et al. |
| 2015/0248664 A1 | 9/2015 | Makhdumi et al. |
| 2015/0254636 A1 | 9/2015 | Yoon et al. |
| 2015/0254638 A1 | 9/2015 | Bondesen et al. |
| 2015/0254639 A1 | 9/2015 | Radu |
| 2015/0254642 A1 | 9/2015 | Bondesen et al. |
| 2015/0254644 A1 | 9/2015 | Bondesen et al. |
| 2015/0254645 A1 | 9/2015 | Bondesen et al. |
| 2015/0254647 A1 | 9/2015 | Bondesen et al. |
| 2015/0254653 A1 | 9/2015 | Bondesen et al. |
| 2015/0254664 A1 | 9/2015 | Bondesen et al. |
| 2015/0302396 A1 | 10/2015 | Jeon |
| 2015/0332252 A1 | 11/2015 | Shahrokhi et al. |
| 2015/0348002 A1 | 12/2015 | Van Os et al. |
| 2015/0348015 A1 | 12/2015 | Ren et al. |
| 2015/0348018 A1 | 12/2015 | Campos et al. |
| 2015/0371326 A1 | 12/2015 | Montesano et al. |
| 2016/0019525 A1 | 1/2016 | Lin |
| 2016/0019530 A1 | 1/2016 | Wang et al. |
| 2016/0041718 A1 | 2/2016 | Wood et al. |
| 2016/0048822 A1 | 2/2016 | Forrest |
| 2016/0048864 A1 | 2/2016 | Beer et al. |
| 2016/0055513 A1 | 2/2016 | Kuhn et al. |
| 2016/0071074 A1 | 3/2016 | Baird |
| 2016/0078428 A1 | 3/2016 | Moser et al. |
| 2016/0086153 A1 | 3/2016 | Rolf |
| 2016/0092866 A1 | 3/2016 | Liberty et al. |
| 2016/0092870 A1 | 3/2016 | Salama et al. |
| 2016/0119296 A1 | 4/2016 | Laxminarayanan et al. |
| 2016/0125394 A1 | 5/2016 | Desai et al. |
| 2016/0140460 A1 | 5/2016 | Boyd, Jr. |
| 2016/0180328 A1 | 6/2016 | Loomis |
| 2016/0180332 A1 | 6/2016 | Wilczynski |
| 2016/0192108 A1 | 6/2016 | Chaudhary et al. |
| 2016/0203467 A1 | 7/2016 | Khan et al. |
| 2016/0210626 A1 | 7/2016 | Ortiz et al. |
| 2016/0232513 A1 | 8/2016 | Purves et al. |
| 2016/0232518 A1 | 8/2016 | Butler, IV |
| 2016/0232546 A1 | 8/2016 | Ranft et al. |
| 2016/0247138 A1 | 8/2016 | Wallner |
| 2016/0253651 A1 | 9/2016 | Park et al. |
| 2016/0253652 A1 | 9/2016 | Je et al. |
| 2016/0253669 A1 | 9/2016 | Yoon et al. |
| 2016/0260086 A1 | 9/2016 | Cho et al. |
| 2016/0260090 A1 | 9/2016 | Healy et al. |
| 2016/0267513 A1 | 9/2016 | Walz et al. |
| 2016/0275482 A1 | 9/2016 | Zhou |
| 2016/0283923 A1 | 9/2016 | Hertel et al. |
| 2016/0283925 A1 | 9/2016 | Lavu et al. |
| 2016/0283929 A1 | 9/2016 | Matotek et al. |
| 2016/0292673 A1 | 10/2016 | Chandrasekaran |
| 2016/0358167 A1 | 12/2016 | Van Os et al. |
| 2016/0364744 A1 | 12/2016 | Stone et al. |
| 2017/0024720 A1 | 1/2017 | Shah |
| 2017/0039599 A1 | 2/2017 | Tunnell et al. |
| 2017/0352026 A1 | 12/2017 | Musil et al. |
| 2018/0204195 A1 | 7/2018 | Kang |
| 2018/0211249 A1 | 7/2018 | Sims et al. |

OTHER PUBLICATIONS

Anonymous, "Redefining Loyalty," Anonymous Banker, Middle East, Dubai, Oct. 29, 2014, 3 pages.

Garside, Juliette "Google Wallet Mobile Payments System Launched to Public," The Guardian, Sep. 9, 2011, https://www.theguardian.com/technology/2011/sep/19/google-wallet-available-public (Year 2011).

Julien, R., Jr. (2016). The cybersecurity aspects of apple pay (Order No. 10252123). Available from ProQuest Dissertations and Theses Professional. (1867004335). Retrieved from https://dialog.proquest.com/professional/docview/1867004335?accountid= 131444 (Year: 2016).

Wells Fargo & Co 2016 investor day—final. (May 24, 2016). Fair Disclosure Wire Retrieved from https://dialog.proquest.com/professional/docview/1794640848?accountid= 131444. Year 2016.

MOBILE WALLET CARD CONTROL

CROSS-REFERENCE TO RELATED APPLICATIONS

This application is a Continuation of U.S. patent application Ser. No. 15/604,370, filed on May 24, 2017, which claims the benefit of and priority to U.S. Provisional Patent Application No. 62/458,937 entitled "SYSTEMS AND METHODS FOR A MOBILE WALLET," filed on Feb. 14, 2017, the entire disclosures of which are hereby incorporated by reference in their entireties.

BACKGROUND

Today, purchases are accomplished in a variety of ways from conventional cash or currency to now electronic-based transactions. While there are a variety of electronic-based transactions, one type is via a mobile device. For example, mobile device users may purchase goods and services through payment applications at point-of-sale terminals. Beneficially, the use of their mobile device to make payments at the point-of-sale terminal may alleviate or reduce the need to carry cash or payment cards (e.g., credit cards), which some users may find appealing.

SUMMARY

One embodiment relates to a computer-implemented method. The method includes receiving, by a mobile wallet computing system, payment vehicle information for provisioning a first payment vehicle to a mobile wallet of a user, the first payment vehicle being associated with a financial institution. The method also includes identifying, by the mobile wallet computing system, a first functionality pertaining to the payment vehicle, wherein the first functionality enables the user to indicate a transaction preference for a transaction with an entity other than the financial institution. The method also includes presenting, by the mobile wallet computing system, a mobile wallet interface to a user associated with a mobile wallet. The mobile wallet interface includes a first field that includes a graphical depiction of the payment vehicle, the first field including a first interaction point configured to enable a mobile wallet transaction. The mobile wallet interface also includes a second field that includes a second interaction point and a third interaction point, the second interaction point enabling the user to access the first functionality, the third interaction point enabling the user to indicate a preference to initiate communications with the financial institution to perform at least one account management function related to the first payment vehicle depicted in the first field, wherein the first interaction point, second interaction point, and third interaction point are all simultaneously viewable on the mobile wallet interface without any user interactions with the mobile wallet interface.

Another embodiment relates to a system. The system includes a mobile wallet database structured to store information pertaining to a mobile wallet associated with a user. The system also includes a network interface configured to communicate data to and from a user mobile device associated with a user, and a plurality of third party computing systems. The system also includes a mobile wallet circuit, the mobile wallet circuit being communicatively coupled to the mobile wallet database and the network interface. The mobile wallet circuit is structured to receive, by the network interface, payment vehicle information for provisioning a first payment vehicle to a mobile wallet, the payment vehicle being associated with a financial institution. The mobile wallet circuit is also structured to identify a functionality pertaining to the payment vehicle, wherein the functionality includes receiving a user preference for a transaction with an entity other than the financial institution. The mobile wallet circuit is also structured to present, by the network interface, a mobile wallet interface to the user via the user mobile device. The mobile wallet interface includes a first field that includes a graphical depiction of the first payment vehicle, the first field including a first interaction point configured to enable a point of sale mobile wallet transaction using the first payment vehicle. The mobile wallet interface also includes a second field that includes a second interaction point and a third interaction point, the second interaction point configured to receive a user preference to access the identified functionality, the third interaction point configured to receive a user preference to initiate communications with the financial institution related to the first payment vehicle depicted in the first field, wherein the first interaction point, second interaction point, and third interaction point are all simultaneously viewable on the mobile wallet interface without any user interactions with the mobile wallet interface.

Another embodiment relates to a mobile device. The mobile device includes a network circuit structured to communicate data to and from a mobile wallet computing system. The mobile device also includes an input/output structured to exchange data with a user. The mobile device also includes a mobile wallet circuit communicatively coupled to the network circuit and the input/output device. The mobile wallet circuit is structured to present a mobile wallet interface to the user via input/output. The mobile wallet interface includes a first field that includes a graphical depiction of a user payment vehicle at a financial institution, the first field including a first interaction point communicably coupled to a near field communications chip on the mobile device. The mobile wallet interface also includes a second field that includes a second interaction point and a third interaction point, the second interaction point configured to receive a user preference to engage in a transaction with an entity other than the financial institution, the third interaction point configured to initiate communications with the financial institution, wherein the first interaction point, second interaction point, and third interaction point are all simultaneously viewable on the mobile wallet interface without any user interactions with the mobile wallet interface.

Another embodiment relates to a computer-implemented method. The method includes presenting, by a mobile device, an initial mobile wallet interface to a user associated with a mobile wallet. The initial mobile wallet interface includes a first field including a first payment vehicle depiction of a first payment vehicle associated with the user and a second field including a first payment-related service graphical depiction of a first payment-related service. The method also includes receiving, by the mobile device, an indication of a user interaction with the first field. The method also includes determining, by the device, that the user interaction with the first field constitutes a user selection of a second payment vehicle. The method also includes dynamically updating, by the mobile device, the mobile wallet interface responsive to determining that the user interaction is a user selection of the second payment vehicle. The updated mobile wallet interface includes an updated first field including a second payment vehicle depiction of a second payment vehicle and an updated second field including a second payment-related service graphical depiction of a second payment-related service, the second payment-related service being different from the first payment-related service.

Another embodiment relates to a mobile device. The mobile device includes a network circuit structured to communicate data to and from a mobile wallet computing system. The mobile device also includes an input/output structured to exchange data with a user. The mobile device further includes a mobile wallet circuit communicatively coupled to the network circuit and the input/output device. The mobile wallet circuit is structured to present, via the input/output, a an initial mobile wallet interface to a user associated with a mobile wallet. The initial mobile wallet interface includes a first field including a first payment vehicle depiction of a first payment vehicle associated with the user and a second field including a first payment-related service graphical depiction of a first payment-related service. The mobile wallet circuit is further structured to receive, by the input/output, an indication of a user interaction with the first field. The mobile wallet circuit is further structured to determine that the user interaction with the first field constitutes a user selection of a second payment vehicle. The mobile wallet circuit is further structured to dynamically update the mobile wallet interface responsive to determining that the user interaction is a user selection of the second payment. The updated mobile wallet interface includes an updated first field including a second payment vehicle depiction of a second payment vehicle and an updated second field including a second payment-related service graphical depiction of a second payment-related service, the second payment-related service being different from the first payment-related service.

Another embodiment relates to non-transitory computer readable media having computer-executable instructions embodied therein that, when executed by a processor of a mobile device, cause the processor to perform operations. The operations include presenting an initial mobile wallet interface to a user associated with a mobile wallet, the initial mobile wallet interface including a first field including a first payment vehicle depiction of a first payment vehicle associated with the user and a second field including a first payment-related service graphical depiction of a first payment-related service. The operations further include receiving an indication of a user interaction with the first field. The operations further include determining that the user interaction with the first field constitutes a user selection of a second payment vehicle. The operations further include dynamically updating the mobile wallet interface responsive to determining that the user interaction is a user selection of the second payment vehicle, the updated mobile wallet interface including an updated first field including a second payment vehicle depiction of a second payment vehicle and an updated second field including a second payment-related service graphical depiction of a second payment-related service, the second payment-related service being different from the first payment-related service.

Another embodiment relates to a computer-implemented method. The method includes retrieving, by a financial institution computing system associated with a financial institution, information pertaining to an existing account of a mobile wallet user from a database. The method further includes determining, by the financial institution computing system, the user's qualification for a credit card offer by comparing the retrieved information to predetermined criteria, wherein the determining involves underwriting the user for a credit card offer based on the information pertaining to the existing account. The method further includes selecting, by the financial institution computing system, a set of credit card offer terms for the credit card offer based on the existing account based on the user's qualification. The method further includes presenting, by the financial institution computing system, the user with a depiction of at least a portion of the selected set of credit offer terms in the user's mobile wallet, the depiction being proximate to an interaction point configured to receive a user preference to accept or decline the credit card offer.

Another embodiment relates to a system. The system includes a customer account database structured to store customer information regarding a plurality of customers of a financial institution that are also mobile wallet users. The system also includes a network interface configured to communicate data to and from a plurality of mobile devices associated with a plurality of customers. The system also includes a credit approval circuit, the credit approval circuit being communicatively coupled to the customer database, and the network interface. The credit approval circuit is structured to retrieve information pertaining to an existing account of a mobile wallet user from a database. The custom credit approval circuit is further structured to determine the user's qualification for a credit card offer by comparing the retrieved information to predetermined criteria, wherein the determining involves underwriting the user for a credit card offer based on the information pertaining to the existing account. The custom credit approval circuit is further structured to select a set of credit card offer terms for the credit card offer based on the existing based on the user's qualification. The custom credit approval circuit is further structured to present, by the network interface, the user with a depiction of at least a portion of the selected set of credit offer terms t in the user's mobile wallet, the depiction being proximate to an interaction point configured to receive user a preference to accept or decline the credit card offer.

Another embodiment relates to a mobile device. The mobile device includes a network circuit structured to communicate data to and from a financial institution computing system associated with a financial institution and mobile wallet computing system associated with a mobile wallet provider. The mobile device also includes an input/output structured to exchange data with a customer. The mobile device also includes a mobile wallet circuit communicatively coupled to the network circuit and the input/output device. The mobile wallet circuit is structured to receive, by the network circuit, identifying information for a pre-authorized credit card account that has been offered to the customer. The mobile wallet circuit is further structured to present, by the input/output, a first mobile wallet interface to a customer, the mobile wallet interface including an account selection portion including a depiction of an account that the customer has provisioned to a mobile wallet and a depiction of the pre-authorized credit card account, wherein the account selection portion can be manipulated by the customer to select either the provisioned account or the pre-authorized credit card account. The mobile wallet circuit is further structured to receive, by the input/output, a first input from the customer indicating a customer selection of the pre-authorized credit card account. The mobile wallet circuit is further structured to present, by the input/output, the depiction of the pre-authorized credit card account to the user, wherein the depiction of the pre-authorized credit card account includes at least one credit card offer term and includes an interaction point configured to receive preference a second user input to accept the pre-authorized credit card account.

Another embodiment relates to a computer-implemented method. The method includes receiving, by a mobile wallet computing system, a request to register for a mobile wallet from a user mobile device. The method also includes transmitting, by the mobile wallet computing system, an information request to the user mobile device, the information request prompting the user to provide information. The method also includes receiving, by the mobile wallet computing system, user-input information from the user mobile device. The method also includes determining, by the mobile wallet computing system, that the user has an account at a financial institution associated with the mobile wallet computing system based on the user-input information. The method also includes retrieving, by the mobile wallet computing system, information pertaining to the account. The method also includes transmitting, by the mobile wallet computing system, a mobile wallet client application to the mobile device, the mobile wallet client application being configured to present the user with a mobile wallet interface. The method also includes selecting, by the mobile wallet computing system, a set of services from a plurality of services associated with various functionalities included in the transmitted mobile wallet client application to make accessible to the user based on at least one of the user-input information and the information pertaining to the account. The method also includes transmitting, by the mobile wallet computing system, a set of instructions to the mobile device, the set of instructions identifying a set of graphical depictions to include in the mobile wallet interface, the set of graphical depictions including a depiction of at least one of the selected services.

Another embodiment relates to a system. The system includes a mobile wallet database structured to store information pertaining to the mobile wallets of a plurality of mobile wallet users. The system also includes a network interface configured to communicate data to and from a user mobile device associated with a user and a plurality of third party computing systems. The system also includes a mobile wallet circuit, the mobile wallet circuit being communicatively coupled to the mobile wallet database and the network interface. The mobile wallet circuit is structured to receive, by the network interface, a request to register for a mobile wallet from a user mobile device. The mobile wallet circuit is also structured to transmit, by the network interface, an information request to the user mobile device, the information request prompting the user to provide information. The mobile wallet circuit is also structured to receive, by the network interface, user-input information from the user mobile device. The mobile wallet circuit is also structured to determine that the user has an account at a financial institution associated with the mobile wallet computing system based on the user-input information. The mobile wallet circuit is also structured to retrieve information pertaining to the account from an account database. The mobile wallet circuit is also structured to transmit, by the network interface, a mobile wallet client application to the mobile device, the mobile wallet client application being configured to present the user with a mobile wallet interface. The mobile wallet circuit is also structured to select a set of services from a plurality of services associated with various functionalities included in the transmitted mobile wallet client application to make accessible to the user based on at least one of the user-input information and the information pertaining to the account. The mobile wallet circuit is further structured to transmit a set of instructions to the mobile device, the set of instructions identifying a set of graphical depictions to include in the mobile wallet interface, the set of graphical depictions including a depiction of at least one of the selected services.

Another embodiment relates to a non-transitory computer readable media having computer-executable instructions embodied therein that, when executed by a mobile wallet circuit of a mobile wallet system, causes the mobile wallet computing system to perform operations to register a user for a mobile wallet. The operations include receiving a request to register for a mobile wallet from a user mobile device. The operations include transmitting an information request to the user mobile device, the information request prompting the user to provide information. The operations further include receiving user-input information from the user mobile device. The operations further include determining that the user has an account at a financial institution associated with the mobile wallet computing system based on the user-input information. The operations further include retrieving information pertaining to the account. The operations further include transmitting a mobile wallet client application to the mobile device, the mobile wallet client application being configured to present the user with a mobile wallet interface. The operations further include selecting a set of services from a plurality of services associated with various functionalities included in the transmitted mobile wallet client application to make accessible to the user based on at least one of the user-input information and the information pertaining to the account. The operations further include transmitting a set of instructions to the mobile device, the set of instructions identifying a set of graphical depictions to include in the mobile wallet interface, the set of graphical depictions including a depiction of at least one of the selected services.

Another embodiment relates to a computer-implemented method. The method includes receiving, by a mobile wallet computing system, an indication from a user to install a mobile wallet client application on a user device. The method also includes receiving, by the mobile wallet computing system, registration information to install the mobile wallet client application including information regarding a first payment account associated with the user. The method also includes determining, by the mobile wallet computing system, that the first payment account is not associated with a token. The method also includes registering, by the mobile wallet computing system, the user for the mobile wallet client application, wherein the registration includes providing the mobile wallet client application on the user device, the mobile wallet client application configured to present the user with a mobile wallet interface, wherein the mobile wallet interface includes a graphical depiction of the first payment account and an account management portion configured to receive a user input to perform at least one account management function regarding the first payment account even if no token is generated for the first payment account.

Another embodiment relates to a mobile device. The mobile devices includes a network circuit structured to communicate data over a network. The mobile device also includes an input/output configured to exchange data with a user. The mobile device also includes a processor. The mobile device also includes a memory coupled to the processor, the memory having mobile wallet client application stored thereon, the mobile wallet client application including instructions executable by the processor that are structured to cause the processor to receive, via the input/output, an indication to turn on the mobile wallet client application. The instructions also cause the processor to identify a first payment account in the mobile wallet client application held by the user responsive to receiving the indication. The instructions also cause the processor to determine that the first payment account is not tokenized within the mobile wallet client application. The instructions also cause the processor to present, via the input/output, a mobile wallet interface to the user prior to taking any steps to generate a token for the first payment account, the mobile wallet interface including a first depiction of the first payment account and a second depiction of at least one action that the user can take using the first payment account, the at least one action including at least one of viewing an account balance associated with the first payment account and performing an account management function with respect to the first payment account.

A computer-implemented method. The method includes receiving, by a financial institution computing system associated with a financial institution, a request to register for a mobile wallet from a user mobile device. The method also includes identifying, by the financial institution computing system, a first payment account held by the user. The method also includes transmitting, by the mobile wallet computing system, a tokenization prompt to the user mobile device, the tokenization prompt instructing the user to indicate a tokenization preference for the first payment account. The method also includes receiving, by the mobile wallet computing system, a user tokenization preference to not tokenize the first payment account. The method also includes presenting, by the mobile wallet computing system, a mobile wallet interface on the user mobile device, the mobile wallet interface including a first graphical depiction of the first payment account as well as a second graphical depiction of at least one action that the user can take using the first payment account, the at least one action including at least one of viewing an account balance associated with the first payment account and performing an account management function with respect to the first payment account.

Another embodiment relates to a mobile device. The mobile device includes a network circuit structured to communicate data over a network. The mobile device also includes an input/output configured to exchange data with a user. The mobile device also includes a processor. The mobile device also includes a memory coupled to the processor, the memory having mobile wallet client application stored thereon, the mobile wallet client application including instructions executable by the processor that are structured to cause the processor to receive, via the input/output, a user input to access mobile wallet client application. The instructions also cause the processor to identify a first payment account and a second payment account held by the user responsive to receiving the user input, wherein the first payment account is activated such that the first payment account is associated with a first token and useable in mobile wallet transactions, and wherein the second payment account is deactivated such that the second payment account is unusable in mobile wallet transactions. The instructions also cause the processor to present, via the input/output, a mobile wallet interface to the user, the mobile wallet interface including a first depiction of the first payment account and a second depiction of the second payment account, wherein the second depiction includes a contrasting aspect relative to the first depiction to indicate that the second payment account is deactivated.

Another embodiment relates to a computer-implemented method. The method includes receiving, by a mobile device, a user input to activate the mobile wallet client application. The method also includes identifying, by the mobile device, a first payment account and a second payment account held by the user responsive to receiving the user preference, wherein the first payment account is activated such that the first payment account is associated with a first token and useable in mobile wallet transactions, and wherein the second payment account is deactivated such that the second payment account is unusable in mobile wallet transactions. The methods also include presenting, by the mobile device, a mobile wallet interface to the user, the mobile wallet interface including a first depiction of the first payment account and a second depiction of the second payment account, wherein the second depiction includes a contrasting aspect relative to the first depiction to indicate that the second payment account is deactivated.

Another embodiment relates to a non-transitory computer readable media having computer-executable instructions embodied therein that, when executed by a processor of a mobile device, cause the processor to perform various operations. The operations include receiving a user input to activate the mobile wallet client application. The operations also include identifying a first payment account and a second payment account held by the user responsive to receiving the user preference, wherein the first payment account is activated such that the first payment account is associated with a first token and useable in mobile wallet transactions, and wherein the second payment account is deactivated such that the second payment account is unusable in mobile wallet transactions. The operations also include presenting a mobile wallet interface to the user, the mobile wallet interface including a first depiction of the first payment account and a second depiction of the second payment account, wherein the second depiction includes a contrasting aspect relative to the first depiction to indicate that the second payment account is deactivated.

Another embodiment relates to a computer-implemented method. The method includes retrieving, by a financial institution computing system associated with a financial institution, information pertaining to an existing account of a mobile wallet user from a database. The method also includes underwriting, by the financial institution computing system, the user for the credit card offer by comparing the information pertaining to the existing account to predetermined criteria. The method also includes selecting, by the financial institution computing system, a set of credit card offer terms for the credit card offer based on the pre-underwriting. The method also includes modifying, by the financial institution computing system, the selected set of credit card offer terms to incorporate at least one credit offer term that is tailored to the customer based on information regarding the user. The method also includes creating, by the financial institution computing system, a credit card account for the mobile wallet of the user associated with the credit card offer. The method also includes generating, by the financial institution computing system, an account number for the credit card account associated with the credit card offer. The method also includes presenting, by the financial institution computing system, the user with a depiction of the credit card account in the user's mobile wallet, the depiction including an option to accept the credit card offer in order to activate the credit card account for use in the mobile wallet by the user.

Another embodiment relates to a system. The system includes a customer account database structured to store customer information regarding a plurality of customers of a financial institution that are also mobile wallet users. The system also includes a network interface configured to communicate data to and from a plurality of mobile devices associated with a plurality of customers. The system also includes a credit approval circuit, the credit approval circuit being communicatively coupled to the customer database, and the network interface. The credit approval circuit is structured to retrieve information pertaining to an existing account of a mobile wallet user from the customer account database. The credit approval circuit is also structured to underwrite the user for the credit card offer by comparing the information pertaining to the existing account to predetermined criteria. The credit approval circuit is also structured to select a set of credit card offer terms for the credit card offer based on the pre-underwriting. The credit approval circuit is also structured to modify the selected set of credit card offer terms to incorporate at least one credit offer term that is tailored to the customer based on information regarding the user. The credit approval circuit is also structured to create a credit card account for the mobile wallet of the user associated with the credit card offer in the accounts database. The credit approval circuit is also structured to generate an account number for the credit card account associated with the credit card offer. The credit approval circuit is also structured to present the user with a depiction of the credit card account in the user's mobile wallet, the depiction including an option to accept the credit card offer in order to activate the credit card account for use in the mobile wallet by the user.

Another embodiment relates to a non-transitory computer readable media having computer-executable instructions embodied therein that, when executed by a processor of a mobile device, cause the processor to perform various operations. The operations include retrieving information pertaining to an existing account of a mobile wallet user from a database. The operations also include underwriting the user for the credit card offer by comparing the information pertaining to the existing account to predetermined criteria. The operations also include selecting a set of credit card offer terms for the credit card offer based on the pre-underwriting. The operations also include modifying the selected set of credit card offer terms to incorporate at least one credit offer term that is tailored to the customer based on information regarding the user. The operations also include creating a credit card account for the mobile wallet of the user associated with the credit card offer. The operations also include generating an account number for the credit card account associated with the credit card offer. The operations also include presenting the user with a depiction of the credit card account in the user's mobile wallet, the depiction including an option to accept the credit card offer in order to activate the credit card account for use in the mobile wallet by the user.

Another embodiment relates to a computer-implemented method. The method includes presenting, by the mobile device, a mobile wallet interface to a user, the mobile wallet interface including a first depiction of a user payment vehicle and a first icon configured to receive a user input to take a first action with respect to the first payment vehicle, wherein the first action is at least one of engaging in a point of sale transaction using the first payment vehicle, viewing an account balance associated with the first payment vehicle, viewing a transaction history associated with the first payment vehicle, performing an account management function with respect to the first payment vehicle, performing a person-to-person transfer using the user payment vehicle, and engaging in a network transaction using the user payment vehicle. The method also includes determining, by the mobile device, that the first input has not been received within a predetermined period. The method also includes updating, by mobile device, the mobile wallet interface to not include the first icon responsive to the determination.

Another embodiment relates to a mobile device. The mobile device includes a network interface structured to communicate data to and from a mobile wallet computing system. The mobile device also includes an input/output structured to exchange data with a user. The mobile device also includes mobile wallet circuit structured to present, via the input/output, a mobile wallet interface to the user, the mobile wallet interface including a first depiction of a user payment vehicle and a first icon configured to receive a user input to take a first action with respect to the first payment vehicle, wherein the first action is at least one of engaging in a point of sale transaction using the first payment vehicle, viewing an account balance associated with the first payment vehicle, viewing a transaction history associated with the first payment vehicle, performing an account management function with respect to the first payment vehicle, performing a person-to-person transfer using the user payment vehicle, and engaging in a network transaction using the user payment vehicle. The mobile wallet circuit is further structured to determine that the first input has not been received within a predetermined period. The mobile wallet circuit is further structured to update the mobile wallet interface to not include the first icon responsive to the determination.

Another embodiment relates to a non-transitory computer readable media having computer-executable instructions embodied therein that, when executed by a processor of a mobile device, cause the processor to perform various operations. The operations include presenting a mobile wallet interface to a user, the mobile wallet interface including a first depiction of a user payment vehicle and a first icon configured to receive a user input to take a first action with respect to the first payment vehicle, wherein the first action is at least one of engaging in a point of sale transaction using the first payment vehicle, viewing an account balance associated with the first payment vehicle, viewing a transaction history associated with the first payment vehicle, performing an account management function with respect to the first payment vehicle, performing a person-to-person transfer using the user payment vehicle, and engaging in a network transaction using the user payment vehicle. The operations further include determining that the first input has not been received within a predetermined period. The operations further include updating the mobile wallet interface to not include the first icon responsive to the determination.

DETAILED DESCRIPTION

Figure 1:
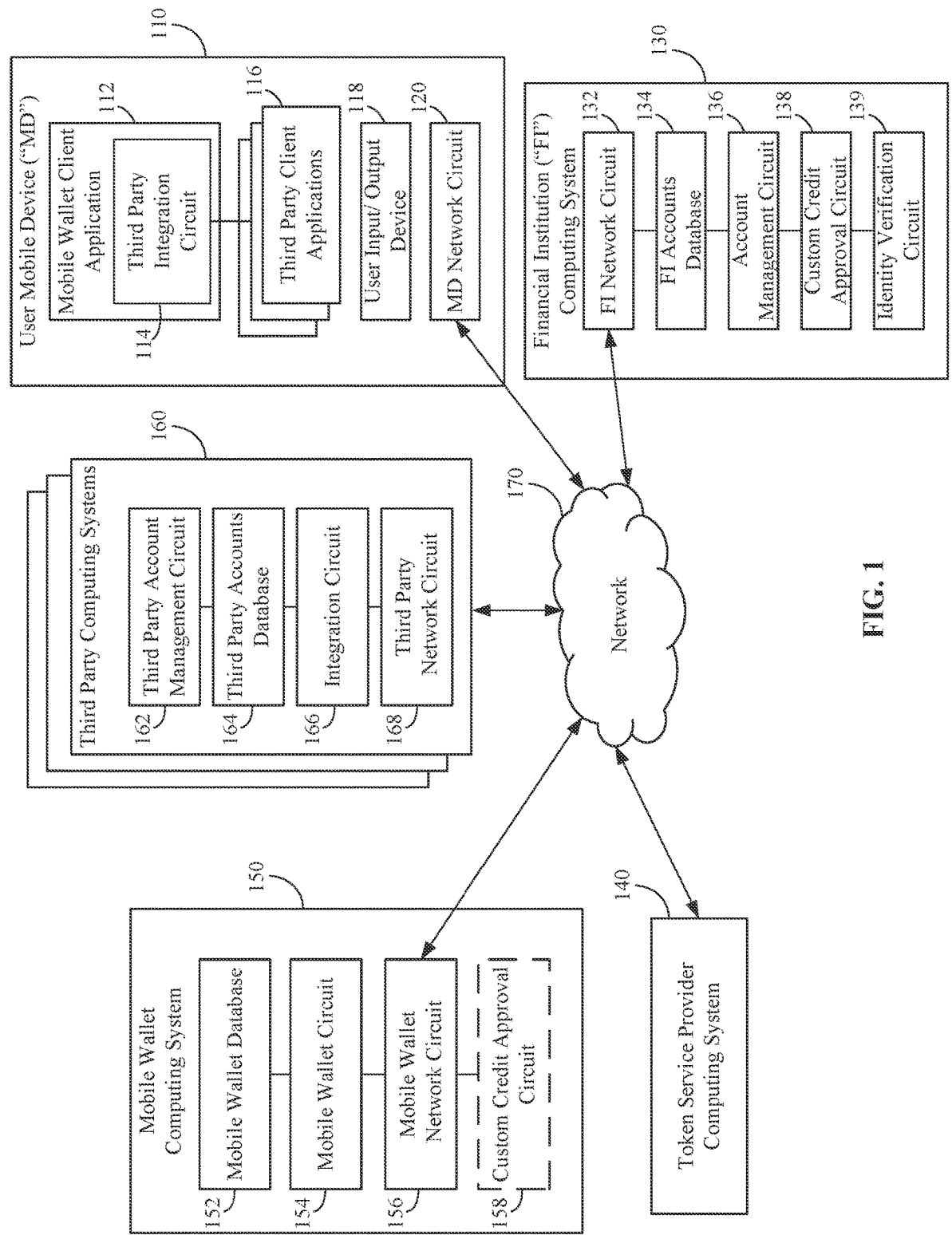
FIG. 1 is a block diagram of a system for providing a multi-functional mobile wallet, according to an example embodiment.

Various embodiments discussed herein relate to systems and methods for bundling various functionalities and features into a mobile wallet. In various embodiments, a mobile wallet provider presents or otherwise provides a mobile wallet interface to a user to enable and allow access and use of not just mobile wallet functionalities, but a broad array of financial services. In other words, the mobile wallet interface may provide the user with a single access point to mobile wallet features as well as other features traditionally only accessible elsewhere. For example, the mobile wallet interface includes various interaction points (e.g., buttons, links, icons, etc.). A first interaction point may enable the user to conduct a point of sale transaction using the mobile wallet, while additional interaction points may enable the user to perform more general banking functions such as viewing a balance associated with an account, viewing a transaction history associated with an account, and setting preferences and rules relating to a payment vehicle (e.g., authentication preferences, security settings, and the like). Other interaction points provide access to other functionalities associated with other payment-related services offered by various entities (e.g., person-to-person transfers, shopping, financial rewards, alerts, issuer-specific deals, and the like). Technically and beneficially, the integration of payment features, banking features, and the like within a single system—the mobile wallet—provides an enhanced amount of convenience to users of the mobile wallet of the present disclosure. As a result, users may perform tasks (e.g., payments, view balances, etc.) in a faster, more efficient manner.

In some arrangements, a multi-field mobile wallet interface is presented to the user. The multi-field mobile wallet interface may include, for example, a first field that enables the user to view and select various payment vehicles (e.g., credit cards, debit cards, checking accounts, gift cards, and the like) associated with the user. A second field may provide the user with access to various payment-related services (e.g., mobile shopping applications, person-to-person payment ("P2P") services, and the like) that are related to the payment vehicles viewable in the first field. Additionally, the second field may also enable the user to take actions with respect to a payment vehicle viewable in the first field (e.g., view a transaction history associated with the payment vehicle).

In various embodiments, the mobile wallet interface presented to the user by the systems and methods disclosed herein is individually tailored to the user. As an example, a user may provide information and request to register for a mobile wallet provided by a mobile wallet provider computing system. In response, the mobile wallet provider computing system provides a mobile wallet application on a user mobile device associated with the user that exposes a set of functionalities that is individually tailored to the user based on available information. As a result, the user is efficiently provided with a mobile wallet interface specifically tailored to the user's circumstances.

In various embodiments, the mobile wallet interface is continuously or dynamically updated based on both actions of the mobile wallet user and of other parties. For example, the first field discussed above may be manipulated by the user to select a particular payment vehicle. In response to the selection, the second field may dynamically update to include a set of functionalities that is based on the selected payment vehicle. This way, the user is presented with a dynamic mobile wallet interface allowing access to the most useful functionalities given the user's current preferences.

Additionally, the mobile wallet interface may be updated responsive to certain actions taken by a financial institution. For example, if a user has an account at the financial institution, the financial institution, via an associated computing system, may pre-approve the user for a credit card that is individually tailored to the user based on the user's account. The financial institution computing system may also communicate with a card network to create a credit card account number for the user, tokenize the account number, and present the user the credit card offer in the user's mobile wallet. In response to the user accepting the credit card offer, the pre-authorized credit card account is immediately provisioned to the user's mobile wallet, and thus quickly available for use in mobile wallet transactions.

Additionally, the systems, methods, and implementations disclosed herein further facilitate a completely digital end-to-end customer engagement process for a financial institution. For example, a new customer not having an existing account with the financial institution may access a website associated with a financial institution via a mobile device and request to register/apply for both a credit card as well as the multi-function mobile wallet described herein. In response, the financial institution, via an associated computing system, may implement an identification verification process. For example, the identification verification process may include requesting a digital form (e.g., a scanned image) of required documentation (e.g., a driver's license, social security card, and the like) from the customer. Upon receipt of the digital form of the digital documentation, the financial institution computing system may take steps/actions/etc. to verify the customer's identity. For example, the financial institution computing system may access a database to obtain additional customer information and formulate a query (e.g., a security question) to transmit to the customer based on the obtained information. If the customer responds correctly to the query, an automated or largely automated credit card application sequence may be initiated whereby a credit application is largely pre-populated using the information obtained from accessible databases and submitted by the customer. Once the application is submitted, the financial institution computing system determines if the customer qualifies for a credit card and, if so, pre-underwrites the customer for a credit card account, creates a digital credit card account for the customer, initiates a sequence to tokenize the digital credit account, and initiates a sequence to send the user a physical credit card in the mail. After this, the customer can view and activate the digital credit card account from within the customer's new mobile wallet and have the digital credit card available for use within the mobile wallet well before the physical credit card arrives. Thus, using the systems, methods, and computer-implementations described herein, a financial institution customer can go from not having an account to having a functional account within a short amount of time (e.g., minutes or seconds) without ever having to enter a brick-and-mortar location of the financial institution.

Technically and beneficially, the systems, methods, and implementations disclosed herein improve the efficiency with which users can perform various transactions. This is done through unique pairings of user interactions with the mobile wallet and various other functionalities. Such pairings enable users to simultaneously communicate multiple financial preferences through a single interaction with a mobile wallet. For instance, a user may interact with a mobile wallet to select a particular payment vehicle and, by doing so, indicate a preference to both engage in a mobile wallet transaction using the selected payment vehicle as well as view an account balance associated with the selected payment vehicle. Additionally, if the selected payment vehicle has been paired with a P2P payment platform through processes described herein, the user selection of the payment vehicle further indicates a user preference for making a P2P payment. Thus, by including unique pairings of user interactions with a mobile wallet interface with various functionalities, the systems and methods disclosed herein create a novel financial communications platform from within a mobile wallet. The mobile wallet constitutes a starting point for a plurality of different user transactions that before have not been associated with a mobile wallet.

Further, the systems and methods disclosed herein improve mobile device performance. To illustrate, compare two users who want to manage a payment account and perform a mobile wallet transaction using that account. The first user performs these functions using two different applications, while the second does so using the systems and methods disclosed herein. To manage the payment account, the first user would have to activate a mobile banking application or web browser on a user mobile device, log in, and select the account. Next, to perform a mobile wallet transaction, the first user would need to close the mobile banking application and open up a mobile wallet application, login, and select an account. Such a process is burdensome on both the user and the mobile device. In the previous example, the first user would need to activate two different applications, remember two different sets of login credentials, and select the same account twice: once for each respective action that the user wishes to perform. This requires at least six user interactions with the mobile device before the first user is put into a position to perform the desired actions. This number of interactions, in addition to the activation of two applications, puts a burden on the mobile device. For example, such a process may use a relatively large portion of the system memory of the mobile device, leading to slower processing speeds and more power consumption. The second user, because the systems and methods disclosed herein are used, however, only needs to activate one application, input one set of login credentials, and select the account once to be able to perform both actions. Only three user interactions with the mobile device are necessary to put the user in a position to perform both desired actions. Thus, the user will take less time to perform both actions and activate a smaller number of applications. As such, the processor of the mobile device is freed up to perform other operations more efficiently. Thus, the systems and methods disclosed herein unexpectedly leads to improved mobile device performance while providing the user access to the same or more functionalities.

Further, still referring to the example above, because the second user has access to all of the functionalities disclosed herein within a single application instance, only a single set of security credentials need be to be used. This means that the user will have input a smaller number of passwords, PINs, and the like. As a result, more stringent authentication credentials (e.g., biometric authentication, more stringent password requirements, and the like) may be used while still requiring fewer user interactions with the mobile device to perform the same functions as in current systems. Further, since all the functionalities disclosed herein may be provided in the same application instance, they can be secured in the same application domain with a heightened level of security due to there being less necessity for inter-application communications within the mobile device. Thus, unexpectedly, the systems and methods disclosed herein allow for better protection of sensitive user information.

As used herein, the term "payment-related service" refers to services, functions, or features provided by a financial institution or other entity relating to payments, fund transfers, and other financial services such as banking. Examples of payment-related services include, but are not limited to, banking functions such as viewing account balances, transferring funds from various accounts, setting account security preferences, and the like. Other examples of payment-related services allow users to engage in other types of transactions such as P2P payments, purchasing products or services from various merchants, and the like. Thus, the term "payment-related service" should be interpreted to include all of these examples, as well as any other example discussed in relation to this term herein.

As used herein, the term "field" refers to a portion of a user interface viewable by the user on a user mobile device. Any interface viewable on a mobile device display may include any number of fields. Fields may be completely separate portions of the user interface or may be overlapping with one another. Any field may contain any number of elements such as headers, graphics, icon, information, and the like.

As used herein, the term "interaction point" refers to an element on a user interface on a user mobile device that the user can interact with (e.g., by pressing the screen in a position corresponding to the interaction point or swiping the screen) to induce a responsive action by the user mobile device (e.g., button(s), icon(s), switch(es), alpha-numeric text, hyperlinks, etc.). For example, the user may interact with one interaction point to cause the user mobile device to present another user interface containing information different from the interface initially containing the interaction point.

As used herein, the term "token" refers to a surrogate or proxy value that replaces an actual or real-value in association with certain items such as payment cards, user information (e.g., name) and the like. For example, a personal account number (PAN) associated with a user payment card may be "tokenized" by generating a surrogate value for the PAN. A mapping process or function may be used to relate the token-to-actual value (e.g., PAN) in, e.g., a database, such as a "token vault". The "token" may have many structures including purely numeric (e.g., a 16 digit token, a 19 digit token, a 8 digit token, etc.) to an alphanumeric value. Further, the "token" may include additional information than just the proxy value. For example, the token may include information regarding the expiration date of the token, an accompanying cryptogram, etc. Thus, those of ordinary skill in the art will appreciate the high configurability of the "token" (and associated elements) with all such variations intended to fall within the scope of the present disclosure.

As used herein, the term "payment vehicle" refers to any card, account, or any other currency-attached object, virtual file, or database from which a user can transfer funds to another entity. Example payment vehicles include bank accounts, (e.g., checking accounts and savings accounts), other user accounts (e.g., flexible spending accounts, IRA accounts, health savings accounts, investment accounts, and the like), transaction cards (e.g., gift cards, credit cards, debit cards), and financial rewards (e.g., cash back, rewards points, and the like).

Referring now to FIG. 1, a block diagram of a computer-implemented system 100 for providing a multi-functional mobile wallet is shown, according to an example embodiment. As shown, the system 100 includes a user mobile device 110 associated with a user, a financial institution computing system 130 associated with a financial institution, a token service provider computing system 140 associated with a token service provider, a mobile wallet computing system 150 associated with a mobile wallet provider, and one or more third party computing systems 160 associated with various third parties. The various systems and devices may be communicatively and operatively coupled through a network 170, which may include one or more of the Internet, cellular network, Wi-Fi, Wi-Max, a proprietary banking network, or any other type of wired or wireless network or a combination of wired and wireless networks. As described herein, the system 100 may be used to provide a multi-functional mobile wallet on the user mobile device 110.

Third party computing systems 160 are computing systems associated with various third parties. As used herein with respect to third party computing systems 160, "third parties" refer to entities that provide services useable with the mobile wallet on the user mobile device. While conventionally these third parties provide their services independent of the mobile wallet, according to the present disclosure, the third-party services are implemented with, embodied with, or otherwise included with the multi-function mobile wallet. The "services" may include, but are not limited to payment-related services such as online shopping, P2P payments, search engines, product review services, issuer-specific financial rewards, social media accounts, security services, and the like.

As such, the "third parties" may include merchants, financial institutions, social media institutions, and the like. Some third parties may provide payment-related services that users may utilize. For example, a particular third party may provide a network communications platform that enables P2P payments over the network 170 (e.g., Venmo®, Zelle™, Dwolla®, Snapcash™, Circle Pay®, etc.). In some arrangements, the third parties may include various financial institutions that provide various payment-related services to various users (e.g., Visa Checkout®, alerts, coupons, account management services and the like). In some arrangements, third parties may include merchants that operate various shopping websites (e.g., Amazon®). In some arrangements, third parties may include mobile wallet providers (e.g., other than the mobile wallet provider associated with the mobile wallet computing system 150), that provide access to various mobile wallets (Apple Pay® or Android Pay®).

Third party computing systems 160 include a third party account management circuit 162, a third party accounts database 164, an integration circuit 166, and a third party network circuit 168 that enables the third party computing system 160 to exchange data, information, values, and the like over the network 170. The third party accounts database 164 is structured to retrievably store user information relating to user relationships with the third party, and may include non-transient data storage mediums (e.g., local disc or flash-based hard drives, local network servers, and the like) or remote data storage facilities (e.g., cloud servers). Third party account database 164 may include information pertaining to user accounts with the third party. The information stored in the third party account database 164 varies depending on the particular service provided by the third party computing system 160.

The third party account management circuit 162 is structured to provide the user with access to the third party computing system 160 to manage one or more of their accounts. As will be appreciated, the functionalities performed by the third party account management circuit 162 will vary depending on the nature of the service provided at the third party computing system 160. In some embodiments, the third party account management circuit 162 is configured to provide an application (e.g., a third party client application 116, described in greater detail below) on various user mobile devices 110. The application may provide users with various displays enabling the users to take advantage of the various functionalities provided by the third party computing systems 160.

The integration circuit 166 includes various software components that are executable by a processor of the third party computing system 160 to facilitate intercommunications with external computing systems (e.g., mobile wallet computing system 150 and/or the user mobile device 110). For example, various APIs the integration circuit 166 may include various APIs that cause the third party computing system 160 to transfer information to requesting parties such as the mobile wallet provider.

In some arrangements, the integration circuit 166 includes various software components (e.g., various SDKs), that facilitate, enable, or otherwise permit the third party to integrate various third party features, systems, or applications with applications provided by other entities (e.g., the mobile wallet client application 112, described below). To illustrate, the integration circuit 166 may include an SDK provided by the mobile wallet provider. Such an SDK may be used by the third parties to create software packages that may be integrated into the mobile wallet client application 112 provided by the mobile wallet provider. The software packages may, for example, include widgets including graphical control elements that can be integrated into a mobile wallet interface presented to the user via the mobile wallet client application 112. Additionally or alternatively, the software packages may include applets or containers that enable the mobile wallet provider to add third-party-specific functionalities to the mobile wallet client application 112. In some arrangements, the third party computing systems 160 may transfer these software packages to the mobile wallet computing system 150, which may integrate these software packages into the mobile wallet client application 112 to add third party functionalities to the user's mobile wallet.

The mobile wallet computing system 150 is structured to permit, enable, facilitate, manage, process, and otherwise allow mobile wallet transactions. As used herein, the term "mobile wallet transaction" is meant to be broadly interpreted to refer to transactions accomplished via the mobile wallet on the user mobile device. As such, the mobile transaction may include, but is not limited to, a person-to-person payment, a payment for a good or service at a point-of-sale terminal of a merchant, etc. The mobile wallet computing system 150 may be associated with, owned by, and/or otherwise operated by a mobile wallet provider. In one embodiment, the mobile wallet provider may be a financial institution, such as the financial institution associated with the financial institution computing system 130. In this instance, the mobile wallet computing system 150 may be a part of the financial institution computing system 130. In another embodiment and as shown, the mobile wallet provider may be a third party provider relative to the financial institution that operates the financial institution computing system 130.

In any configuration, the mobile wallet computer system may provide or at least partly provide a mobile wallet circuit 154. As described in more detail herein, the "mobile wallet" is a digital wallet provided on the user mobile device 110. The digital wallet may include payment capabilities, such as the ability to use a communication protocol (e.g., near-field communication) at a point-of-sale terminal to transfer payment information and enable the purchase of a good or service. Additionally, the digital wallet may include many other capabilities, functions, and features that are described herein in more detail.

In arrangements where the mobile wallet provider is the financial institution associated with the financial institution computing system 130, each of the operations described herein with respect to the mobile wallet computing system 150 may also be described as being performed by the same financial institution. In such arrangements, the financial institution computing system 130 and the mobile wallet computing system 150 may be operated as a single computing system, or as two or more separate computing systems (as shown in FIG. 1) performing the associated functions described herein. As will be appreciated, the level of functionality that resides on the financial institution computing system 130 as opposed to the mobile wallet computing system 150 in these arrangements may vary depending on the implementation.

With the above in mind, the mobile wallet computing system 150 is shown to include a mobile wallet database 152, a mobile wallet circuit 154, and a mobile wallet network circuit 156 enabling the mobile wallet computing system 150 to exchange data over the network 170. In some arrangements, the mobile wallet computing system 150 also includes a custom credit approval circuit 138 that includes the various structures and functionalities discussed below with respect to the financial institution computing system 130. As described herein, the mobile wallet computing system 150 may be configured to exchange data with the mobile device 110, financial institution computing system 130, third party computing systems 160, and token service provider computing systems 140 in the implementation of a user mobile wallet.

Mobile wallet database 152 is structured to store information regarding mobile wallet accounts held by various users, such as for a mobile wallet account held by the user of the user mobile device 110. For instance, the mobile wallet database 152 may store various forms of information related to the user and/or an associated mobile device upon registration of one or both for a mobile wallet. The stored mobile wallet account information may include authentication information (e.g., username/password combinations, device authentication tokens, security question answers, etc.), payment card information, and transaction history, account holder identifying information, registered device information, and any other information that may be encountered in the operation of a mobile wallet account or otherwise referenced herein. Such information may include user preferences and other information comprising a user profile. In some arrangements, for example, mobile wallet database 152 also includes a token vault that is maintained by the mobile wallet computing system 150. The token vault may include a lookup table maintaining tokens associated with various user payment vehicles. The tokens stored therein may be generated internally (e.g., at the mobile wallet computing system 150) or by other entities (e.g., the token service provider computing system 140). For example, in one embodiment, the token vault may include a lookup table including tokens that that have been randomly assigned to a user payment vehicle (e.g., user lines of credit, user checking accounts, and the like) by the mobile wallet computing system 150. In some arrangements, the mobile wallet computing system 150 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer. In some arrangements, the token vault is provided at a computing system associated with a separate entity, such as the token service provider computing system 140 described below.

The mobile wallet circuit 154 is structured to provide a mobile wallet on the user mobile device 110. In some embodiments, the mobile wallet circuit 154 is structured to provide a mobile wallet client application (e.g., mobile wallet client application 112 discussed below) on the user mobile device 110. In this regard, the mobile wallet circuit 154 enables registrations of a user for a mobile wallet, presents the user with various user interfaces enabling user to use or manage a mobile wallet, and enables users to perform transactions using the mobile wallet. A more detailed view of the mobile wallet circuit 154 will be described below in relation to FIG. 2.

The token service provider computing system 140 includes a computing system configured to provision payment credentials (e.g., payment tokens) on behalf of a mobile wallet user. The token service provider computing system 140 may be operated by a credit card network or other type of payment system, an acquiring or issuing financial institution (e.g., financial institution computing system 130), a merchant, a mobile wallet provider (e.g., mobile wallet computing system 150), and/or another provider. The token service provider computing system 140 is configured to communicate remotely with the other systems and devices of system 100 via the network 170.

The token service provider computing system 140 may be configured to facilitate various services associated with payment tokens, including provisioning (e.g., generating) new tokens, authorizing a token for use in a financial transaction, storing payment vehicle tokens (e.g., in a token vault), and managing the life cycles of the payment vehicle tokens. The token service provider computing system 140 may be configured to provision payment tokens in response to a request received from the mobile wallet computing system 150. For example, the mobile wallet computing system 150 may request that the token service provider computing system 140 provision payment tokens for those payment vehicles (e.g., credit cards, debit cards, gift cards, and the like) selected when the user is registered.

The financial institution computing system 130 is a computing system at a financial institution that provides and maintains one or more financial accounts (e.g., demand deposit account, credit or debit card account, brokerage account, etc.) on behalf of the user. In some arrangements, the financial institution is an issuer of a payment vehicle held by the user. The payment vehicle may be used as a source payment vehicle for transactions engaged in via the user's mobile wallet. In the context of the present disclosure, the financial institution can include commercial or private banks, credit unions, investment brokerages, mobile wallet providers, and so on, but can also include any commercial entity capable of maintaining payment vehicles on behalf of a user, including retailers, vendors, service providers, and the like. In some arrangements, the financial institution is also a mobile wallet provider configured to manage mobile wallet accounts on behalf of its customers (i.e., users), including authenticating mobile wallet transactions involving debits from the users' payment vehicles. For example, the financial institution may also operate the mobile wallet computing system 150 in various embodiments.

The financial institution computing system 130 includes a financial institution network circuit 132 enabling the financial institution computing system 130 to exchange data over the network 170, a financial institution accounts database 134, an account management circuit 136, a custom credit approval circuit 138, and an identity verification circuit 139. In some arrangements, the financial institution computing system 130 includes an integration circuit similar to the integration circuit 166 discussed above in relation to the third party computing systems 160. The integration circuit may, for example, include an API that facilitates the delivery of account information (e.g., account balance information, an account transaction history, and the like) to the user mobile device 110. The financial institution accounts database 134 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 134 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts.

The account management circuit 136 is structured to manage the financial accounts of various users, including maintaining and handling transaction processing for the user's one or more financial accounts. In some embodiments, a banking client application on the user mobile device 110 (e.g., as one of the third party client applications 116) is provided by the account management circuit 136. In this regard, the account management circuit 136 is configured to provide interfaces, displays, and associated content to enable users to manage accounts at the financial institution associated with the financial institution computing system 130 via banking client application. In these embodiments, the banking client application may be executed and maintained remotely by the financial institution computing system 130. As will be appreciated, the level of functionality that resides on the user mobile device 110 as opposed to the financial institution computing system 130 may vary depending on the implementation.

The identity verification circuit 139 is structured to verify information received from a user in the registration process described below. With regard to the end-to-end digital customer engagement process described above, the identity verification circuit 139 obtains information from various sources to authenticate a new user prior to initiating an account application process. As described herein, the identity verification circuit 139 utilizes a combination of what you have and what you know verification process (e.g., a driver's license (what you have) plus a question (what you know)). In some arrangements, responsive to receiving a request from a new user to register for an account with the financial institution from the user mobile device 110 over the network 170, the identity verification circuit 139 transmits a first prompt to the user mobile device 110 requesting the user to take images of user identification documents required for the opening of a new financial account. The prompt may include a document-imaging button configured to activate a camera included on the user mobile device 110 to enable the user to take images of the required documentation. For example, the prompt may instruct the user to take an image of both the back and the front of the user's driver's license. Additionally, the prompt may also instruct the user to capture an image of the user's face and/or capture a live video of the user performing an action (e.g., answering a question) to be transmitted to the financial institution computing system 130. Additionally, this prompt or other prompts may request the user to provide authorization for the financial institution to contact the user's phone carrier for information pertaining to the user mobile device 110 and/or user.

In various arrangements, once the user has captured images and/or video of, for example, a driver's license as well as the user's face, the identity verification circuit 139 may perform a multi-step process to validate the user's license. First, the identity verification circuit 139 may determine the authenticity of the documentation imaged by the user. In this regard, the identity verification circuit 139 may perform an image comparison analysis between the image of the user's driver's license and a driver's license template. If any differences are found between the imaged license and the template, the identity verification circuit 139 may transmit a denial notification to the user mobile device 110. If, however, various features of the user driver license (e.g., government seals, image dimensions, and the like) match those of the template, the identity verification circuit 139 may move onto the next validation step. In the next step, the identity verification circuit 139 compares the image or live video of the user's face captured by the user to the image of the user on the user's driver's license. If the images match, then the identity verification circuit 139 may move onto additional verification steps. For example, the identity verification circuit 139 may extract various user attributes (e.g., name, address, and the like) from the image of the user's validated driver's license to generate a user profile.

In some arrangements, using the generated profile, the identity verification circuit 139 formulates an information request. For example, in one embodiment, the identity verification circuit 139 uses the profile to formulate a request for a report containing additional user information (e.g., past addresses, employment information, and the like) from an external service provider. In some arrangements, responsive to receiving such a report, the identity verification circuit 139 formulates a query to send to the user. For example, the identity verification circuit 139 may generate a prompt requesting the user to identify a past employer and/or address. When the user's response is received, the identity verification circuit 139 compares the response to the information contained in the report to verify the user.

In various arrangements, additional user identity verification processes may be performed. For example, the identity verification circuit 139 may transmit an information request to a third party or the user's mobile device carrier to verify the user mobile device 110 and other user information. For example, the user's mobile device carrier may provide user information (e.g., phone number, name, and address) that can be cross-referenced with the information extracted from the user's driver's license to provide a further point of verification. Additionally, in the case where the user already has an account with the financial institution, information stored in the accounts database 134 may be further used to verify the user's identity. Additionally, the identity verification circuit 139 may cross reference various user information with any government databases including, for example, information identifying known bad actors or the like. If the user passes all of these identity verification checkpoints, the identity verification circuit 139 may transmit a verification notification to, for example, the custom credit approval circuit 138 and/or mobile wallet circuit 154 for use in an account activation procedure to be described below.

In some arrangements, the custom credit approval circuit 138 is structured to pre-approve a financial institution customer that is also a mobile wallet user for an individually tailored credit card and allow the user to activate the credit card via the user's mobile wallet. In some arrangements, the custom credit approval circuit 138 may retrieve available information pertaining to a mobile wallet user. For example, the user may hold a checking account with the financial institution but not hold a credit card account with the financial institution. The custom credit approval circuit 138 may access available information pertaining to the user and pre-approve the user for a credit card without being requested to do so by the user. In some arrangements, the custom credit approval circuit 138 is configured to pre-approve the user based solely on information stored in the financial institution computing system 130. Accordingly, the custom credit approval circuit 138 is configured to access the financial institution accounts database 134, and assess the information pertaining to the user against predetermined criteria (e.g., account balance thresholds, credit ratings, age of the user's financial institution account, and the like) to determine the parameters of a credit card (e.g., interest rate, credit limit, and the like) to offer to the user.

In some arrangements, after a new user has been verified by the identity verification circuit 139 by the processes discussed above, the custom credit approval circuit 138 is configured to perform a process to determine the new user's eligibility for a new payment account (e.g., credit card account). For example, the custom credit approval circuit 138 may assess the information contained in any of the information obtained by the identity verification circuit 139 discussed above against predetermined criteria (e.g., account balance thresholds, ages of existing user credit accounts, timeliness of past user payments on previous credit account, number of user credit inquiries, etc.) to determine the parameters of a credit card (e.g., interest rate, credit limit, and the like) to offer to the user.

In some arrangements, the custom credit approval circuit 138 is configured to generate a credit card that is customized for the mobile wallet user or new user. In this regard, the custom credit approval circuit 138 determines at least one user credit preference based on available information pertaining to the user. In some arrangements, user credit preferences include a balance transfer preference. To illustrate, a particular mobile wallet user may have a checking account at the financial institution, and a credit card at another financial institution. The user may use the checking accounts to make payments on the credit card, and a record of such payments may be stored in the financial institution accounts database. Based this stored information, or information contained in a credit report received from a credit bureau, the custom credit approval circuit 138 may offer to transfer the balance of the user's old credit card to the new credit card associated with the offer at a particular interest rate over a particular time period (e.g., 0% APR for 18 months).

In some arrangements, the user preference includes determining a type of financial rewards program to be associated with the offered credit card. For example, based on transaction history information stored in the financial institution accounts database 134, the custom credit approval circuit 138 may identify a merchant (or set of merchants) that the user prefers to shop at and generate a credit card that rewards the user for shopping at that particular merchant (e.g., two-percent cash back at all times at those identified merchants whereas all other purchases only receive one-percent cash back). Thus, this type of action may even entice the user into signing-up for the credit card. Alternatively, the reward may be based on the user's financial information. For example, if the custom credit approval circuit 138 determines that the user is paying off a mortgage, a mortgage rewards credit card may be offered to the customer.

In some arrangements, the custom credit approval circuit 138 is configured to access additional sources (e.g., third party computing systems 160) of information to gather user data. For example, during the registration process for a mobile wallet (to be described in greater detail below), the user may be asked to provide social media login credentials so that the social media platform maybe integrated into the user's mobile wallet via the methods discussed herein. The mobile wallet computing system 150 may (e.g., via an API), access information stored on a social media platform pertaining to the user, and provide the information to the custom credit approval circuit 138. The custom credit approval circuit 138 may include algorithms for comparing the received social media information to the information stored in the financial accounts database 134 or information received from other verified sources to determine the legitimacy of the social media information. If the social media information is determined to be legitimate, the social media information may be used in determining a user credit preference to customize the credit card offer. Similar processes may be performed to obtain other types of information pertaining to the user (e.g., user search engine information or user purchasing preferences at an online merchant). In various arrangements, the custom credit approval circuit 138 is configured to assess all information pertaining to the user from third parties to generate at least one customer credit preference using methods similar to those discussed above.

In some arrangements, the custom credit approval circuit 138 is configured to generate a graphical representation of the preapproved credit card offer to be presented to the user via the user's mobile wallet. The graphical presentation may be encoded with hypertext that facilitates the user communicating acceptance of the credit card offer with the financial institution computing system 130 over the network 170. In some arrangements, the custom credit approval circuit 138 is configured to transmit the generated graphical presentation to the mobile wallet computing system 150 over the network 170. In some arrangements, the financial institution computing system 130 is configured transmit the credit card offer directly to the user mobile device 110 such that the offer is viewable by the user via the user's mobile wallet, as described below.

The user mobile device 110 is a mobile device associated with a mobile wallet user. The user may include one or more individuals, business entities, government entities, and agents. The user mobile device 110 is structured to exchange data over the network 170, execute software applications, access websites, generate graphical user interfaces, and perform other operations described herein. The user mobile device 110 may include one or more of a smartphone or other cellular device, a wearable computing device (e.g., eyewear, a watch or bracelet, etc.), a tablet, a portable gaming device, a laptop, and other portable computing devices.

The user mobile device 110 includes a mobile wallet client application 112, third party client applications 116, a user input/output ("I/O") device 118, and a mobile device network circuit 120 enabling the user mobile device to exchange information over the network 170. The user I/O device 118 includes hardware and associated logics configured to enable the mobile device 110 to exchange information with a user and other devices (e.g., a merchant transaction terminal). An input aspect of the user I/O device 118 allows the user to provide information to the mobile device 110, and may include, for example, a mechanical keyboard, a touchscreen, a microphone, a camera, a fingerprint scanner, any user input device engageable to the mobile device 110 via a USB, serial cable, Ethernet cable, and so on. An output aspect of the user I/O device 118 allows the user to receive information from the mobile device 110, and may include, for example, a digital display, a speaker, illuminating icons, LEDs, and so on. The user I/O device 118 may include systems, components, devices, and apparatuses that serve both input and output functions, allowing the financial institution computing system 130 to exchange information with the mobile device 110. Such systems, components, devices and apparatuses include, for example, radio frequency transceivers (e.g., RF or NFC-based transceivers) and other short range wireless transceivers (e.g., Bluetooth®, laser-based data transmitters, etc.).

The mobile device 110 further includes a mobile wallet client application 112. The mobile wallet client application 112 is structured to facilitate and permit payments by interfacing with various accounts held by the user at various financial institutions (e.g., the financial institution associated with the financial institution computing system 130 and/or other financial institutions). Accordingly, in some arrangements, the mobile wallet client application 112 is communicably coupled via the network circuit 120 over the network 170 to the mobile wallet computing system 150. In some embodiments, the mobile wallet client application 112 includes a circuit embodied within the user mobile device 110. For example, the mobile wallet client application may include program logic stored in a system memory of the user mobile device 110. In such arrangements, the program logic may configure a processor of the user mobile device to perform at least some of the functions discussed above with respect to the mobile wallet circuit 154 of the mobile wallet computing system 150. In some embodiments, the mobile wallet client application is a web-based application, and many of the functionalities are provided at the mobile wallet circuit 154 of the mobile wallet computing system 150. As will be understood, the level of functionality that resides on the user mobile device 110 versus the mobile wallet computing system 150 will vary depending on the implementation.

In various arrangements, the mobile wallet client application 112 is structured to permit mobile wallet users to engage in transactions through the initiation of communications with, for example, a merchant point of sale device. In this regard, the mobile device 110 may include a near field communications (NFC) chip and an associated controller that configures the chip to exchange information with the merchant point of sale device (e.g., an NFC reader). It should be understood that the role that the mobile wallet client application 112 takes in payment transactions will depend on the implementation of the mobile wallet. In some arrangements, for example, the mobile wallet is implemented in a secure element framework. In such arrangements, the user mobile device 110 includes a secure element that is separate from the main system memory of the user mobile device. The secure element may include any element having smart card functionalities, such as a universal subscriber identity circuit (a SIM card) or a secure digital card. In such arrangements, user authentication information (e.g., payment vehicle information, user PINS, and the like) is stored in the secure element. In various arrangements, the secure element of the mobile device 110 may include a payment application that interfaces with the NFC chip of the user device responsive to receiving a communication (e.g., an application protocol data unit) from the merchant point of sale device to enable user payment information be transferred. In such arrangements, no user information is transferred by the mobile wallet client application 112 to the NFC chip. After user payment information is transmitted to the merchant point of sale device, the mobile wallet client application 112 may query the secure element for transaction data to notify the user of the completed transaction.

In other arrangements, the mobile wallet client application 112 may operate under a host card emulation framework. In such arrangements, user payment information is maintained within the mobile wallet client application 112 or cloud-based environment (e.g., a host emulation service or the mobile wallet database 152) rather than in the secure element. In this regard, the mobile wallet client application 112 may include a service component (e.g., a payment application) configured to interface with the NFC chip of the mobile device 110 to communicate user payment tokens to the merchant point of sale device. To ensure security of user information, the mobile wallet client application 112 may include sandboxing functionalities where a unique user ID (UID) is assigned to the mobile wallet client application 112, and where only other applications (e.g., third party client applications 116) including the same UID may share information stored in relation to the mobile wallet client application 112.

In various other arrangements, the user-specific payment information may be stored in a trusted execution environment ("TEE") within a processor the user mobile device 110. The systems and methods disclosed herein may also be used with other modalities currently available for storage and transfer of user payment device via contactless communication mechanisms.

In some arrangements, the mobile wallet client application 112 is structured to enable the user to manage a mobile wallet. In this regard, the mobile wallet client application 112 is structured to present, control, and otherwise manage displays or graphical user interfaces on the mobile device 110 including information pertaining to various payment vehicles. For example, the mobile wallet client application 112 may present the user with displays enabling the user to input information pertaining to various payment vehicles. The screens may enable the user to manually input information (e.g., a PAN) pertaining to a payment vehicle, or enable the user to take a picture of a payment vehicle. The mobile wallet client application 112 may then process the information input by the user, identify account information, and transmit the information to the mobile wallet computing system 150 for storage (e.g., in the mobile wallet database 152 in association with the user). Once information pertaining to various payment vehicles has been received by the mobile wallet computing system 150, the mobile wallet client application 112 is configured to present displays that enable the user to select a payment vehicle from amongst a plurality of payment vehicles. Once a payment vehicle is selected, the displays may further enable the user to perform various actions using the selected payment vehicle (e.g., use the selected vehicle to complete a mobile wallet transaction, manage an account at a financial institution associated with the selected payment vehicle, view a transaction history associated with the payment vehicle, and the like).

In various arrangements, the displays presented to the user by the mobile wallet client application 112 further enable the user to take advantage of other payment-related services (e.g., services other than those discussed above). In one embodiment, the displays include graphical depictions of various services other than the mobile wallet (e.g., payment-related services such as a mobile shopping application). The services depicted may bear certain relationships to the payment vehicles presented on the mobile wallet interface. One example relates to a P2P payment service. In such an example, if the user's mobile wallet interface includes a debit card, the interface may include a depiction of the P2P payment service. However, if the user's mobile wallet interface includes a credit card, the interface may not include a depiction of the P2P payment service because most P2P services do not allow use of credit cards.

In various arrangements, the payment-related services included in the mobile wallet interface may both be internal services offered by the mobile wallet provider (and an associated financial institution such as the financial institution associated with the financial institution computing system 130) as well as external services offered by various third parties. With regard to internal services, the mobile wallet interface may include depictions of account management functions (e.g., viewing transaction histories, viewing account balances, managing accounts, managing security settings, etc.). With regard to external services, the mobile wallet interface may include depictions of various functionalities that enable the user to utilize various payment vehicles in the context of various other payment-related services not directly related to account management (e.g., mobile shopping applications, driving service applications, financial rewards applications, alerts, and the like). It should be understood that the mobile wallet provider and/or financial institution may also develop such functionalities within the scope of the systems and methods herein.

In some arrangements, if a user selects a graphical depiction of a particular payment-related service, the mobile wallet client application 112 is structured to present the user with further displays enabling the user to take actions with respect to that payment-related service (e.g., to set up an account with the payment related service or to set parameters of an account). In some arrangements, responsive to a user setting preferences pertaining to a payment-related service, the mobile wallet client application 112 is configured to communicate those preferences to the entity providing that service. In this regard, in some arrangements, the mobile wallet client application 112 includes a third party integration circuit 114. Third party integration circuit 114 may include program logic that facilitates the communication of the mobile wallet client application 112 with other entities (e.g., third party computing systems 160). For example, third party integration circuit 114 may include various APIs that configure the mobile device 110 to communicate information to the third party computing systems 160 offering various payment-related services to the user via various third party client applications 116 over the network 170.

To illustrate, if the selected payment-related service is a mobile shopping application associated with a particular merchant, the mobile wallet client application 112 may further present the user with a display that includes a plurality of products offered by the merchant. The user may be able to select a product and select a payment vehicle, and the mobile wallet client application 112 may configure the user mobile device 110 to transmit a purchase request to the third party computing system 160 associated with the merchant. In another example, if the selected payment-related service is a driving service application (e.g., Uber® or Lyft®), the mobile wallet client application 112 may present the user with a display enabling the user to set a location to be driven to and/or a pickup time, and a payment vehicle to pay for the ride. The mobile wallet client application 112 may cause the user mobile device 110 to transmit a ride request to the third party computing system 160 associated with the driving service. Thus, the mobile wallet client application 112 enables the user to take advantage of a plurality of services related to payment vehicles provisioned to a mobile wallet, without ever leaving the mobile wallet client application 112.

Third party client applications 116 are structured to provide the user with access to services offered by various third parties. In some arrangements, the third party client applications 116 are hard coded onto the memory of the mobile device 110. In another embodiment, these applications are web-based interface applications, where the user has to log onto or access the web-based interface before usage, and these applications are supported by a separate computing system comprising one or more servers, processors, network interface circuits, or the like (e.g., third party computing systems 160), that transmit the applications for use to the mobile device.

In some arrangements, the third party client applications 116 are structured to permit management of at least one user account associated with a third party service. Accordingly, a particular third party client application 116 may be communicably coupled to a third party computing system 160 (e.g., the third party accounts database 164) via the network 170. Through this communicative coupling, the third party computing system 160 (e.g., via the third party account management circuit 162) may provide displays regarding the particular third party service or application (e.g., account balance information). In various arrangements, such information received by third party client applications 116 may be shared with the mobile wallet client application 112 through the third party integration circuit 114 to facilitate the integration of various functionalities into the mobile wallet client application 112.

Figure 2:
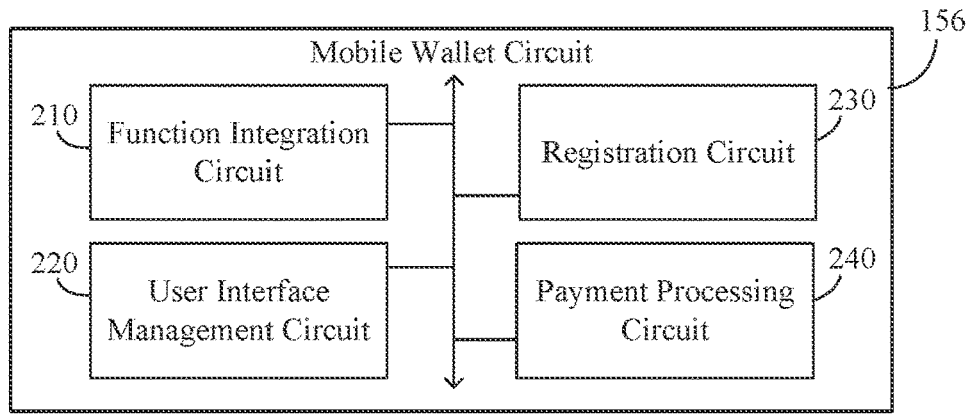
FIG. 2 is a more detailed diagram of a mobile wallet circuit of the system shown in FIG. 1, according to an example embodiment.

Referring now to FIG. 2, a more detailed embodiment of the mobile wallet circuit 154 of the mobile wallet computing system 150 of the system 100 in FIG. 1 is shown. In some arrangements, the mobile wallet circuit 154 includes a function integration circuit 210, a user interface management circuit 220, a registration circuit 230, and a payment processing circuit 240. Each of the circuits may be communicably and operatively coupled to each other. Other embodiments may include less or more circuits without departing from the spirit and scope of the present disclosure. Further, some embodiments may combine the activities of one circuit with another circuit to form a single circuit. Therefore, those of ordinary skill in the art will appreciate that the present arrangement is not meant to be limiting.

In one configuration, the mobile wallet circuit 154 and associated circuits 210-240 are embodied as machine or computer-readable media that is executable by a processor of the mobile wallet computing system. As described herein amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the mobile wallet circuit 154 and associated circuits 210-240 are embodied as hardware units, such as electronic control units. As such, the mobile wallet circuit 154 and associated circuits 210-240 may be embodied as one or more circuitry components including, but not limited to, processing circuitry, network interfaces, peripheral devices, input devices, output devices, sensors, etc. In some embodiments, the mobile wallet circuit 154 and associated circuits 210-240 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the mobile wallet circuit 154 and associated circuits 210-240 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). Thus, the mobile wallet circuit 154 and associated circuits 210-240 may also include programmable hardware devices such as field programmable gate arrays, programmable array logic, programmable logic devices or the like. In this regard, the mobile wallet circuit 154 and associated circuits 210-240 may include one or more memory devices for storing instructions that are executable by the processor(s) of the mobile wallet circuit 154 and associated circuits 210-240. Thus, in this hardware unit configuration, the mobile wallet circuit 154 and associated circuits 210-240 may be geographically dispersed from one another. Alternatively and as shown, the mobile wallet circuit 154 and associated circuits 210-240 may be embodied in or within a single unit/housing, which is shown as the mobile wallet circuit 154.

Function integration circuit 210 may be program logic that configures the mobile wallet circuit 154 to integrate payment-related functionalities into a user's mobile wallet. In some arrangements, function integration circuit 210 includes a series of software elements that provide accessibility to various functionalities discussed herein. In this regard, the function integration circuit 210 may include a plurality of sets of program logic associated with various functionalities developed by the mobile wallet provider and/or financial institution associated with the financial institution computing system 130. Such functionalities may enable the user to perform various operations with respect to various user payment vehicles (e.g., manage an account maintained by the financial institution computing system 130, view an account balance, view a transaction history, and the like). Further, such functionalities may also enable the user to perform various types of transactions using various payment vehicles. For example, the function integration circuit 210 may include a widget that provides the user with access to a P2P payment platform. The widget may be associated with a graphical element (e.g., an icon depicting the P2P payment platform) that may appear on the user's mobile wallet interface as will be described below. The icon may be coupled to program logic such that, upon the user's selection of the icon, the user is brought to a P2P transaction interface enabling the user to designate an intended recipient of funds and a transfer amount. In another example, another functionality may enable the user to access various financial rewards associated with various payment vehicles.

In some arrangements, the function integration circuit 210 may also include sets of program logic associated with various functionalities developed by various third parties associated with third party computing systems 160. For example, the function integration circuit 210 may include various software integration packages. The integration packages may include program logic (e.g., an API or widget) that causes the user mobile device 110 to perform various operations (e.g., communicate with the third party computing system 160 over the network 170) to provide a service to the user. Additionally, the integration packages may include associated sets of user interface parameters that may be compatible with a user interface template provided by the mobile wallet provider. For example, the interface parameters may be structured to incorporate of a depiction (e.g., a graphical icon) of the functionalities that the integration package is configured to add to the user's mobile wallet into the user's mobile wallet interface. The depiction may be coupled to the program logic included in the integration package. For example, a particular integration package may include a widget associated with graphical representation of a third party P2P payments platform (e.g., Venmo®, or PayPal®). The graphical representation may be coupled to associated widget program logic such that, upon a user's selection of the graphical representation, the user is brought to an additional interface configured to receive various user inputs with respect to the third party P2P payments platform to be communicated to the third party computing system 160.

User interface management circuit 220 is structured or configured to generate, update, control or otherwise manage displays/graphical user interfaces of the mobile wallet. In various arrangements, user interface management circuit 220 updates the displays responsive to various user interactions with various portions of a mobile wallet interface presented to the user. For example, the user may indicate a preference to integrate a particular payment-related service or functionality into the user mobile device 110, and the user interface management circuit 220 may update user interface parameters to incorporate a depiction of the requested service or functionality in an updated version of the mobile wallet client application 112. In some arrangements, the user interface management circuit 220 updates displays viewable by the user responsive to information received from the financial institution computing system 130. For example, responsive to receiving updated account balance information or a credit card offer from the financial institution computing system 130, the user interface management circuit 220 may update the user interface parameters associated with the mobile wallet client application 112 to incorporate the balance information and offer.

The registration circuit 230 may perform a registration process to provide a first time mobile wallet user with a mobile wallet. In this regard, the registration circuit 230 may present the user with a plurality of registration interfaces (e.g., viewable by a web browser on the user mobile device 110) prompting the first time user to input information such as payment vehicle information, user identifying information, login credentials, and the like). As discussed above, the registration interfaces may also ask the user permission to access user social media data (e.g., maintained in the user mobile device via a third party client application or a third party computing system 160) and other data.

Further, with respect to the end-to-end digital user engagement experience discussed above, the registration circuit 230 may also perform various steps to register a new user for a new payment account (e.g., a credit card) with the financial institution. In this regard, the registration circuit 230 may operate in concert with the identity verification circuit 139 discussed above. For example, if a particular new user wishes to register for a new account without visiting a brick-and-mortar location associated with the financial institution, the registration circuit 230 may present the user with various prompts instructing the user to capture images of required documentation (e.g., a driver's license). Further, if the identity verification circuit 139 validates the new user via the processes discussed above, the registration circuit 230 may further present the user with a card application interface requesting information from the user. The application interface may include several fields requesting various forms of information (e.g., name, address, social security number, and the like) from the user. In some arrangements, a subset of the fields included on the application interface is pre-populated with information received from the identity verification circuit 139. For example, the application interface may pre-populate a user name field with information gathered from the captured images of the required documentation. Other fields may be pre-populated using information contained in a credit report or other information from public database received by the identity verification circuit 139.

Based on the information received from the user and the information from various other sources, the registration circuit 230 may determine the elements to include in various user mobile wallet interfaces. For example, the registration circuit 230 may use the payment vehicle information received from the user to identify the financial institutions associated with the payment vehicles that the user wishes to add to the mobile wallet (e.g., based on the format or numerical sequence of a PAN). Additionally, the registration circuit 230 may communicate user data to the financial institution computing system 130 to identify other payment accounts associated with the user. Based on this determined information, the registration circuit 230 may transmit instructions to the user interface management circuit 220 as to various graphical depictions of various payment vehicles to include on the user mobile wallet interfaces.

Additionally, the registration circuit 230 may use the available information pertaining to the user to identify a set of payment-related services that is most applicable to the user based on available information. For example, the mobile wallet circuit 154 may assess the user information to generate a profile describing various aspects of the user. The profile may, for example, describe an operating system type of user mobile device 110 (e.g., Android®, iOS®, and any other type of platform), the identity of various financial institutions at which the user has accounts, the types of accounts (e.g., checking, savings, gift cards, credit) that the user wishes to provision to the mobile wallet, transaction history/spending habits of the user (e.g., if the user repeatedly spends more than $100 at a particular store each month, physical locations of merchants that the user frequently visits, etc.), and user preferences as to the type of payment-related services that the user would like to have available via the mobile wallet.

Based on the user profile, the registration circuit 230 identifies a set of services to make accessible via the user's mobile wallet. For example, if the user's profile reveals a user preference for shopping at a particular merchant, the registration engine may determine if the function integration circuit 210 includes an integration package associated with that merchant. If so, the registration circuit 230 may instruct the user interface management circuit 220 to include an icon associated with the package in the user's mobile wallet interfaces. In another example, if the user's profile indicates a user preference to only provision a single rewards credit card, the registration circuit 230 may instruct the user interface management circuit 220 to include an icon representing a widget enabling the user to view the rewards that the user has earned using the rewards credit card.

The payment processing circuit 240 is structured to process user payment requests. For example, the user may indicate a preference to engage in a mobile wallet transaction using a payment vehicle. The mobile wallet client application 112 provided on the user mobile device 110 may then transmit transaction information, a token, and any other payment information or security information (e.g., a cryptogram) to a merchant, which may then transmit the token and the aforementioned described information to the mobile wallet computing system 150. The mobile wallet circuit 154 may receive this information and either de-tokenize the token or transmit the token to the token service provider computing system 140 for de-tokenization. Once the token is de-tokenized, the mobile wallet circuit 154 may identify the financial institution associated with the payment vehicle and transmit the transaction information to the financial institution computing system 130, which may authorize the transaction request. In response to receiving an authorization from the financial institution computing system 130, the mobile wallet circuit 154 may transmit an authorization to the merchant over the network 170, which may enable the user to complete the desired transaction. As will be appreciated, the role that the payment processing circuit 240 serves in user mobile wallet transactions may vary depending on the implementation of the user's mobile wallet. For example, in arrangements where the user's mobile wallet operates under a host emulation framework, the payment processing circuit 240 may transmit user payment information (e.g., tokens) to the user mobile device 110 to enable the user to initiate a mobile wallet transaction. On the other hand, in arrangements where the mobile wallet is implemented in a secure element framework, the payment processing circuit 240 may not perform such functions.

Figure 3:
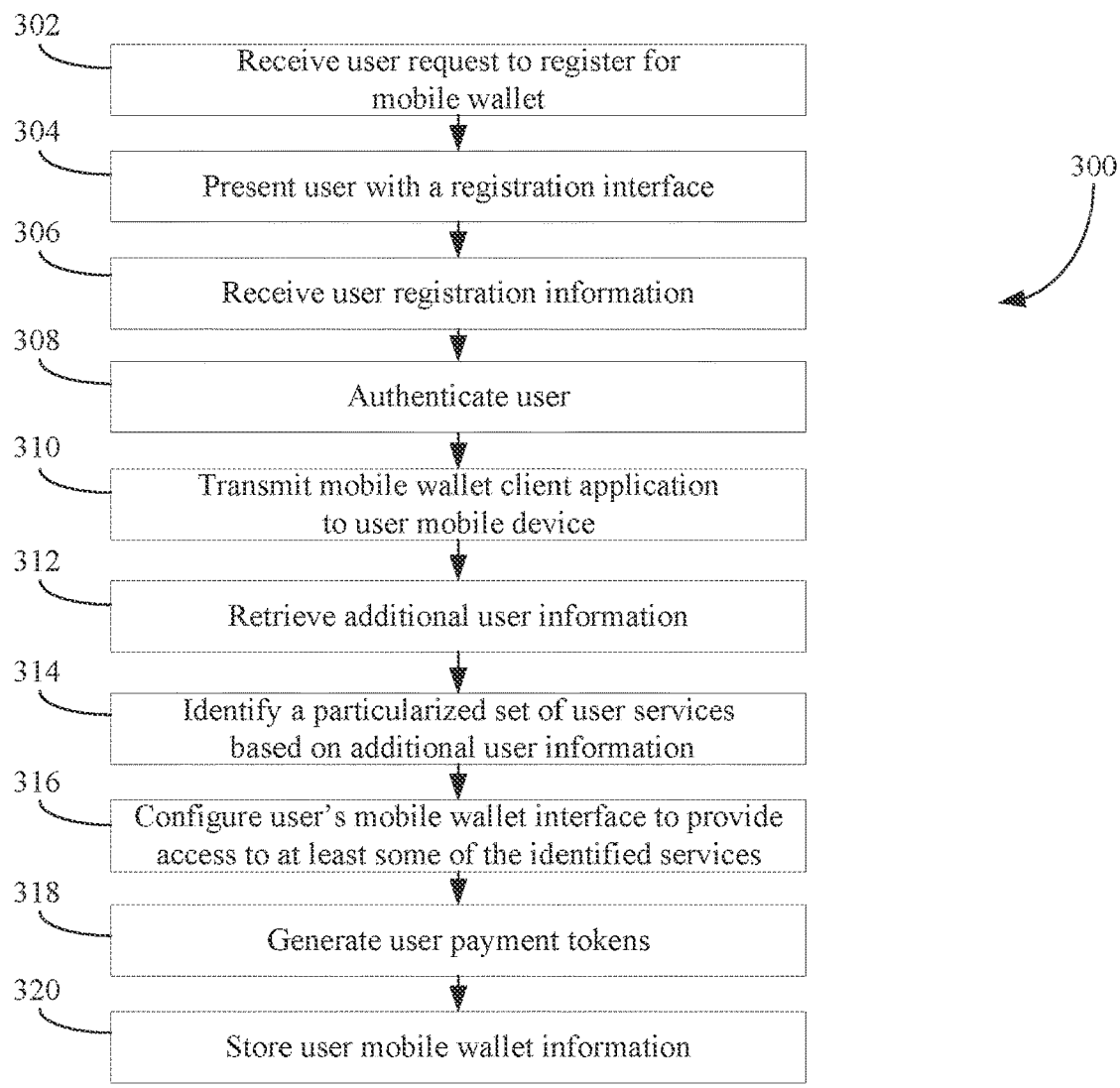
FIG. 3 is a flow diagram of a method of registering a user for a mobile wallet, according to an example embodiment.

Referring now to FIG. 3, a flow diagram of a method 300 of registering a customer for a mobile wallet according to an example embodiment is shown. The method 300 may be performed by the components of FIGS. 1 and 2, such that reference may be made to one or more components of FIGS. 1 and 2 to aid description of the method 300.

At process 302, a user request to register for a mobile wallet is received. In some arrangements, the request is received from the user mobile device 110. For example, the user may access a website associated with the mobile wallet provider, and indicate a preference to register for the mobile wallet. In other arrangements, such as where the mobile wallet computing system 150 is integrated into the financial institution computing system 130, the registration request may be received from a computing system associated with the financial institution. For example, a user may enter into a brick-and-mortar location associated with a financial institution, and sign up for an account with the assistance of a financial institution employee.

At process 304, the user is presented with one or more registration interfaces. In various arrangements, the mobile wallet circuit 154 transmits registration interfaces to the computing device that the registration preference was received from (e.g., the user mobile device 110 or the financial institution computing system 130) over the network 170. The registration interfaces may request various forms of information from the user. For example, one registration interface may prompt the user to establish login credentials (e.g., a username and password) for the mobile wallet. Another registration interface may prompt the user to input information that can be used to authenticate the user. For example, a registration interface may ask the user to input information pertaining to a payment vehicle that the user wishes to provision to the mobile wallet and authentication credentials (e.g., an address or PIN) that can be used to authenticate the user. Other registration interfaces may prompt the user to input information pertaining to payment vehicles (e.g., accounts, gift cards, credit cards, and the like) that the user wishes to provision to the mobile wallet. Another registration interface may prompt a new mobile wallet user to indicate a preference to activate a new payment account (e.g., a credit card) with the financial institution. In some arrangements, responsive to the new mobile wallet user indicating such a preference, another registration interface may prompt the user to take capture images of identification and/or other documentation required to establish a payment account at the financial institution.

At process 306, user registration information is received. In some arrangements, the user inputs the information requested by the registration interfaces into the user mobile device 110 (e.g., via the user I/O device 118), which transmits the user-input information via the network circuit 120 to the mobile wallet computing system 150. Alternatively, the information is input by personnel associated with the financial institution at the financial institution computing system 130.

At process 308, the user is authenticated. In some arrangements, where, for example, the mobile wallet computing system 150 is associated with the financial institution computing system 130, the mobile wallet circuit 154 receives the authentication information received at process 306 (e.g., an account number and authentication information), accesses a database (e.g., the financial institution accounts database 134) to retrieve verified user authentication information, and compares the received authentication information with the verified authentication information. If the received data matches the verified data, the user is authenticated. In some arrangements, where, for example, the mobile wallet computing system 150 is not associated with the financial institution computing system 130, the mobile wallet circuit 154 may initiate communications with external computing devices to authenticate the user. For example, responsive to receiving the identity of a user financial account, the mobile wallet circuit 154 (e.g., via the function integration circuit 210) may identify a financial institution associated with the account and request authentication information pertaining to the user from the financial institution computing system 130 via the network 170 to authenticate the user.

In some arrangements, if, for example, the user is a new mobile wallet user that indicated a preference to sign up for a new payment account at process 306, the mobile wallet circuit 154 may communicate with the identity verification circuit 139 discussed above to verify the new mobile wallet user's identity. For example, the mobile wallet circuit 154 may transmit any scanned images received at process 306 to the identity verification circuit 139 for further processing.

At process 310, a mobile wallet client application 112 is provided to the user mobile device 110. In some arrangements, the mobile wallet circuit 154 may first identify the type and version of operating system on the user mobile device 110 (e.g., iOS® v. Android®) based on the format of a hypertext transfer protocol request received from the user mobile device 110 at any of the processes 302-306, for example. Based on the identified mobile device type, the mobile wallet circuit 154 may transmit a set of program logic to the user mobile device 110 over the network 170 that is compatible with the user mobile device 110. While some aspects of the mobile wallet client application 112 may be implemented at the mobile wallet computing system 150, other aspects may be hard coded into the memory of the user mobile device 110. Thus, any or all of the elements of the mobile wallet circuit 154 discussed above (e.g., a function integration circuit 210, a user interface management circuit 220, a registration circuit 230, and/or a payment processing circuit 240) may be transmitted to the user mobile device 110. As such, the mobile wallet client application 112 transmitted to the user mobile device 110 may configure the user mobile device 110 to perform any of the functions discussed above. Additionally, the transmitted mobile wallet client application 112 may include additional program logics configured to interface with existing elements of the user mobile device 110. For example, one element may enable the mobile wallet client application 112 to interact with a camera or GPS locator device associated with the user mobile device 110. Another element may provide the mobile wallet client application 112 access to information relating to various third party client applications 112 on the user mobile device (e.g., a social media application).

In some arrangements, the mobile wallet circuit 154 (or the entity, such as an app store or mobile wallet provider, through which a user downloads the app) also assigns a unique identifier for specific mobile wallet client application 112 transmitted to the user mobile device 110. This unique identifier may be communicated to a push notification service, as well as other entities (e.g., the financial institution associated with the financial institution computing system 130) to facilitate further processes discussed below.

At process 312, additional user information is retrieved. In various arrangements, after the mobile wallet client application 112 is transmitted to the user mobile device 110, the initiation process for the user's mobile wallet continues. For example, the user may activate the mobile wallet client application for the first time and be prompted to provide permission for access to other forms of information (e.g., user social media information). Upon receiving such permissions, the mobile wallet circuit 154 may request and receive such information from various third party computing systems 160 and/or user mobile device 110. Additionally, for existing account holders, the mobile wallet circuit 154 (e.g., at the mobile wallet computing system 150) may retrieve all available information pertaining to the user stored in the financial institution accounts database 134. Additionally, if, for example, the registration information received from the user at process 306 identifies additional payment vehicles associated with additional financial institutions, the mobile wallet circuit 154 may identify the financial institutions associated with the additional payment vehicles and request information pertaining to the user from the financial institution computing systems 130 associated with the financial institutions.

At process 314, services applicable to the user are identified. In various embodiments, the mobile wallet circuit 154 (e.g., via the registration circuit 230) assesses the information pertaining to the customer received at any of the processes 302-310 using predetermined criteria to generate a user profile such as those discussed above. For example, based on a payment vehicle PAN entered by the user in the registration interfaces presented to the user at 304, the mobile wallet circuit 154 may identify a payment vehicle type (e.g., a credit card, debit card, gift card, checking account, or the like), and a financial institution associated with the payment vehicle. Next, the mobile wallet circuit 154 identifies a set of services compatible with those identified characteristics. For example, some payment-related services (e.g., P2P payment services) may not be compatible with credit cards. Accordingly, if the user only wishes to provision credit cards to the mobile wallet, the mobile wallet circuit 154 may identify the credit-incompatible services as being inapplicable to the user. In another example, if the user only wishes to provision debit cards to the mobile wallet, certain integration packages associated with financial reward programs may be eliminated.

In some arrangements, after the mobile wallet circuit 154 has ruled out various incompatible services based on the characteristics of user payment vehicles and the user mobile device 110, the mobile wallet circuit 154 is configured to select a subset of compatible services that is most applicable to the user. For example, if a user transaction history indicates that the user has a tendency to over-draw a checking account, the registration circuit 230 may select an account balance alert widget provided by the financial institution to incorporate into the user's mobile wallet interfaces. This way, the user may be notified of a low account balance each time the user activates the mobile wallet client application. In another example, if, for example, social media information reveals that the user frequently posts about traveling, an integration package associated with travel-booking service (e.g., Kayak®, Travelocity®, and the like) may be selected.

In some arrangements, the mobile wallet circuit 154 determines the subset of compatible services using a statistical data comparison of available information pertaining to the user with other user data. For example, the registration circuit 230 may compare the user's profile including the user's transaction history with that of a plurality of other mobile wallet users to generate a group of other mobile wallet users having statistically similar to the user. Based on historical mobile wallet service usage data (e.g., stored in the mobile wallet database 152) of the statistically similar users, the registration circuit determines a subset of services that are most commonly used among that group for the user.

At process 316, the user's mobile wallet interfaces are configured. For example, in some arrangements, after the mobile wallet circuit 154 of the mobile wallet computing system 150 identifies the set of services, the mobile wallet circuit 154 (e.g., via the user interface management circuit 220) generates a set of user interface parameters to transmit to the user mobile device 110. The user interface parameters may comprise instructions that are executable by the processor of the user mobile device 110 that configure the user mobile device 110 to present the user with a customized set of mobile wallet interfaces upon user activation of the mobile wallet client application 112. As described below, the various interfaces presented to the user via the mobile wallet client application 112 may include depictions of various user payment vehicles and payment-related services. Accordingly, the mobile wallet circuit 154 may identify user payment vehicles to include on the various interfaces. In some arrangements, the mobile wallet circuit 154 determines the vehicles to include based on information received from the user (e.g., via the registration interfaces presented at 304). In some arrangements, the mobile wallet circuit 154 is configured to retrieve all user accounts maintained at the financial institution accounts database 134 and present all those accounts to the user regardless of whether the user indicated a preference to provision them to the mobile wallet or not.

In some arrangements, in the case of a new mobile wallet user, the mobile wallet circuit 154 is configured to act in concert with the custom credit approval circuit 138 discussed above in relation to the financial institution computing system 130 to incorporate a depiction of a new credit card account in the user's mobile wallet. For example, the custom credit approval circuit 138 may transmit the terms of the new user's newly activated digital credit card account to the mobile wallet circuit 154.

Having identified the user accounts, the mobile wallet circuit 154 may generate a graphical depictions of the user accounts (e.g., via accessing a content database) to present to the user via various mobile wallet interfaces to be described below. For example, the mobile wallet circuit 154 may retrieve carious card templates from a content database and incorporate user information (e.g., user name, account identifying information, and the like) into such templates to produce depictions of user payment vehicles. Additionally, the mobile wallet circuit 154 may also generate a graphical depiction of a new user's newly activated digital credit account created by via the processes discussed above.

In various embodiments, the mobile wallet circuit 154 may also identify a set functionalities to provide the user access to via the user's mobile wallet interfaces. For example, a user may be given access to a particular functionality by way of a graphical depiction of the functionality on the user's mobile wallet interface that enables the user to interface with program logic associated with the functionality. Accordingly, the mobile wallet circuit 154 may identify a set of graphical depictions to include in the user's mobile wallet interfaces. For example, the graphical interface may include graphical representations of various payment-related services to incorporate into the user's mobile wallet interfaces based on the set of services identified at process 314. In addition to the payment-related services, other depictions of other functionalities may be included. The other functionalities may include, for example, the ability to use a particular payment vehicle in a mobile wallet transaction, general account management functions (e.g., balance-viewing, setting account preferences, and the like), and other payment-related services. In another example, in the case of a new mobile wallet user, the mobile wallet circuit 154 may include an account activation functionality in the user's mobile wallet interfaces. The activation functionality may enable the user to indicate a preference to activate a digital credit card account from within the user's mobile wallet before receiving a physical credit card in the mail.

In some arrangements, for each payment vehicle to be presented to the user via the user's mobile wallet, the mobile wallet circuit 154 may generate a set of payment-related services and other functionalities to present to the user. Each payment vehicle then, may have an associated set of mobile wallet interface parameters indicating the positioning of various graphical depictions of various functionalities incorporated into the interface.

At process 318, user payment tokens are generated. In various arrangements, the mobile wallet circuit 154 performs a sequence to generate one or more tokens for payment vehicles to be provisioned to the user's mobile wallet and for the user's mobile device 110. For example, the mobile wallet circuit 154 may transmit user account information and user mobile device information to the token service provider computing system 140, which may generate the necessary tokens, store token-mapping information, and transmit the generated tokens to the mobile wallet computing system 150 over the network 170.

At process 320, the user's mobile wallet information is stored. For example, information identifying various user payment vehicles, user interface parameters, identified sets of services for the user, user authentication credentials, and the like may be stored in the mobile wallet database 152 in association with a user's account.

Figure 4A:
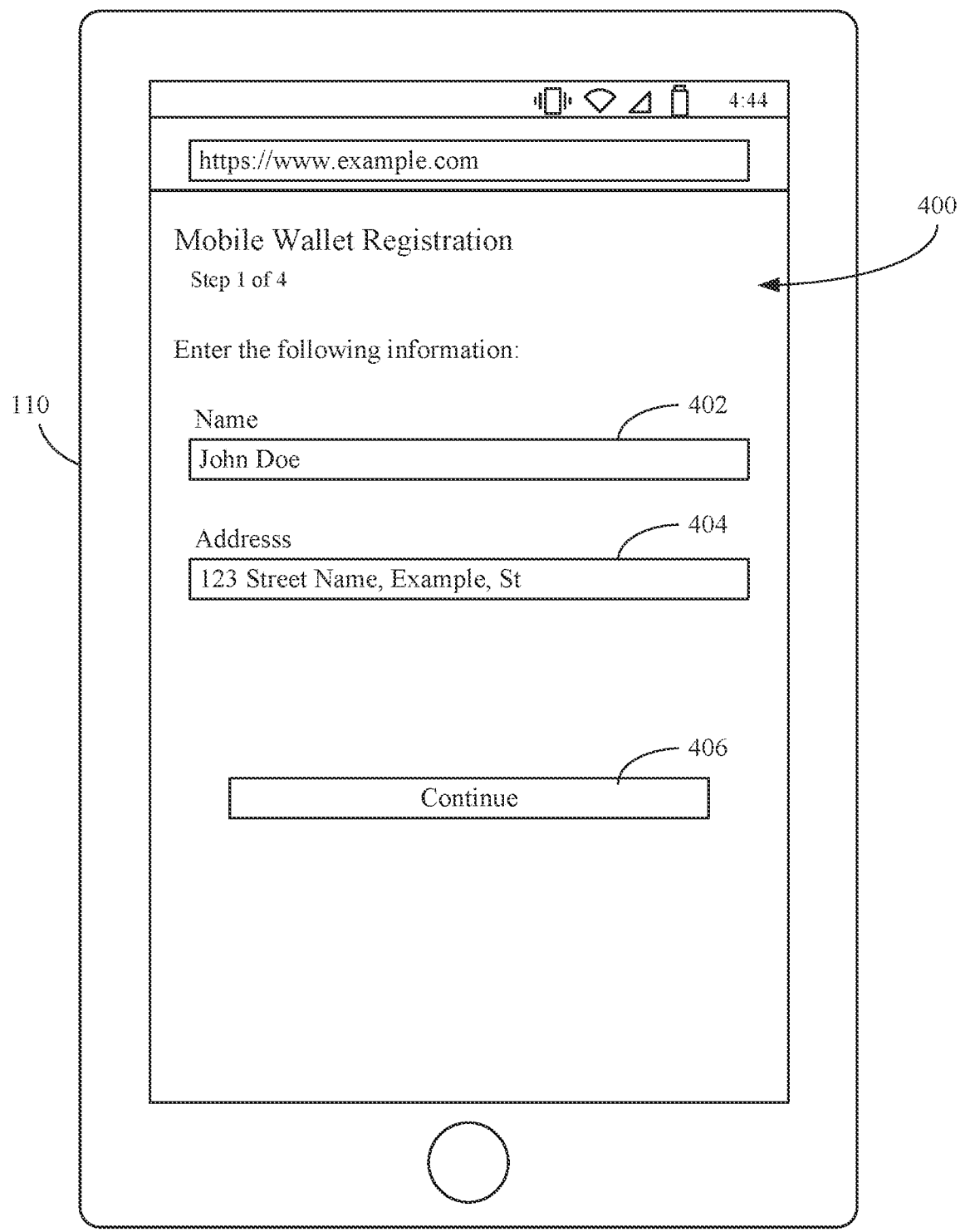
FIGS. 4A-4D are example interfaces presented to a user during a registration process for a mobile wallet.

Referring now to FIG. 4A, an exemplary registration interface 400 is shown according to an example embodiment. The interface 400 may be presented to the user during the method 300 discussed above (e.g., at process 304). The interface may be presented on the user mobile device 110 while the user mobile device 110 is implementing a web browser. As shown, the interface 400 requests information from the user. The interface 400 includes a name dialogue box 402, an address dialogue box 404, and a continue button 406. The continue button 406 causes the user mobile device 110 to transmit the entered information over the network 170 to the mobile wallet computing system 150. The mobile wallet computing system 150 may authenticate the user based on the user-input information. For example, the mobile wallet circuit 154 may receive the user input information, identify financial accounts (e.g., in the financial institution accounts database 134) associated with the user, and compare the user-input information with information stored in the accounts database 134 to authenticate the user. It should be understood that, in some arrangements, different information may be requested from the user by the interface 400. For example, in one embodiment, the interface 400 requests the user to input login credentials for a mobile banking website provided by the financial institution computing system 130.

In some arrangements, the initial registration interface presented to the user during the registration process for a mobile wallet may be different from the interface 400 discussed above. For example, initially, the user may be asked to indicate a preference to sign up for a new payment account (e.g., a credit card) with an associated financial institution (e.g., the financial institution associated with the financial institution computing system 130). In response to receiving such a preference, the mobile wallet circuit 154 may then present the user with a prompt instructing the user to provide images of required documentation (e.g., a driver's license, social security card, passport, other identification card, etc.). In response to the user taking an image of the documentation and transmitting the image to the mobile wallet circuit 154, the mobile wallet circuit 154 may in turn transmit the image to the financial institution computing system 130 for analysis by the identity verification circuit 139. Further registration interfaces for user authentication may also be presented to the user for verification purposes. For example, the mobile wallet circuit 154 may receive a query specifically generated for the new mobile wallet user by the identity verification circuit 139. The query may request the new user to input personal information (e.g., in the form of a security question). In this regard, the mobile wallet circuit 154 may receive the user's response, and route the response to the identity verification circuit 139. Alternatively, the identity verification circuit 139 transmits all verified user information (e.g., gained via a credit report or other external information service) to the mobile wallet circuit 154 for comparing the user's responses to the verified information. In yet still other arrangements, responsive to the new user indicating a preference to register for a new payment account, the mobile wallet circuit 154 may transmit a notification to the identity verification circuit 139, which may transmit the above mentioned registration interfaces to the new user.

Figure 4B:
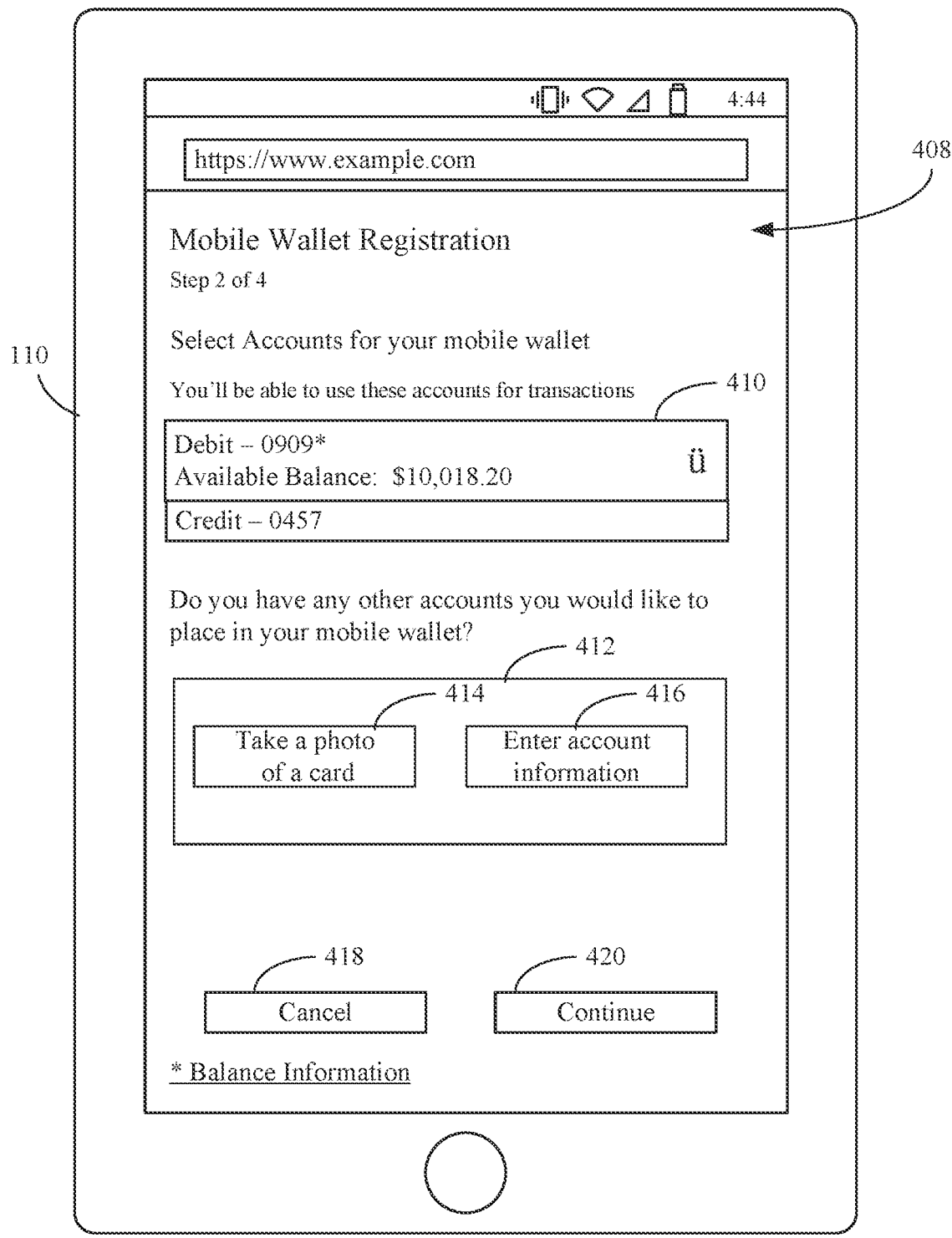

Referring to FIG. 4B, another registration interface 408 is shown according to an example embodiment. In some arrangements, the interface 408 is presented to the user after the mobile wallet computing system 150 identifies a financial account associated with the user and authenticates the user based on the information input by the user into the interface 400 discussed above in relation to FIG. 4A. As shown, the interface 408 includes an account identifier window 410, an account-entering window 412, a cancel button 418, and a continue button 420. The account identifier window 410 indicates user accounts that the mobile wallet circuit 154 has identified based on information received from the user (e.g., information input by the user into the interface 400 discussed above). The account identifier window 410 may present the user with various accounts held by the user at the financial institution associated with the financial institution computing system 130. The account-entering window 412 enables the user to input accounts other than those listed in the account identifier window 410. Accordingly, the account-entering window 412 provides a manual-entry button 416 that enables the user to manually input account information and a photo-capture button 414 enabling the user to activate a camera on the mobile device 110 to take a photo of a payment vehicle to obtain payment vehicle information (e.g., a PAN). In some arrangements, once the user enters information pertaining to a payment vehicle (e.g., via an image or manual entry) and the user is authenticated (e.g., the mobile wallet computing system 150 may identify the financial institutions associated with any account information entered by the user and transmit an authentication request to the identified financial institution), the account identifier window 410 updates to include the newly-entered account information.

In some arrangements, the user may select a payment vehicle in the account identifier window 410 and be presented with a tokenization prompt instructing the user to indicate a preference to tokenize the selected payment vehicle. If the user indicates a preference to not tokenize the selected payment vehicle, the mobile wallet computing system 150 does not generate a token for the selected payment vehicle, but still incorporates the information pertaining to the payment vehicle (e.g., account number) into the user's mobile wallet to provide the user with access to various functionalities described herein.

In the case of a new mobile wallet user, alternative account-related interfaces may be presented to the new user. For example, the user may be presented with a pre-populated account application form including various fields. The fields may request information from the user (e.g., identity information, an address, employment history, sources of income, references, etc.). In various arrangements, at least a portion of the fields are pre-populated with verified user information. For example, the identity verification circuit 139 may transmit verified user information to the mobile wallet computing system 150. In turn, the mobile wallet circuit 154 may use this information to pre-populate a subset of fields in a credit card application template. In various arrangements, all or nearly all of the fields in the credit application are pre-populated with the verified user information. For example, in one embodiment, all that a new user needs to input into the credit card application is any sources of income or expenses that are not identified by the pre-populated form. In another embodiment, the user may also have to input identification information (e.g., a social security number) into the application. Any information input by the user may be transmitted to the identity verification circuit 139 and/or custom credit approval circuit 138 to be used to verify the user and in a process for creation of a new user credit account.

Figure 4C:
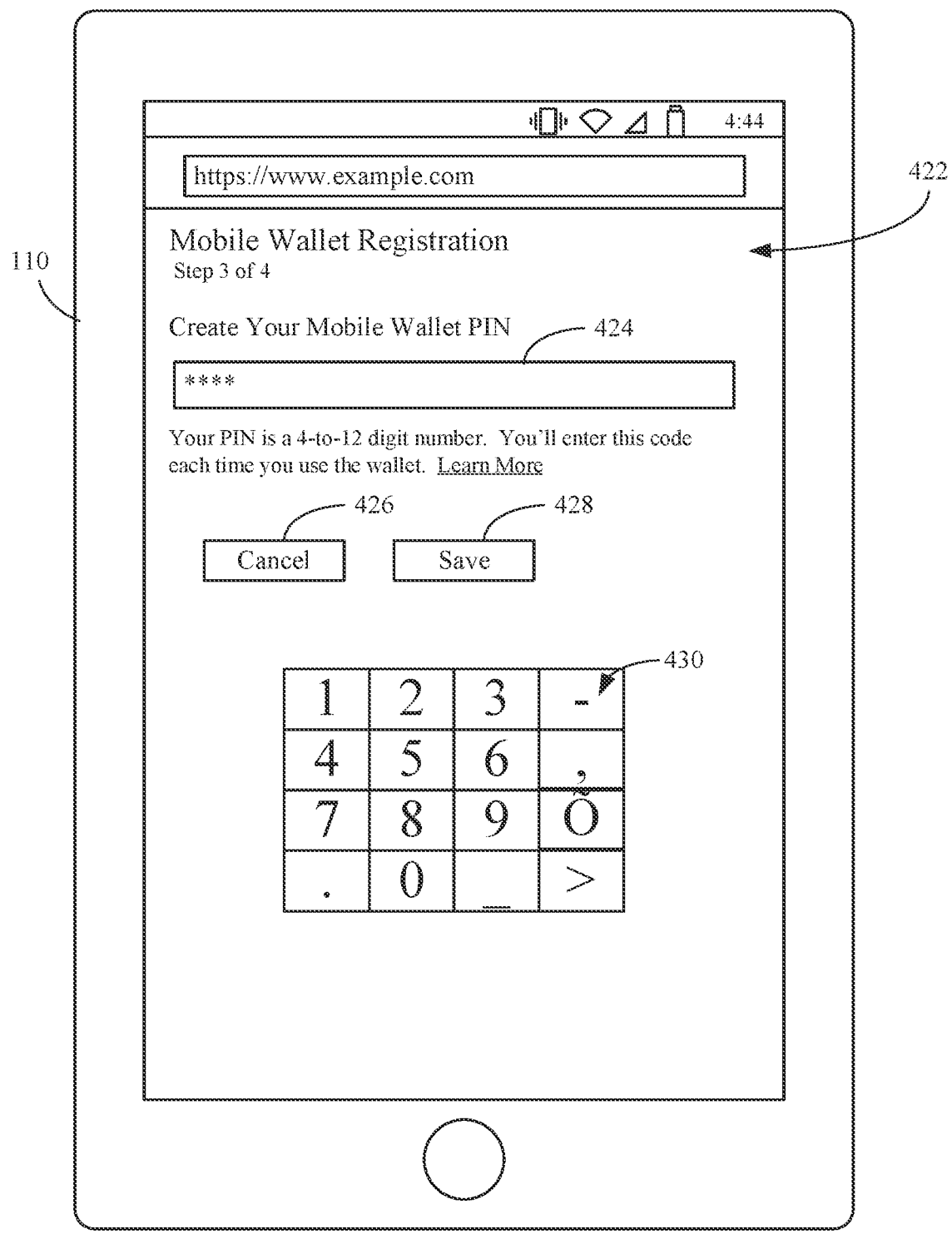

Referring now to FIG. 4C, another registration interface 422 is shown according to an example embodiment. In some arrangements, the interface 422 is presented to the user responsive to the user pressing the continue button 420 of the interface 408 discussed above. As shown, the interface 422 enables the user to establish a PIN that is used to authenticate a mobile wallet user and includes a pin-entry dialogue box 424, a cancel button 426, a save button 428 for saving a user PIN entered via user-entry graphic 430.

Figure 4D:
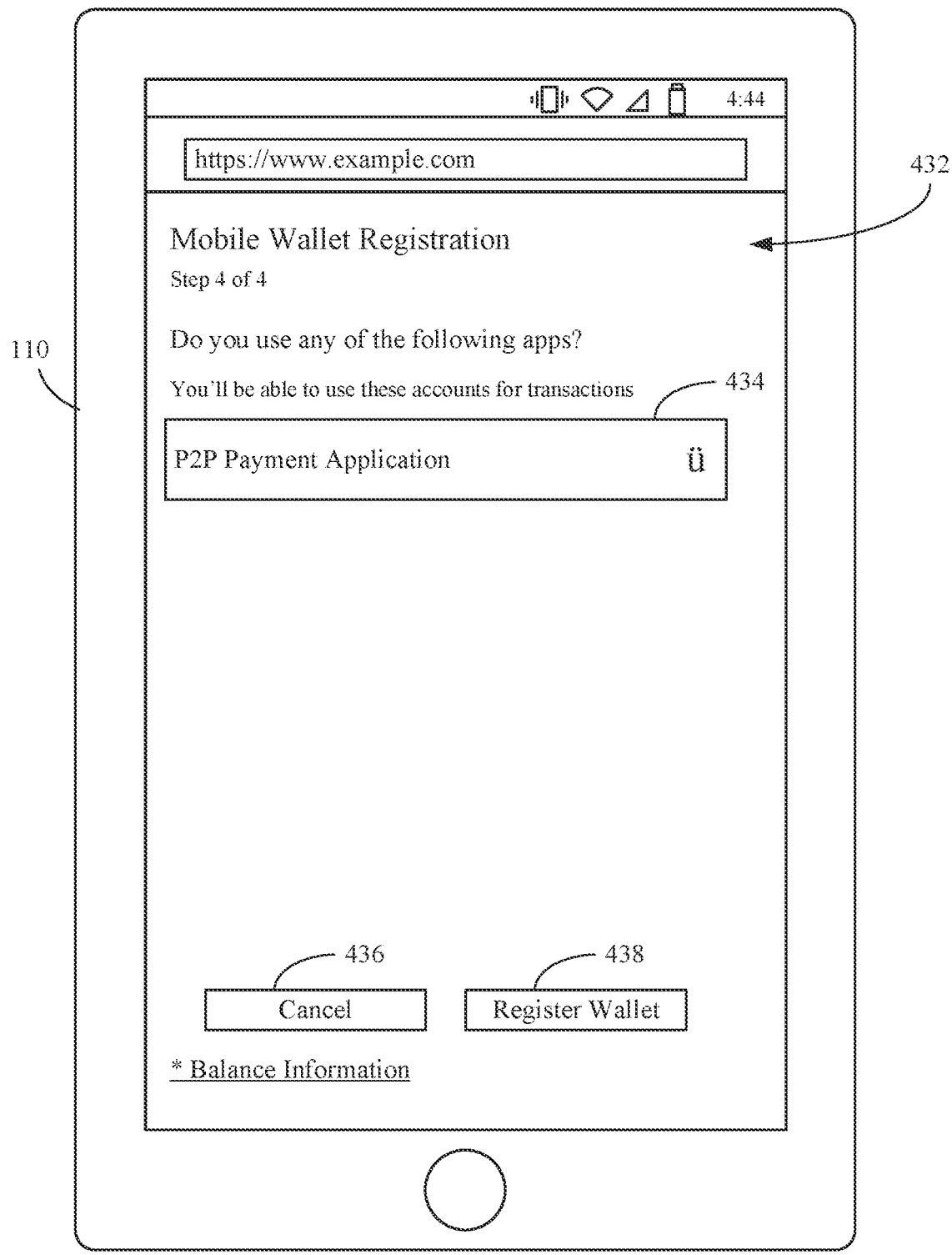

Referring now to FIG. 4D, another registration interface 432 is shown according to an example embodiment. In some arrangements, the interface 432 is presented to the user responsive to the user establishing a PIN via the registration interface 422 discussed above. As shown, the interface 432 includes a service-listing window 434, a cancel button 436, and a registration button 438. The service-listing window 434 presents the user with a list of payment-related service descriptions. For example, responsive to a user selection of the service-listing window 434, the user may be presented with a series of payment related service descriptions, and the user may select any number of the shown descriptions to indicate a preference as to which services that the user is interested in. In various arrangements, the preferences indicated by the user are used by the mobile wallet circuit 154 in the selection of payment-related services to present to the user in various mobile-wallet interfaces. The cancel button 426 enables the user to cancel the registration process. The registration button 438 causes the preferences input by the user to be transmitted to the mobile wallet computing system 150, which may perform various steps (e.g., processes 310-316 of the method 300 discussed above) to complete the user's registration for use of the mobile wallet.

In various arrangements, in situations where the new mobile wallet user is signing up for a new payment account at the financial institution, for example, further registration interfaces may be presented to the user. For example, if a particular new mobile wallet user is approved for a new credit card by the financial institution, and a digital credit card account has already been created for the user, another registration interface may enable the user to indicate a preference to activate the new account such that, upon the user's first activation of the mobile wallet client application 112 on the user mobile device 110, the digital credit card account is available for use in the user's mobile wallet. In response to the user indicating such an activation preference, a notification may be relayed to the financial institution computing system 130 so that activation procedures described below are performed to make the digital credit card account available for use.

Figure 5A:
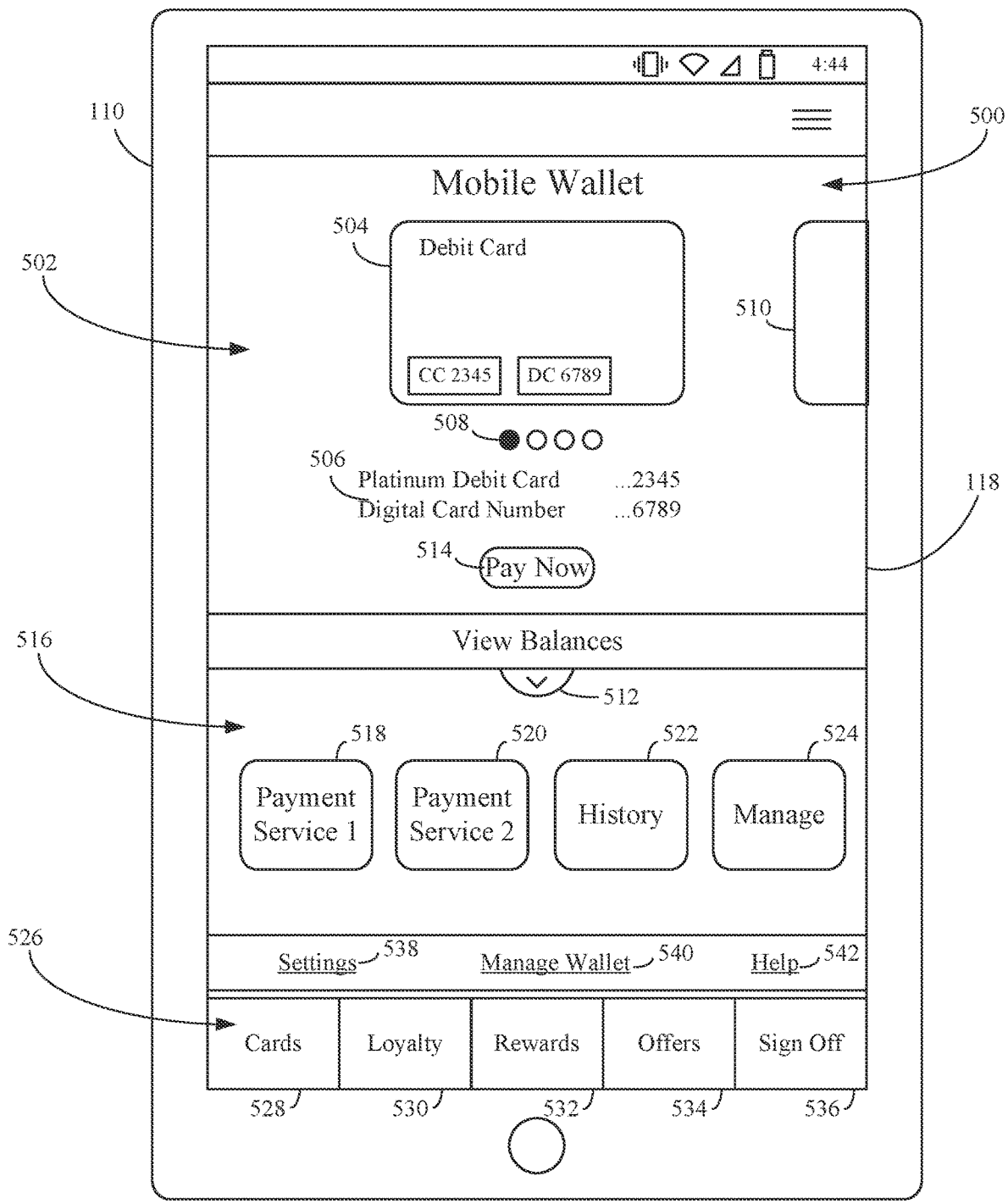
FIGS. 5A-5D are example mobile wallet interfaces presented to a user during operation of a mobile wallet on a user mobile device.

Turning now to FIG. 5A, an example mobile wallet interface 500 displayed by the user mobile device 110 is shown. In various arrangements, the interface 500 may be presented by the mobile wallet client application 112. As shown, the interface 500 includes a first field 502, a second field 516, and a third field 526. The first field 502 and the second field 516 are payment-vehicle-centric (e.g., the fields update depending on a payment vehicle that is selected by the user), while the third field is user-centric (e.g., the third field remains the same irrespective of the payment vehicle that the user has selected). It should be understood that in various other embodiments, the interface 500 may include more, less, or different fields. For example, in one embodiment, the interface 500 may only include the first field 502 and the second field 516, and the first field 502 or the second field 516 may include an option that brings the user to another interface that includes the elements of the third field 526 described below. In another example, the interface 500 includes a fourth field that indicates a status (e.g., whether the payment vehicle is provisioned to the mobile wallet) of a payment vehicle depicted in the first field 502 and enables the user to perform a transaction at a merchant using the payment vehicle or provision the payment vehicle to the user's mobile wallet.

The first field 502 enables the user to select from various payment vehicles and view information pertaining to the selected payment vehicles. As shown, it includes a first payment vehicle depiction 504, first card identifying information 506, a card selection indicator 508, a second payment vehicle depiction 510, a balance-viewing button 512, and a payment button 514. It should be understood that, as used herein, the term "depiction" is meant be interpreted broadly. Any graphical representation of any item, functionality, or entity including any sort of information to identify what is depicted is within the scope of "depiction" as used herein. The first payment vehicle depiction 504 is a graphical depiction of a first payment vehicle that the user has provisioned to the mobile wallet. In various arrangements, the first payment vehicle depiction 504 may include a selected payment vehicle that the user has chosen/designated for mobile wallet transactions. The first card identifying information 506 includes portions of various identifiers associated with the first payment vehicle (e.g., portions of a token or PAN associated with the payment vehicle).

In various embodiments, the user can alter the payment vehicle that takes the position of the first payment vehicle depiction 504 in the interface 500 by interacting with the interface 500 in various ways. As shown, the interface 500 includes a card selection indicator 508 and a second payment vehicle depiction 510. In some arrangements, the card selection indicator 508 indicates two things: the numbers of payment vehicles that the user has that are eligible for use in the mobile wallet and the position of the currently selected payment vehicle (e.g., the first payment vehicle as shown). The user updates the first field 502 by interacting with the first field. For example, in some arrangements, the user interacts with the first payment vehicle depiction 504 to remove the first payment vehicle depiction 504 from its current position and replace the first payment vehicle depiction 504 with the second payment vehicle depiction 510. The user may touch the a screen included in the user I/O device 118 corresponding to the first payment vehicle depiction 504 and swipe the screen in a direction (e.g., to the left, to the right, upwards, or downwards) so as to place the second payment vehicle depiction 510 in the position of the first payment vehicle depiction 504 as shown in the interface 500. In various arrangements, once the second payment vehicle depiction 510 is in the position of the first payment vehicle depiction 504, it is "selected" by the user for use in the mobile wallet (e.g., the user can hit the payment button 514 to initiate a mobile wallet transaction using the second payment vehicle). In various arrangements, the user can select from amongst a plurality of different payment vehicles. In some arrangements, the user may select each payment vehicle that has provisioned to the user's mobile wallet (e.g., through the registration interface 408 discussed above in relation to FIG. 4C). In other arrangements, even cards that have not been provisioned to a user mobile wallet are selectable via the first field 502.

As shown herein the various payment vehicles viewable via the first field 502 are horizontally disposed in relation one another such that the "selected" payment vehicle translates to the right or left upon the user interacting with the first field 502. In alternative arrangements, the various payment vehicles may be disposed on the interface in various directional relations to one another. For example, the payment vehicles may be vertically disposed in relation to one another, and the user would have to swipe up and down to select a new payment vehicle. In another example, all the payment vehicles may be simultaneously viewable in the first field 502, and the first field may include a selection portion. The various depictions of the various payment vehicles may be "dragged" by the user on the mobile wallet interface (e.g., the user presses a payment vehicle depiction with a finger, and moves the payment vehicle depiction to another position). To "select" a particular payment vehicle, the user may "drag" the selected payment vehicle to the selection portion included in the first field 502.

Balance-viewing button 512 enables the user to view balance information associated with the payment vehicle in the position of the first payment vehicle depiction 504. In various arrangements, responsive to the user selecting the balance-viewing button, the second field 516 may be updated to include a balance-viewing overlay whereby the user is presented with account balance information pertaining to the first payment vehicle depiction 504. For example, upon the user's selection of the balance-viewing button 512, the user mobile device 110 may transmit a balance-request to the financial institution computing system 130, which may in turn retrieve the user's balance from the accounts database 134 and transmit the balance to the user mobile device 110. Upon receipt by the user mobile device 110, the information may be viewable by the user as an overlay of the second field 516, an alternative mobile wallet interface, or as an overlay to the first field 502.

The payment button 514 enables the user to make a payment with the payment vehicle in the position of the first payment vehicle depiction 504. For example, responsive to the user selecting the payment button 514, the mobile wallet client application 112 may configure the user mobile device 110 to initiate wireless communications with a merchant point of sale device (e.g., NFC communication) to transfer a token to the point of sale device and initiate the user making a payment using a payment vehicle depicted by the first payment vehicle depiction.

The second field 516 of the interface 500 enables the user to take various actions with respect to the payment vehicles viewable in the first field 502. As shown, the second field includes a first payment service depiction 518, a second payment service depiction 520, a history button 522, and an account management button 524. The payment service depictions 518 and 520 provide access to payment-related services offered by the mobile wallet provider, financial institution, or third parties by enabling the user to activate and provide input to the software integration packages discussed above. In some arrangements, the second payment service depiction 520 may be associated with a deep linking functionality that is configured to launch a third party client application 116 associated with the depicted service on the user mobile device 110.

In some arrangements, the graphical depictions of the payment related services are associated with various integration packages that incorporate various functionalities into the mobile wallet client application 112. For example, in response to selection of such a depiction, the user may be brought to a further interface enabling the user to take advantage of a subset of functionalities accessible to the user via a separate third party client application 116 without ever leaving the mobile wallet client application. For example, the mobile wallet client application 112 may include a driving service widget and the second payment service depiction 520 may include a depiction of the driving service (e.g., Uber® or Lyft®). By selecting a payment vehicle in the first field 502 and interacting with the second payment service depiction 520, the user may cause the user mobile device 110 to communicate a ride request to the third party computing system 160 associated with the driving service (e.g., to be picked up at the user's current location and pay using the selected payment vehicle). Further, in this same example, the first payment service depiction 518 may include a link to a mobile shopping application. By selecting a payment vehicle in the first field 502 and selecting the first payment service depiction 518, the user may be brought to a further interface enabling the user to make a purchase with the selected payment vehicle. Thus, in this example, by simply selecting a payment vehicle, the user has access to a plurality of different ways to use the payment card that are accessible through a single tap on the mobile wallet interface.

The payment-related services depicted in the second field 516 may bear a relationship to the payment vehicle depicted by the first payment vehicle depiction 504. As discussed above, during the registration process for the mobile wallet, a set of payment-related services is selected for the user. This set of services may include more services than those are depicted in the second field 516 of the mobile wallet interface. Accordingly, the mobile wallet circuit 154 (e.g., via the user interface management circuit 220) or mobile wallet client application 112 may select a subset of the selected services to include in the second field 516 based on the selected payment vehicle. In some arrangements, the subset is selected based on characteristics of the selected payment vehicle. In the example shown, the selected payment vehicle is a user debit card. Accordingly, responsive to the user's selection of the debit card, the mobile wallet circuit 154 may select a set of services that are compatible with the debit card. To illustrate, the first payment service depiction 518 may include a link to a bill payment application offered by a financial institution that enables the user to pay bills using the selected debit card. The second payment service depiction 520 may depict a P2P payment widget that brings the user to another interface enabling the user to select a recipient and transfer funds to the selected recipient using the debit card.

Still referring to this example, if the user were to further manipulate the first field 502 so as to select an alternative payment vehicle such as a credit card, the service depictions 518 and 520 may update to represent different functionalities that are compatible with the credit card. Instead of depicting a bill payment application, the first payment service depiction 518 may represent a credit card rewards widget that enables the user to view the rewards that the user has earned through usage of the selected credit card. The second payment service depiction 520 may be updated to represent a mobile shopping application associated with a merchant that enables the user to earn an enhanced amount of financial rewards associated with the selected credit card (e.g., the user may earn 2% cash back at the designated merchant but only 1% cash back for all other transactions). Thus, the depictions 518 and 520 dynamically update to provide the user with access to a set functionalities that are optimized given the user's payment vehicle selection.

In various arrangements, the services presented to the user on the interface 500 may update based on user preferences. For example, by hitting the settings button 538, the user may be brought to a service selection window similar to the service-listing window 434 discussed above in relation to FIG. 4D. The service selection window enables the user to select which services that the first payment service depiction 518 and second payment service depiction 520 (and any additional service depictions included in the second field 516) represent. For example, responsive to a user selection of the service in the service selection window, user interface parameters associated with the user mobile wallet to be updated such that the selected services are viewable when the associated payment vehicle is selected by the user. For example, if the selected service is already included in the mobile wallet client application 112 (e.g., the integration package associated with the selected service was transmitted to the user mobile device 110 during the method 300 discussed above), the processor of the user mobile device 110 may update the user's interface parameters so as to expose the selected service. If the selected service is not included in the user mobile wallet client application 112, the user mobile device 110 may communicate the user's preference to the mobile wallet circuit 154, which may update the mobile wallet client application 112 to incorporate the user-identified service, and update the mobile wallet client application 112 to include the graphics and program logic associated with the selected service in the user's mobile wallet.

Alternatively or additionally, the services presented to the user on the interface 500 may update automatically based on the user's interactions with the interface 500. For example, the mobile wallet client application 112 may keep track of the user's interactions with the service depictions 518 and 520 to create historical usage data. The mobile wallet client application 112 (e.g., via either program logic stored in a system memory of the user mobile device 110 or in the mobile wallet circuit 154) may determine the user's usage rate of the depicted service and update the services depicted in association with the selected payment vehicle if the usage rate drops below a predetermined threshold. For example, the mobile wallet client application 112 may determine a probability of a user utilizing a depicted service each time the user activates the mobile wallet client application 112 based on the historical usage data. When the probability drops below a predetermined threshold, the user interface parameters associated with the user's mobile wallet may be updated to include the depiction of an alternative payment-related service. Each time the user's interfaces are updated to show a different payment-related service, the mobile wallet client application 112 may notify the user. The notification may include a description of the newly inserted service, and enable the user to set up an account with any third party if necessary.

Alternatively or additionally, the services and/or payment vehicles presented to the user on the interface 500 may dynamically update based on the user's location. For example, the mobile wallet client application 112 may receive user location data form a GPS locator associated with the user mobile device. The user's current location may be compared with baseline location information describing the location of various merchants and the like. If the processor of the user mobile device 110 or mobile wallet circuit 154 determines that the user is within a predetermined distance of a baseline location, for example, relationships between the baseline location and user payment vehicles or payment-related services may be determined. For example, if the user is close to a merchant, the processor of the mobile device or the mobile wallet circuit 154 may determine if the user has a gift card at the merchant, a mobile shopping widget associated with the merchant, or a rewards program associated with the merchant. If so, the first field 502 and the second field 516 may update to include the payment vehicles and/or payment related services related to the merchant.

Still referring to FIG. 5A, in addition to including payment service depictions 518 and 520, the second field 516 further includes depictions of more general banking services 522 and 524. As shown, the second field 516 includes a history button 522 enabling the user to view a transaction history of the selected payment vehicle and an account management button 524. The account management button 524 enables the user to manage an account associated with the payment vehicle depicted by the first payment vehicle depiction. For example, in some embodiments, the mobile wallet client application 112 may enable the user to interface with an account management circuit 136 of the financial institution computing system 130. Upon selection of the management button, the user may be brought to an interface that enables the user to set various parameters for the account (e.g., security settings and the like). In some arrangements, upon hitting the account management button 524, the user may be able to indicate a preference to activate or deactivate the selected payment vehicle. If the user indicates such a preference, the user mobile device 110 may store and transmit a deactivation preference to the financial institution computing system 130 and/or mobile wallet computing system. In response, the financial institution computing system 130 may place a hold on the account associated with the selected payment vehicle preventing the payment vehicle from being used in any kind of transactions. Additionally, the mobile wallet computing system 150 may take steps to de-tokenize the selected payment vehicle. For example, the mobile wallet computing system 150 may transmit a deactivation notification to the token service provider computing system 140 that causes the token service provider computing system 140 to deactivate (e.g., delete or otherwise render inoperable) a token stored in association with the selected payment vehicle from the token vault. In some arrangements, the token may not be deleted by the token service provider computing system 140 and/or mobile wallet computing system 150, but rather temporarily deactivated or rendered inoperable. For example, an inactivation identifier may be stored in association with the token in the token vault to prevent the token from being transmitted to, for example, the user mobile device 110 to prevent the user from completing a mobile wallet transaction with the deactivated account. Once a payment vehicle has been deactivated, the user mobile device 110 may transmit a user activation preference responsive to receiving a user preference to reactivate the selected payment vehicle and aforementioned steps may be reversed to enable the user to perform mobile wallet transactions using the selected payment vehicle.

The third field 526 provides the user with a series of user-centric functions in the mobile wallet. As shown, the third field 526 includes in interface selection button 528, a loyalty button 530, a rewards button 532, an offers button 534, a sign off button 536, a settings button 538, a wallet management button 540, and a help button 542. In some embodiments, the interface selection button 528 enables the user to select a nature of the first and second fields 502 and 516 viewable by the user. For example, in one embodiment, responsive to user selection of the interface selection button 528, the user is presented with a list of interface options. In various embodiments, the options enable the user to select the centrality of the first field 502 and the second field 516. As shown in FIG. 5A, the first and second fields 502 and 516 present the user with a payment vehicle-centric view (e.g., the panels' appearance depends on the payment vehicle selected by the user). In various arrangements, the interface options enable the user to select between a card-centric view, a payment network-centric view, and a payment service-centric view. For example, if the user selected the payment network-centric view, instead of being able to toggle between payment vehicles by interacting with the first field 502, the user is able to toggle between various payment networks/rails (e.g., Visa®, Mastercard®, and the like) in the first field 502. Various user payment cards associated with the selected payment network may be viewable by the user to be used in the mobile wallet. Upon user selection of a payment card, a second field similar to the second field 516 shown in FIG. 5A may be presented to the user. If the user selects a payment service-centric view, the user may be able to toggle between various payment-related services (e.g., mobile wallets, P2P payment services, and online shopping applications) via the first field 502. Via selection of a particular payment service via the first field 502, the second field 516 may present the user with a second panel including various functionalities (e.g., a history button 522 or account management button 524) allowing the user to set preferences pertaining to the selected service.

The loyalty button 530 enables the user to access various loyalty programs (e.g., loyalty cards or programs associated with particular merchants. The rewards button 532 presents the user with rewards that the user has earned through utilization of the mobile wallet. For example, the user may earn various rewards (e.g., points, cash back, and the like) through conducting various transactions using the payment vehicles that have been provisioned to the mobile wallet. In some arrangements, responsive to user selection of the rewards button 532, the user is presented with an interface that enables the user to allocate any earned rewards towards an upcoming mobile wallet transaction.

The sign off button 536 enables the user to exit the mobile wallet client application 112. The settings button 538 enables the user to set various parameters for the mobile wallet (e.g., default interface views, communication settings, and the like). The wallet management button 540 enables the user to perform various operations with respect to the user wallet. Operations may include, for example, the provisioning of new payment vehicles to the mobile wallet, removal of payment vehicles from the mobile wallet, authentication information (e.g., a PIN), and the like. The help button 542 allows the user to access an interface that instructs the user on how to perform the various operations described herein.

Figure 5B:
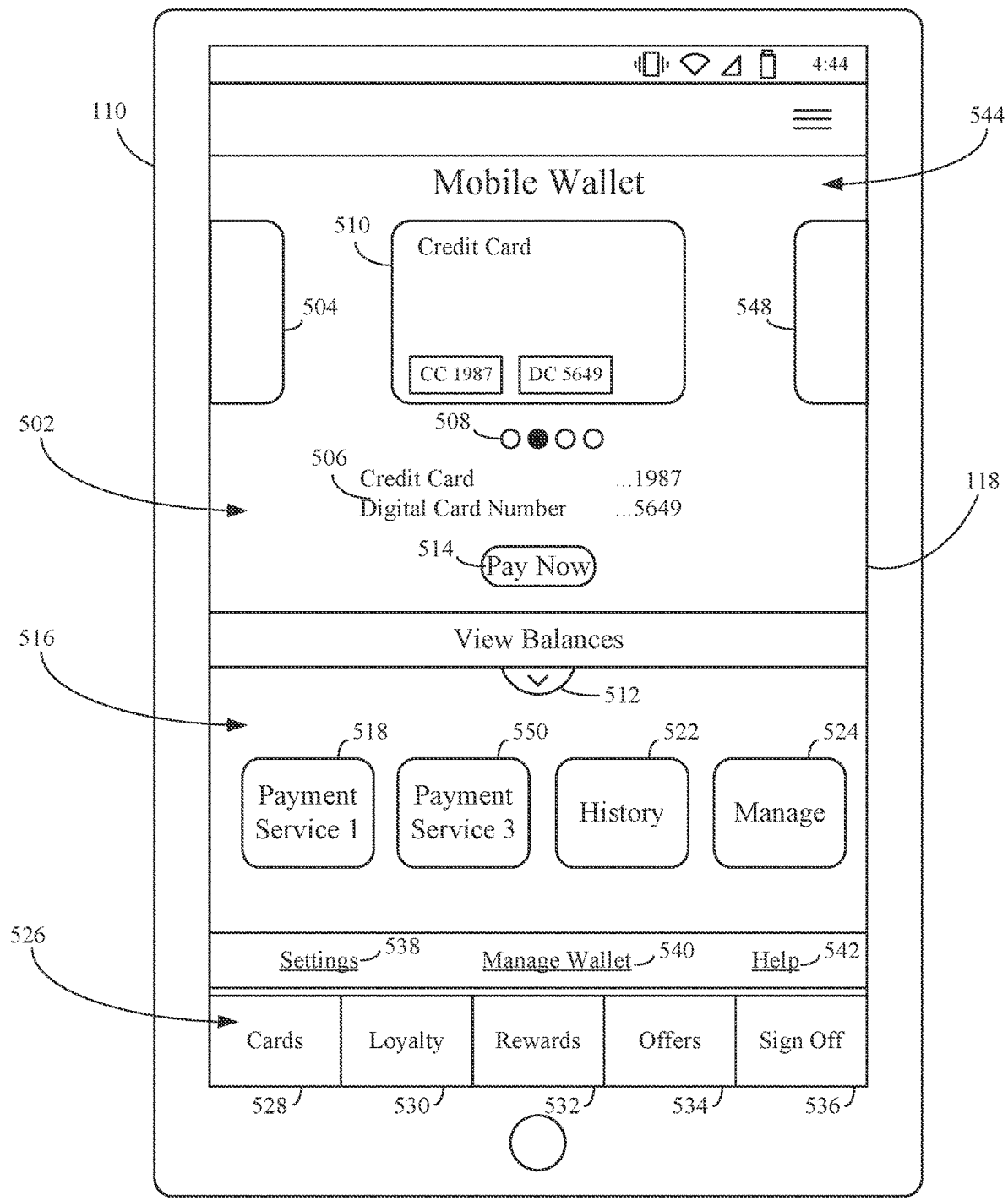

Turning now to FIG. 5B, an updated user mobile wallet interface 544 is shown according to an example embodiment. As shown, the interface 544 is similar to and shares many of the same aspects as the interface 500 discussed above in relation to FIG. 5A, but has several differences. In some arrangements an interface such as the interface 544 is presented to the after the user manipulates the first field 502 of the interface 500 to select the second payment vehicle depiction 510 shown therein. As shown, the second payment vehicle depiction 510 now occupies the position formerly occupied by the first payment vehicle depiction 504, and the first payment vehicle depiction 504 is displaced from its original position. The card selection indicator 508 has been updated to reflect the user's selection of the second payment vehicle depiction 510. Additionally, the first field 502 includes a third payment vehicle depiction 548.

In the example shown in FIGS. 5A-5B, the second payment vehicle depicted by the second payment vehicle depiction 510 is a credit card. As shown, the second field 516 of the interface 544 contrasts with the second field 516 of the interface 500 because, in the interface 500, the selected payment vehicle was a debit card. The second field 516 includes a depiction 550 of a third payment-related service instead of the depiction 520 of the second payment-related service. Such an update may be due to the different qualities of the selected payment vehicles. For example, the depiction 520 of the second payment-related service may have been a depiction of a P2P payment service (e.g., Zelle™) that is not compatible with credit cards. Accordingly, responsive to the user selection of the second payment vehicle, the depiction 520 is replaced with the third depiction 550 that depicts a credit-compatible service (e.g., an online shopping payment service such as Visa Checkout®). Thus, the second field 516 is dynamically updated so that the user is presented with payment-related services that are compatible with the selected payment vehicle. As will be appreciated, in various arrangements, the number of payment-related services depicted in the second field 516 may vary. For example, a particular user may have two payment vehicles selectable via manipulation of the first field: a credit card and a gift card. The credit card may have an associated second field 516 that includes three payment-related service depictions, such as a rewards widget enabling the user to manage financial rewards associated with the credit card, and links to two mobile shopping applications. The gift card, however, may only include a single payment-related service depiction such as a shopping application associated with the merchant at which the gift card is usable.

In some arrangements, the payment vehicles that are viewable and selectable by the user via manipulation of the first field 502 are controllable by the user. For example, in some arrangements, only payment vehicles that have been added to the user's mobile wallet are viewable in the first field 502. Thus, in order for a particular user payment vehicle to be viewable in the first field, the user would first have to provision the card to the mobile wallet via a wallet management screen (e.g., presented when the user selects the wallet management button 540 discussed above). In alternative arrangements, any user payment vehicles that have been identified as being associated with the user are viewable and selectable by the user via the first field 502. For example, if the mobile wallet computing system 150 communicates with the financial institution computing system 130 to identify various user accounts, each user account may be viewable and selectable via the first field 502 irrespective of whether the user has indicated a preference to provision the payment vehicle to a mobile wallet.

Figure 5C:
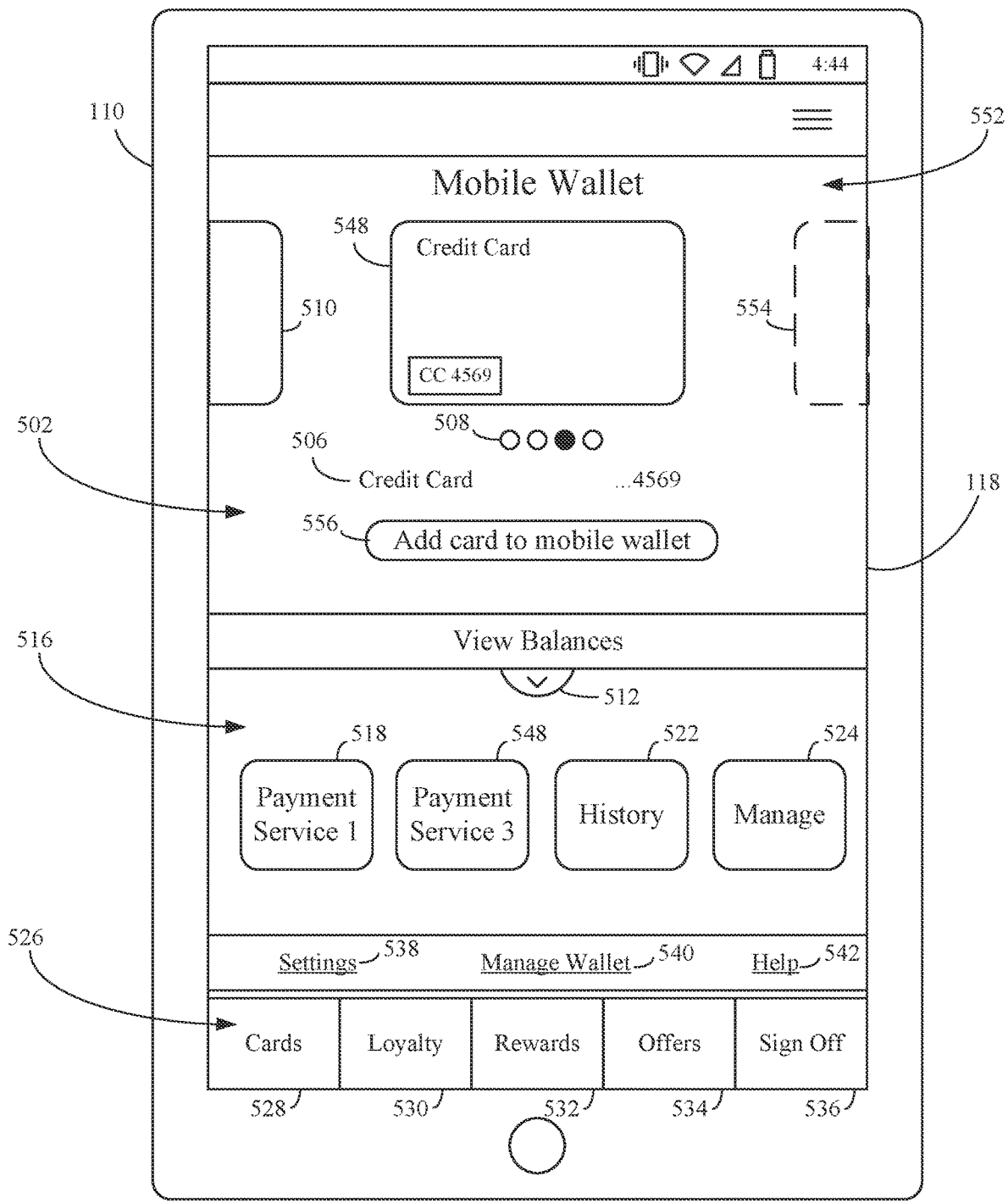

In this regard, FIG. 5C shows an updated mobile wallet interface wherein the third payment vehicle depiction 548 is associated with a payment vehicle (a credit card) that has not yet been provisioned to the user's mobile wallet. As shown, the interface 552 includes a third payment vehicle depiction 548, a fourth payment vehicle depiction 554, and a provisioning button 556. The provisioning button 556 replaces the payment button 514 included in the interfaces 400 and 544 discussed above because the third payment vehicle has not yet been added to the user's mobile wallet. In some arrangements, the provisioning button 556 initiates a tokenization process discussed above to allow the user to use the credit card for mobile wallet transactions.

This last example illustrates another benefit of the multi-function mobile wallet described herein. Because functionalities other than traditional mobile wallet features (e.g., engaging in POS transactions using the mobile device 110) are provided, the payment vehicles need not be tokenized or added to a user's mobile wallet for their inclusion to be useful. For example, the user can still take advantage of various payment-related services provided in the second field 516 using non-provisioned payment vehicles. Thus, the systems and methods disclosed herein provide for a more effective organization of user payment vehicles than current systems. The user need not access a separate application or a wholly different interface to be able to perform various actions with respect to both provisioned and non-provisioned payment vehicles. To illustrate, a user may conduct a POS transaction using a first provisioned payment vehicle, and view an account balance on a non-provisioned payment vehicle by doing nothing more than performing a swiping action in the first field 502. Such quick and efficient access to such a variety of functionalities is an improvement over existing systems.

Further in this regard, payment vehicles need not even be currently activated for their inclusion to be useful in the multi-function mobile wallet. In situations where a user temporarily deactivates a payment vehicle, such a feature is especially useful. For example, a user may, via a mobile banking application or the mobile wallet client application 112, provide an input to the financial institution computing system 130 to deactivate a payment vehicle. In response, the financial institution computing system 130 may transmit a notification to the token service provider computing system 140, which may in turn delete or otherwise render inoperable any tokens associated with the payment vehicle. Such loss of a token may cause the user payment vehicle to be removed from the user's mobile wallet in current systems. In such current systems, to make the card viewable in the user's mobile wallet once again, the user would have to re-provision the card to the mobile wallet (e.g., through an interface similar to the registration interface 408 discussed above in relation to FIG. 4B) once the card is reactivated. This is a time-consuming, burdensome, and irritating user experience. By not requiring tokenization to be viewable in the first field 502, the multi-function mobile wallet disclosed herein enables users to take various actions with respect to a payment vehicle even if the payment vehicle is deactivated.

Figure 5D:
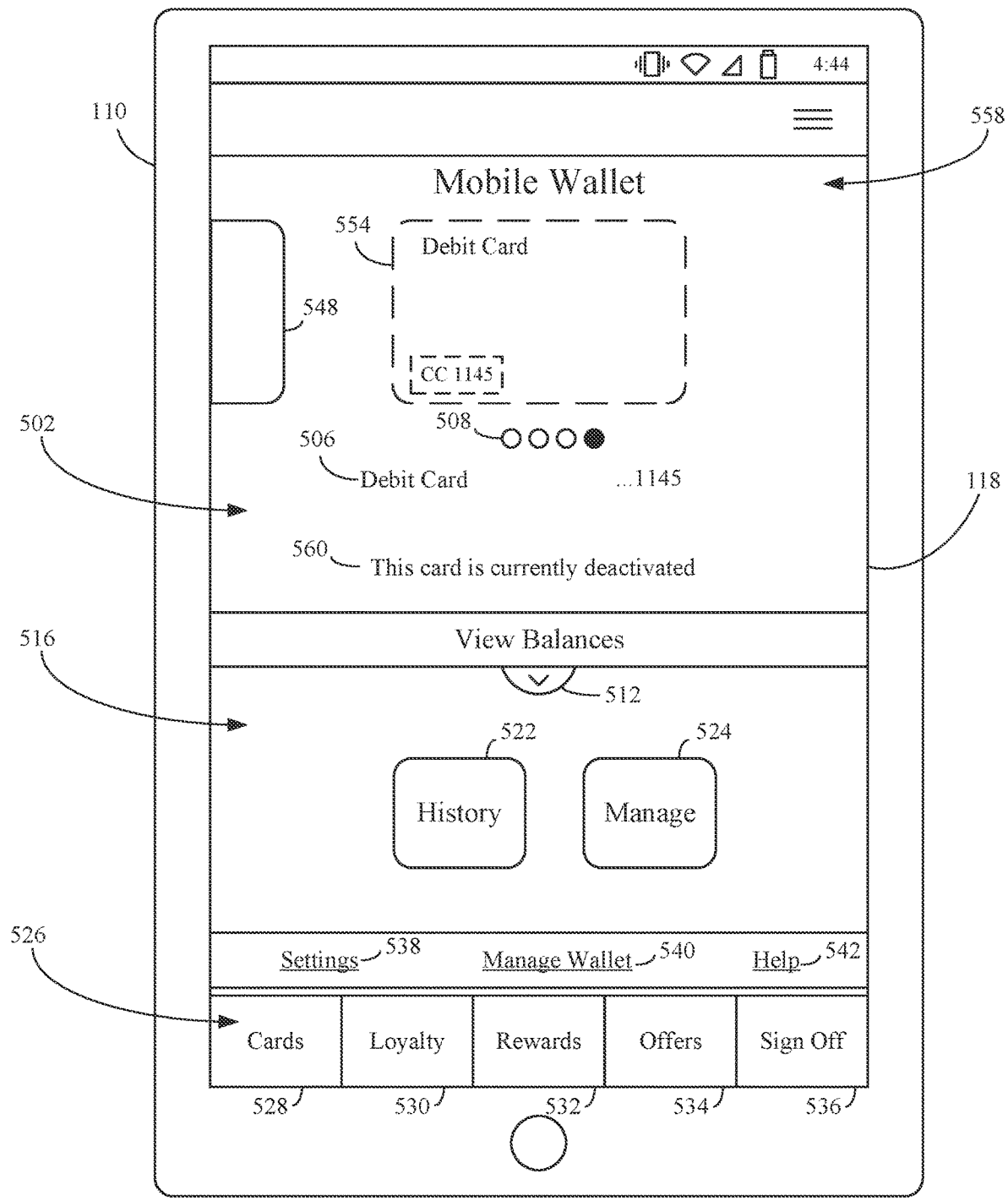

In this regard, FIG. 5D shows a mobile wallet interface 558 that includes an inactivated payment vehicle according to an example embodiment. As shown, the interface 558 includes a fourth payment vehicle depiction 554 and a deactivation indication 560. As shown in FIG. 5D, the fourth payment vehicle depiction 554 has a different characteristic than any of the first, second, or third payment vehicle depictions, 504, 510, and 548 (as indicated by the dashed line) due to its different activation. In some arrangements, the different characteristic takes the form of a color characteristic. For example, active payment vehicles (e.g., first, second, or third payment vehicle depictions, 504, 510, and 548) may be presented to the user in color form, while inactive payment vehicles (e.g., the fourth payment vehicle depiction 554) may be presented in a black and white or grayscale form. Alternative differentiation schemes are envisioned. For example, the first field 502 may be divided into various subdivisions for each classification of payment vehicle (e.g., (a) active, provisioned to mobile wallet, and default mobile wallet card; (b) active and provisioned to mobile wallet; (c) active and not provisioned to mobile wallet; and (d) inactive) displayed therein. The subdivisions may be viewable simultaneously in the first field 502, and the user may interact with one subdivision independently of any of the other subdivisions. For example, the user may toggle between the various cards within each subdivision, and press on a particular payment vehicle to select a payment vehicle. Any mode of contrast between active and inactive payment vehicles may be used in accordance with the embodiments described herein.

As shown in FIG. 5D, the second field 516 is also updated to reflect the selected payment vehicle being deactivated. In this embodiment, the second field 516 does not include any depictions of any other payment-related services, but still provides the user with access to account history via the history button 522. This prevents the user from attempting to engage in transactions using a deactivated payment vehicle, but still enables the user to perform certain functions with respect to deactivated payment vehicles. Further, the second field also includes an account management button 524. In various arrangements, the user may hit the management button, and indicate a preference to both re-activate a payment vehicle and re-add the payment card to the mobile wallet. In some arrangements, such a re-activation feature is included in the first field 502 or the second field 516. In any event, the re-activation feature is configured to provide an input to the program logic being executed by the user mobile device 110 to transmit a re-activation preference to the financial institution computing system 130. In turn, the financial institution computing system 130 may re-tokenize the deactivated payment vehicle via any of the methods disclosed herein and transmit a notification to the user mobile device 110. In response to this notification, the mobile wallet interface presented to the user may be updated to include an updated depiction of the deactivated payment vehicle as well as a payment button. That way, the user can immediately reactivate a deactivated payment vehicle. In response the interface 558 may update to resemble the interface 500 discussed above, and enable the user to use the fourth payment vehicle in various transactions.

It should be noted that any of the mobile wallet interfaces disclosed herein may include a deactivation icon as well. The deactivation icon may be included in the first field 502 or the second field 516 and be configured to provide an input to the program logic being executed by the user mobile device 110 causing the user mobile device 110 to transmit a deactivation preference to the financial institution computing system 130. Further, in response to receiving the user deactivation preference, the processor of the user mobile device 110 may update the user's mobile wallet interface to present the deactivated payment vehicle via any of the means discussed above. Thus, the mobile wallet interfaces disclosed herein update not only response to user selection of payment vehicles, but also user activation preferences as to various payment vehicles.

It is useful here to note that, in various arrangements, the mobile wallet client application 112 may cause a processor of the user mobile device 110 to undergo an initiation process each time the mobile wallet client application 112 is activated by the user. Such an initiation process may occur each time, for example, the user presses on a mobile wallet icon included on a main system screen of the user mobile device 110. Included in this initiation process, among other things, is a system sweep for user payment vehicles. For example, program logic included in the mobile wallet client application 112 may cause the processor to retrieve payment vehicle information from a system memory or storage on the user mobile device 110. The retrieved information may include, for example, account numbers (or portions thereof), tokens, the associated financial institution, an activation status of the payment vehicle, account balance information and the like. Such information may be stored in the user mobile device 110 upon completion of the registration process (e.g., the method 300) discussed above. Alternatively or additionally, the processor may transmit an information request to the mobile wallet computing system 150, financial institution computing system 130, and/or token service provider computing system 140 to request all or a portion of this information. Using this information, the processor configures the user's mobile wallet interfaces. Unlike current systems, payment vehicles not including a token or that are deactivated are still populated in the user's mobile wallet, but under a differentiation scheme. For example, un-tokenized payment vehicle interfaces may be configured to include a provisioning feature enabling the user to communicate a tokenization preference to the financial institution computing system 130, while deactivated payment vehicles may include a deactivation notification and be colored differently than the activated payment vehicles.

To summarize what is illustrated in FIGS. 5A-5D, according to the systems and methods disclosed herein, multiple classes of payment vehicles may be viewable by the user in the first field of the mobile wallet interface. In some embodiments, only active payment vehicles that have been provisioned to the mobile wallet through an account selection screen (e.g., similar to the interface 408 discussed above with respect to FIG. 4B) are viewable and selectable via the first field. In other embodiments, all active payment vehicles that have been identified by the mobile wallet computing system 150 as belonging to the user, either provisioned to the mobile wallet or not, are viewable and selectable via the first field. In yet still other embodiments, all historical payment vehicles that have been identified by the mobile wallet computing system 150 as belonging to the user, whether active or inactive, provisioned or not provisioned, are viewable and selectable via the first field. For example, in some embodiments, in the case of a brand new mobile wallet user without any existing accounts, the first field of the mobile wallet interface may only include a depiction of a single payment vehicle: a newly activated digital credit card account. Initially, the newly activated account may be accompanied by an activation preference button or the like that enables the user to indicate a preference to activate the account prior to the user receiving a physical credit card in the mail. In response to the user activating the account, the interface may update to include a payment functionality (e.g., the payment button 514) to enable the user to nearly immediately (e.g., less than 10 seconds from indicating an activation preference) use the digital credit account to complete transactions.

Figure 6:
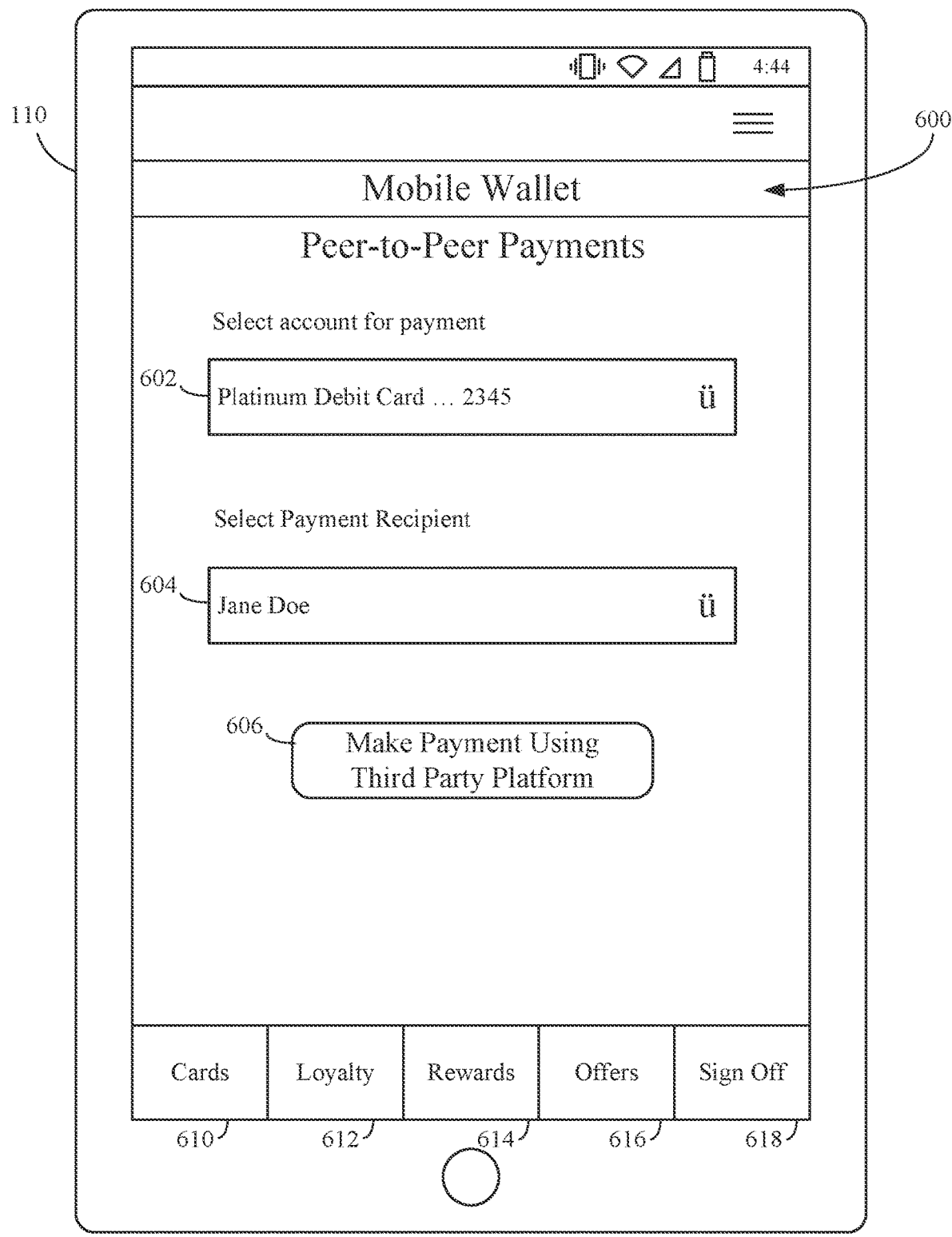
FIG. 6 is an example mobile wallet functionality interface presented to a user during operation of a mobile wallet on a user mobile device.

Referring now to FIG. 6, a payment functionality interface 600 presented to the user via the user's mobile wallet is shown according to an example embodiment. In some arrangements, the user is brought to the payment functionality interface 600 responsive to selecting a depiction of a payment-related service on a user-default mobile wallet interface such as the interface 500 shown in FIG. 5A. The interface 600 shown in FIG. 6 depicts the specific example where the user first activates the mobile wallet client application 112 on the user mobile device 110 and is brought to the interface 500 discussed above in relation to FIG. 5A. In the example, the user does not manipulate the first field 502 of the interface 500 so as to select an alternative payment vehicle to the one depicted by the first payment vehicle depiction 504. Instead, the user selects the depiction 518 of the first-payment related service, which is a person-to-person payment service provided by a third party computing system 160.

In some arrangements, the first payment service depiction 518 may be a widget pre-configured by a third party or the mobile wallet provider. Responsive to user selection of the widget, the user mobile device 110 may be communicatively coupled to the third party computing system 160 at which the payment-related service is provided. As shown, the interface 600 includes an account selection window 602, a payment recipient window 604, a payment button 606, and options 610-618. The options 610-618 are similar to options 528-538 discussed above in relation to FIG. 5A. In some arrangements, the mobile wallet client application 112 is configured to pre-populate certain fields in the functionality interface 600 based on the state of the mobile wallet interface through which the functionality interface 600 was accessed. For example, as shown, the account selection window 602 is pre-populated with the debit card that was depicted by the first payment vehicle depiction 504 of the interface 500. Thus, because the user selected the depiction 518 of the first payment-related service while a debit card was in the position of the first payment vehicle depiction 504, the functionality interface 600 pre-populates the relevant payment field with that account. In some arrangements, the user may select the account selection window 602 and be presented a list enabling the user to select an account from which to transfer funds.

The payment recipient window 604 enables the user to select from a list of recipients the person to which to transfer funds. In some arrangements, the list presented to the user by the payment recipient window is populated based on a user account with the third party. For example, the user may already have an application (e.g., a third party client application 116) provided on the user mobile device 110 that enables the user to utilize the P2P payment service. The mobile wallet client application 112 (e.g., the third party integration circuit 114) may include an API that facilitates the integration of the mobile wallet client application 112 with the third party client application 116. The API may configure the mobile wallet client application 112 to retrieve user information stored in association with the third party client application 116. The payment button 606 enables the user preferences indicated via the account selection window 602 and payment recipient window 604 to be communicated to the third party computing system 160 over the network 170. The third party computing system 160 may complete the requested transaction and communicate a notification to the user mobile device 110 that is viewable via the user's mobile wallet. Thus, the user is seamlessly provided with access to various functionalities provided at various computing systems associated with various entities without ever having to leave the mobile wallet.

Figure 7:
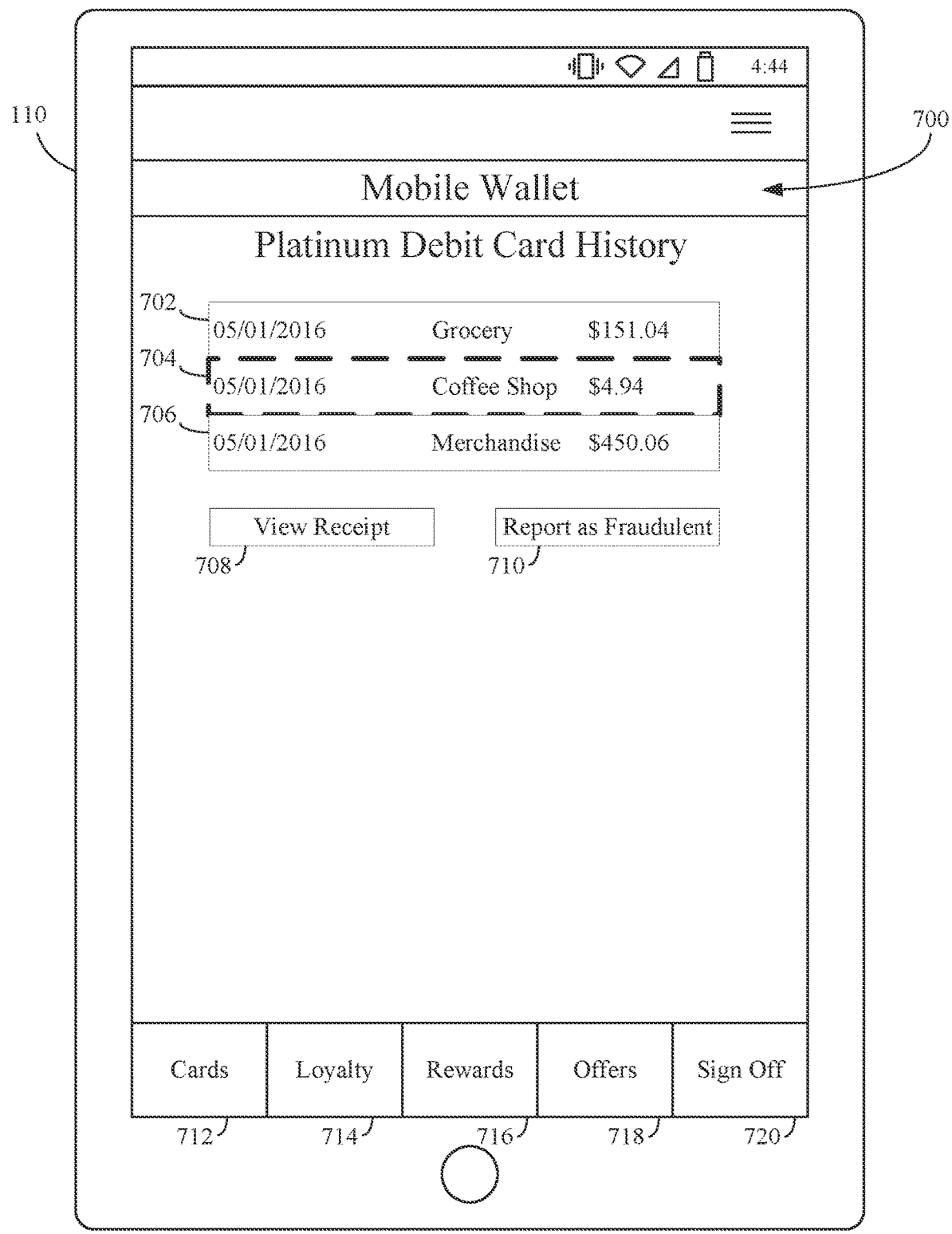
FIG. 7 is an example account history interface presented to a user during operation of a mobile wallet on a user mobile device.

Referring now to FIG. 7, a payment vehicle history interface 700 is shown according to an example embodiment. In various arrangements, the user may be brought to a payment history interface such as the interface 700 responsive to hitting the history button 522 on the interface 500 discussed above in relation to FIG. 5A. As shown, the interface 700 presents a transaction history to the user for a certain payment vehicle (e.g., the payment vehicle that was "selected" by the user when the user hit the history button 522). As such, the interface 700 includes a transaction history of the payment vehicle depicted by the first payment vehicle depiction 504.

As shown, the transaction history includes a listing of transactions 702, 704, 706 that the user has engaged in using the payment vehicle depicted by the first payment vehicle depiction 504. The interface 700 also includes a receipt button 708, and a reporting button 710. The interface also includes options 712-720 that are similar to options 528-536 discussed above in relation to FIG. 5A. As indicated by the dashed line, the user has selected the transaction 704. By selecting the transaction 704, the user can view a receipt associated with the transaction by pressing the receipt button 708 or report the transaction as fraudulent using the reporting button 710. Referring generally the systems and methods herein, the mobile wallet client application 112 may enable the user to receive and review receipts for various transactions. Such functionalities are discussed in greater detail in U.S. Ser. No. 14/464,505, filed Aug. 20, 2014 entitled "Systems and Methods for Receipt Tracking in a Mobile Wallet," hereby incorporated by reference in its entirety in this regard. Using the methods described therein, the mobile wallet client application 112 may present the user with another interface including a receipt from the selected transaction 704. By selecting the reporting button 710, the user can initiate a sequence to communicate a fraudulent transaction to the financial institution with which the payment vehicle is associated. For example, responsive to the user selecting the reporting button 710, a notification may be communicated to the mobile wallet computing system 150, which may identify the financial institution computing system 130 associated with the payment vehicle and communicate the fraudulent transaction to the financial institution computing system 130, which may in turn deactivate the user account. Responsive to the deactivation, the mobile wallet computing system 150 may update the user's mobile wallet interface such that the depiction of that payment vehicle indicates that the account is deactivated (e.g., like the payment vehicle depiction 554 discussed above in relation to FIG. 5D).

Figure 8:
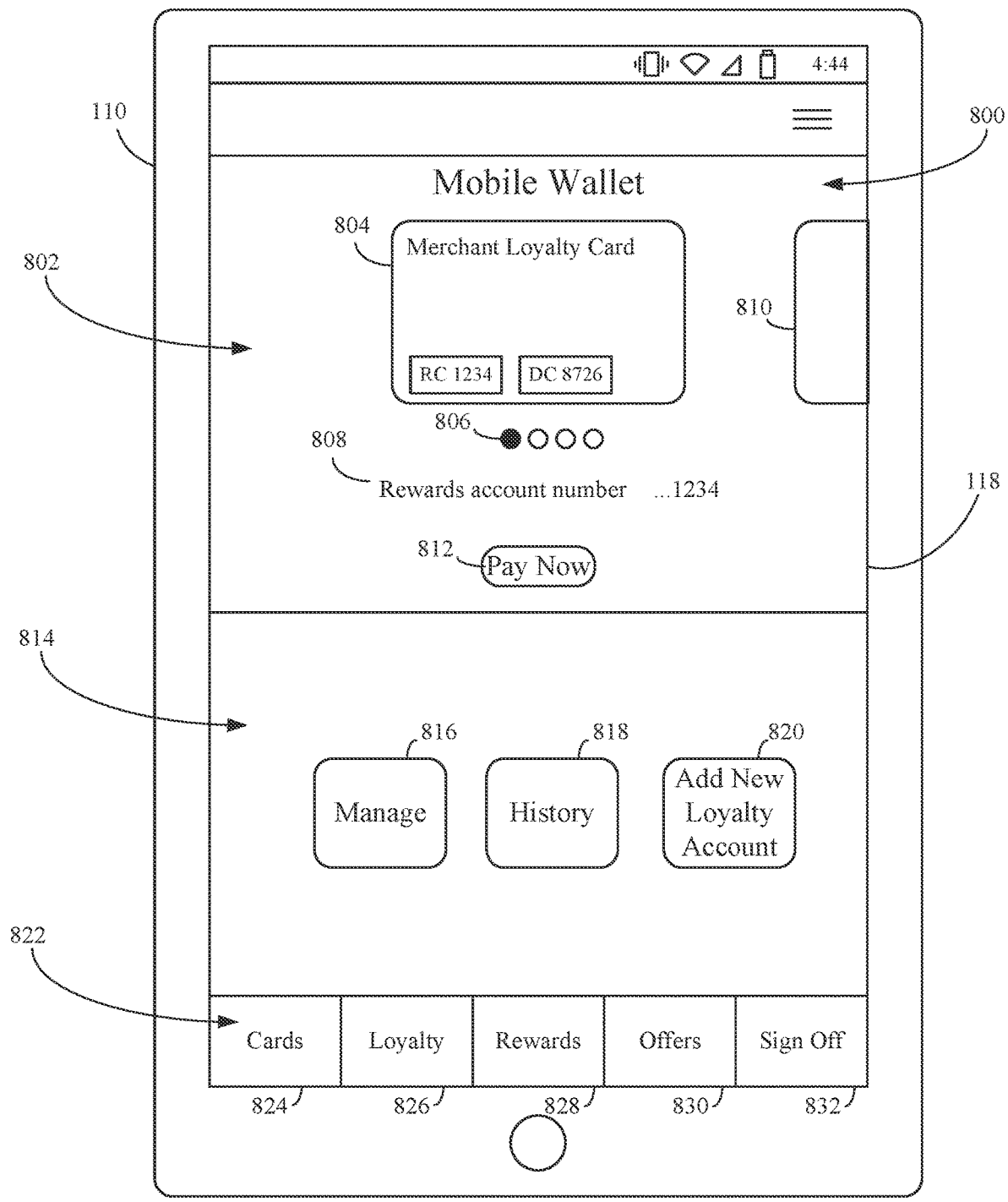
FIG. 8 is an example mobile wallet loyalty interface presented to a user during operation of a mobile wallet on a user mobile device.

Referring now to FIG. 8, an example mobile wallet loyalty interface 800 is shown according to an example embodiment. In various arrangements, the user may be brought to the loyalty interface 800 responsive to selecting any of the loyalty buttons 530, 612, or 714 discussed above in relation to the interfaces 500, 544, 552, 558, 600, and 700. As shown, the loyalty interface 800, like the interface 500 discussed above in relation to FIG. 5A, includes a first field 802, a second field 814, and a third field 822. The third field 822 is similar to the third field 526 of the interface 500 discussed above and includes options 824-832 similar to options 528-536 discussed above. The first field 802 is similar in appearance to the first field 502 discussed above, but includes depictions of user loyalty accounts rather than depictions of user payment vehicles. As shown, the first field 802 includes a first loyalty account depiction 804, an account selection indicator 806, a loyalty account number indicator 808, a second loyalty account depiction 810, and a payment button 812. The first loyalty account depiction 804 depicts a first loyalty account that the user has provisioned to the mobile wallet. Loyalty accounts may be provisioned to the mobile wallet in similar ways to payment vehicles (e.g., as described above in relation to the registration interface 408 discussed above in relation to FIG. 4B). Once provisioned to the mobile wallet, the user can initiate a process to transmit the loyalty account information to a merchant by pressing the payment button 812. Similar to the first field 502 discussed above, the user can manipulate the first field 802 so as to select another loyalty account (e.g., the second loyalty account depiction 810).

The second field 814 enables the user to perform various operations with respect to the loyalty account. The management button 816, history button 818, and addition button 820 may perform similar functionalities as discussed above in relation to general user payment vehicles. For example, by pressing the management button 816, the user may associate payment vehicles (e.g., payment vehicles that the user has provisioned to the mobile wallet) with a loyalty account such that, when the user indicates a preference to transmit the loyalty account information to a merchant (e.g., by pressing the payment button 812), both the loyalty account token and the associated payment vehicle account token are transmitted to the merchant.

In some arrangements, the loyalty interface 800 may also include various depictions of payment-related services like the interface 500 discussed above. For example, the payment related services shown in the second field 814 may bear a relationship to the loyalty program shown in the first field 802. In one embodiment, the second field 814 may include a depiction of a merchant website associated with the loyalty card such that the user can access an e-commerce portal provided by the associated merchant. Responsive to user selection of such a depiction, the user may be brought to a further interface enabling the user to purchase various products from the merchant with the user's mobile wallet.

Figure 9:
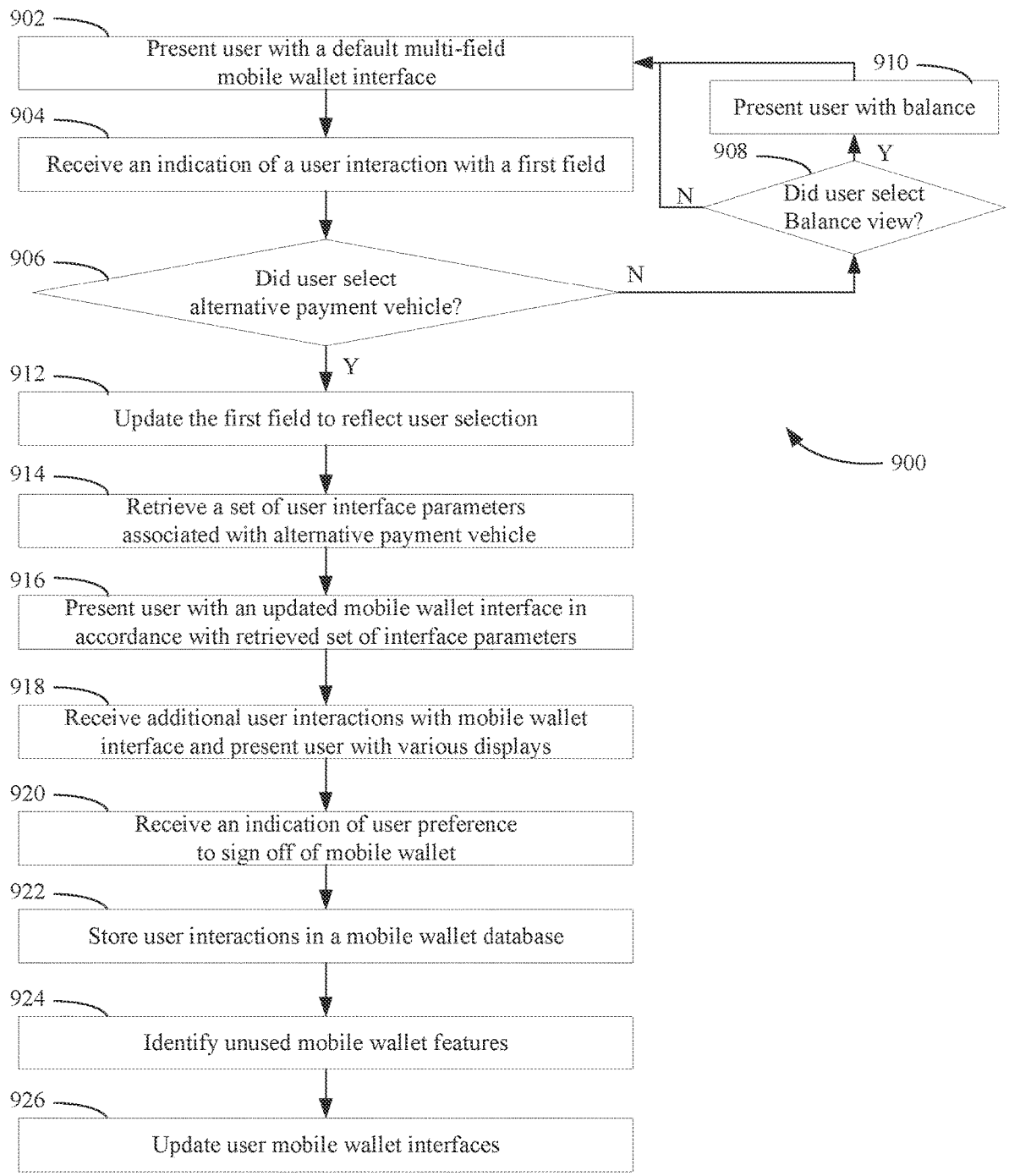
FIG. 9 is a flow diagram of a method of dynamically updating a set of functionalities accessible on a mobile wallet interface based on user interactions with a mobile wallet, according to an example embodiment.

Referring now to FIG. 9, a flow diagram of a method 900 of dynamically updating a set of functionalities accessible to a user via a mobile wallet interface according to an example embodiment is shown. Similar to the method 300, the method 900 may be performed by one or more components of FIGS. 1-2 such that reference may be made to these components in the explanation of the method 900. The description of the method below refers to a user-default mobile wallet interface. An example user-default interface is the interface 500 discussed above in relation to FIG. 5A. Accordingly, reference to various elements of the interface 500 is made below.

As will be understood, elements of the steps 902-924 discussed below may be performed at either the user mobile device 110 or the mobile wallet computing system 150 depending on the implementation of the mobile wallet client application 112. Reference is made to the processor of the user mobile device 110 performing various operations discussed below. It should be understood that any such operations may be performed by a processor of the mobile wallet computing system 150 or mobile wallet circuit 154 depending on the implementation. For example, in some arrangements, the mobile wallet client application 112 includes a native application stored in a system memory of the user mobile device 110. The native application may include, for example a library of functionalities incorporated into the user's mobile wallet by the methods described above as well as user interface parameters for various interfaces that the mobile wallet client application 112 may present to the user. The user may interact with the interface in any of the ways discussed above to communicate various preferences to the mobile wallet computing system 150 or third party computing systems 160. In some arrangements, certain user interactions cause the mobile wallet computing system 150 to update the native application on the user mobile device 110. For example, responsive to the user indicating a preference to incorporate a particular functionality into the user's mobile wallet, the mobile wallet computing system 150 may transmit an updated native application that incorporates the indicated functionality into the user's mobile wallet.

At process 902, the user is presented with a default mobile wallet interface. In some arrangements, the user selects the mobile wallet client application 112 from a main screen provided by the user mobile device 110 and is brought to the interface 500 by program logic stored in the system memory of the user mobile device 110.

In some arrangements, at least a portion of the mobile wallet client application 112 is implemented at the mobile wallet computing system 150. In such arrangements, the user may select the mobile wallet client application 112 from a main menu of the user-computing device or via a web browser, provide login credentials, and receive various aspects of the mobile wallet client application 112 from the mobile wallet computing system 150 so that the user is presented with a mobile wallet interface on the user mobile device 110. For example, program logic and interface contents may be downloaded from the mobile wallet computing system 150.

At process 904, an indication of a user interaction with the first field 502 of the interface 500 is received. For example, the user may, for example, perform a swiping action on a mobile device display within the first field 502, press a particular portion of the first field 502, or the like to provide an input that is assessed by the processor of the user mobile device 110.

At process 906, it is determined if the user selected an alternative payment vehicle. In some arrangements, the program logic being executed by the processor of the user mobile device 110, whether a part of a native application or received from the mobile wallet computing system 150, causes the processor to assess the input created by the user's interaction with the first field 502 using a predetermined threshold to determine if the user has selected an alternative payment vehicle. For example, in some embodiments, the user must swipe the first field 502 by more than a predetermined amount to indicate a selection of an alternative payment vehicle.

At process 908, if it is determined that the user has not selected an alternative payment vehicle (e.g., performed an action that is not a selection action), the program logic being executed by the processor causes the processor to determine if the user has indicated a preference to view a balance associated with the default payment vehicle (e.g., pressed the balance-viewing button 512). If so, the mobile wallet client application 112 may initiate a sequence to present balance information to the user at process 910. In some arrangements, the mobile wallet client application 112 may transmit a balance-request to the mobile wallet computing system 150 or the financial institution computing system 130 when the user indicates a balance-viewing preference, receive balance data over the network 170, and use the received information to populate a balance-viewing interface template stored at the user mobile device 110. In some arrangements, the mobile wallet computing system 150 may request the balance information from the financial institution computing system 130 when the user indicates a balance-viewing preference, and the mobile wallet circuit 154 may transmit a balance interface to the user mobile device 110 over the network 170. After the user views the balance information, the user may be again presented with the interface 500 responsive to the user indicating a preference to no longer view the balance information.

At process 912, if the user interaction with the first field indicated a preference to select an alternative payment vehicle, an updated first field is presented to the user. In various arrangements, the program logic being executed by the processor of the user mobile device 110, whether downloaded from the mobile wallet circuit 154 or native to the user mobile device 110, causes the processor to update the first field 502 such that the first payment vehicle depiction 504 and the second payment vehicle depiction 510 translate in a first direction on the mobile wallet interface 500 such that the second payment vehicle depiction 510 occupies the position formerly occupied by the first payment vehicle depiction 504. At this stage, the user may again interact with the first field 502 to select another payment vehicle and this step may be repeated until the user does not interact with the first field 502 for more than a predetermined period.

At process 914, alternative user interface parameters are retrieved based on the updated first field. For example, by interacting with the first field 502 to select an alternative payment vehicle and leaving the first field be for more than a predetermined period (e.g., a half second), the user may be issuing a command to the program logic being executed by the processor to retrieve user interface parameters associated with the selected payment vehicle. Where such parameters are stored may vary depending on the implementation. For example, the interface parameters may be retrieved from the system memory of the user mobile device 110 when the mobile wallet client application 112 is largely a native application. Alternatively, responsive to the user issuing such a command via interaction with the first field, the user mobile device 110 may initiate communications with the mobile wallet circuit 154 to receive any updated user interfaces or parameters to generate a user interface. In any event, the parameters may identify a set of graphics to display in the second field 516 of the mobile wallet interface 500 as well as the location for the graphics. The graphics may represent any of the payment-related services discussed above.

At process 916, the user is presented with an updated mobile wallet interface. In various arrangements, the updated mobile wallet interface includes an updated second field that reflects the user's selection of the alternative payment vehicle (e.g., the updated second field 516 shown in FIG. 5B). For example, based on the interface parameters obtained at process 914, the program logic being executed by the process of the user mobile device causes the processor to generate an updated second field 516 including an updated set of graphics that are presented to the user. The graphics may be linked to a set of functionalities that is different from the set of functionalities accessible to the user on the first interface presented to the user at process 902. For example, the interface may include a depiction of an alternative payment-related service as illustrated by FIG. 5B. In in some arrangements, such an updated interface is downloaded (e.g., as a separate web page) from the mobile wallet circuit 154.

At process 918, various indications of other user interactions are received and the interfaces viewable by the user are updated accordingly. For example, the user may select another payment vehicle and processes 902-916 may be repeated. Additionally, the user may select various depictions of various payment related services (e.g., the payment-related service depictions 518 and 520 of the interface 500 discussed above in relation to FIG. 5A) and the mobile wallet client application 112 may present additional interfaces to the user prompting the user to input information pertaining to those services either by native program logic or through communications with the mobile wallet computing system 150. Any of the functions discussed above in relation to FIGS. 5A-8 may be performed.

At process 920, an indication of a user preference to sign off of the mobile wallet is received. For example, the user may interact with the mobile wallet client application in a way (e.g., by pressing the sign off button 536 of the interfaces discussed above in relation to FIGS. 5A-5D) that indicates a user preference to leave the mobile wallet. Alternatively, the mobile wallet client application 112 determine that the user has not interacted with the mobile wallet client application 112 for more than a predetermined period.

At process 922, the various user interactions with the mobile wallet client application 112 prior to the indication received at process 918 are stored. For example, program logic being executed by the processor of the user mobile device 110 may cause the processor to track each user interaction with various interfaces presented to the user during processes 902-920. Each time the user interacts with any of the elements included in the interface 500, for example, the mobile wallet client application 112 may create an entry in a mobile wallet session dataset that identifies the element that the user interacted with. In some arrangements, responsive to the received indication of the user preference to sign off, this dataset is incorporated into a larger dataset tracking the user interactions of previous mobile wallet sessions. In some arrangements, this larger dataset is maintained at the user mobile device 110 in association with a native mobile wallet client application 112. In some arrangements, the dataset associated with a particular user mobile wallet session is transmitted by the user mobile device 110 to the mobile wallet computing system 150 for storage (e.g., in mobile wallet database 152) when the user indicates a preference to sign off.

At process 924, mobile wallet features that are not used by the user are identified. For example, upon storage of the user's interactions with the mobile wallet, program logic being executed by the processor of the user mobile device or the mobile wallet circuit 154 (e.g., via the user interface management circuit 220) may cause the processor to assess the larger dataset discussed above to identify any unused functionalities. For example, the mobile wallet circuit 154 or user mobile device 110 may identify if the user has accessed a particular feature presented on the user-default mobile wallet interface within a predetermined time.

In some arrangements, each time the user interacts with any of the elements including in the interface 500, an entry is added to a dataset tracking the users interactions with the mobile wallet in both the current and previous mobile wallet sessions. Each entry, for example, may identify the interaction point that the user interacted with and a timing of the user's interaction. After an entry is added to the dataset, program logic of the mobile wallet client application 112 may cause the processor to identify, based on the information in the larger dataset, an interaction point that the user has not interacted with for more than a predetermined period of time. Such an identification may occur either during the user's current mobile wallet session or after receiving the user's preference to end the session at process 920. After making the identification, the instructions may cause the processor to take steps to remove the identified element from the interface 500. In some arrangements, the program logic causes the process to remove the identified functionality during the user's current mobile wallet session (e.g., the element could be removed from the interface 500 while the user is viewing the interface 500). In some arrangements, the user's mobile wallet interface parameters are adapted after receiving the indication at process 920 such that, the next time the user accesses the mobile wallet client application 112, the user is presented with an updated mobile wallet interface not including the identified element. In some arrangements, each time the user interacts with an interaction point on the mobile wallet interface 500, a notification of the interaction is transmitted to the mobile wallet computing system 150, which may perform similar steps to identify unused functionalities.

At process 926, user mobile wallet interfaces are updated. For example, responsive to determining that the user has not accessed a particular functionality within a predetermined period, the user mobile device 110 may reconfigure the mobile wallet interface 500 such that functionality is no longer visible to the user. Alternatively or additionally, the mobile wallet client application 112 may cause the user mobile device 110 to transmit a notification indicating as much to the mobile wallet computing system 150. In response, the mobile wallet circuit 154 (e.g., via the user interface management circuit 220) may update the user interface parameters such that, the next time the user activates the mobile wallet client application 112, the interface 500 does not include the unused feature. To illustrate, if the user has not engaged in a P2P transaction (e.g., interacted with a payment-related service depiction of a P2P payment service) for more than a predetermined period, the mobile wallet circuit 154 may transmit instructions to the user mobile device 110 causing the removal of a depiction of a P2P service feature from the user's mobile wallet interface 500. In some arrangements, The user may re-add the removed feature, but re-configuration of the user's mobile wallet settings may require a heightened level of authentication than normal mobile wallet usage. For example, in addition to entering a PIN, the user may also have to input a fingerprint, username, password, and security question to change the mobile wallet settings to re-add the removed feature. This way, the feature-removal acts as an additional way to authenticate the user. To illustrate, if the mobile device 110 of a user who has removed the P2P feature from the mobile wallet is stolen, the thief will not be able to perform a P2P transaction (e.g., so as to transfer funds from the user's account) on the mobile wallet even if the thief knows the user's PIN.

In some arrangements, the mobile wallet circuit 154 is configured to replace removed features with other features. For example, responsive to removing a depiction of a particular payment-related service that has gone unused, the mobile wallet circuit 154 may be configured to identify an alternative third party payment-related service (e.g., through a process similar to the method 300 discussed above) and present that to the user in future mobile wallet sessions. For example, if the user was initially presented with a P2P payment service, the P2P payment service may be replaced with a mobile shopping functionality (e.g., based on the user profile generated by the registration circuit 230 discussed above). Upon identifying an alternative service, the mobile wallet circuit 154 may identify the integration package associated with the identified service (e.g., in the function integration circuit 210) and any graphical elements (e.g., icons, buttons, and the like) associated therewith and transmit an updated set of interface parameters to the user mobile device 110 that are configured to include the identified graphical element in the user's mobile wallet interface 500. In some arrangements, the mobile wallet circuit 154 may take steps to include functionalities that are not included in the mobile wallet client application 112 on the user mobile device 110. In such arrangements, the mobile wallet circuit 154 may generate an updated software package including the identified integration package stored at the mobile wallet computing system 150 and an updated set of user interface parameters and transmit the updated software package to the user mobile device 110 as a software update. Alternatively, the updated software package may be stored in association with the user's account at the mobile wallet database 152 such that, in future user mobile wallet sessions, the user is presented with an updated mobile wallet interface.

In various arrangements, a set of dormant, unexposed functionalities may be included in the program logic stored at the user mobile device 110. For example, the program logic transferred to the user mobile device 110 at process 310 discussed above may include not only a set of functionalities that are to be exposed to the user on the mobile wallet interfaces, but also include other dormant functionalities that are unexposed (e.g., not shown on the mobile wallet interfaces presented to the user). In response to determining that the user has not used an exposed functionality, the program logic may cause the processor of the user mobile device 110 to update the mobile wallet interface parameters to replace the depiction of the unused functionality with a depiction of one of the dormant functionalities. For example, the unexposed functionalities included in the user's mobile wallet may be stored in a particular order in the mobile device 110. The order may be based on a statistical likelihood that the user would find each unexposed functionality to be useful. This likelihood, for example, may be determined by the registration circuit 230 based on the user profile discussed above. Thus, in various arrangements, the program logic causes the processor to expose the highest ranked functionality that is yet to be exposed in the user's mobile wallet. For example, the program logic that is transmitted to the user mobile device 110 may identify a set of interaction points to expose on the user's various mobile wallet interface, as well as a set of dormant interaction points not to expose on the user's mobile wallet interface. Each interaction point may be associated with an integration package is included in the software package transmitted to the user mobile device 110. Thus, upon determining that the user has not interacted with an exposed interaction point, the highest-ranked dormant interaction point may be exposed by the mobile wallet client application 112 to provide the user with access to the functionalities provided by the associated integration package.

Figure 10:
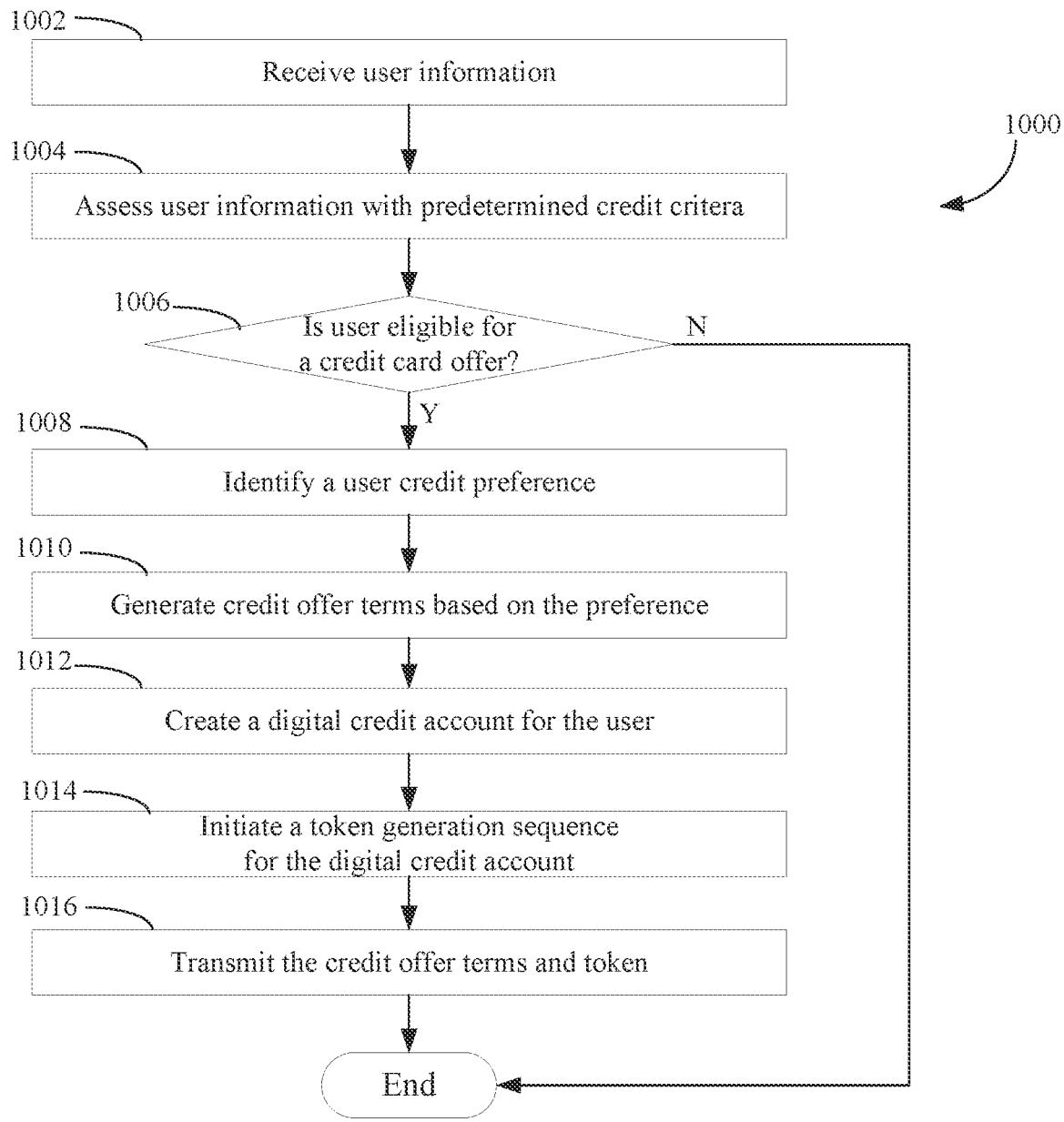
FIG. 10 is a flow diagram of a method of generating a custom credit card offer to be presented to a user via a mobile wallet, according to an example embodiment.

Referring now to FIG. 10, a flow diagram of a method 1000 of generating a custom credit card offer to be present to the user via a mobile wallet is shown according to an example embodiment. Similar to the methods 300 and 900 discussed above, the method 1000 may be performed by one or more components of FIGS. 1-2 such that reference may be made to these components in the explanation of the method 1000. For example, in some arrangements, the method 1000 is performed by an identity verification circuit 139 and a custom credit approval circuit 138 provided at the financial institution computing system 130 or the mobile wallet computing system 150. In other arrangements, the method 1000 is performed by both components (e.g., a processor, memory, or mobile wallet circuit 154) at the mobile wallet computing system 150 and the financial institution computing system 130. In some arrangements, the method 1000 is performed in solely the mobile wallet circuit 154. In such arrangements, the mobile wallet circuit 154 has similar structures and performs similar functions to the custom credit approval circuit 138 discussed above with respect to the financial institution computing system 130. In some arrangements, a portion of the steps described below may be performed by a processing circuit of the user mobile device 110.

It should be understood that the initiation of the method 1000 may take on a variety of different forms. For example, in some arrangements, the method 1000 may be periodically performed by the financial institution computing system 130 and/or mobile wallet computing system 150 for each registered mobile wallet user. In some arrangements, the method 1000 is initiated responsive to a new mobile wallet user indicating a preference to sign up for a new payment account at the financial institution during the mobile wallet registration process discussed above.

At process 1002, user information is received. In some arrangements, the custom credit approval circuit 138 retrieves information pertaining to the mobile wallet user from the financial institution accounts database 134. Retrieved information may include, for example, user financial account information (e.g., transaction histories, account balance information, and the like), user biographical information (e.g., user family information), and other user financial information (e.g., information regarding a user's mortgage). In some arrangements, information pertaining to a user mobile wallet account is also retrieved from the mobile wallet database 152. For example, the custom credit approval circuit 138 or mobile wallet circuit 154 may retrieve information pertaining to various accounts (e.g., accounts at financial institutions other than the financial institution associated with the financial institution computing system 130) that the user has provisioned to the user's mobile wallet.

In some arrangements, in the case of a new mobile wallet user, information may be obtained directly from the user. For example, the mobile wallet circuit 154, as discussed above, may receive an indication of a user preference to register for a new payment account at the financial institution. In response, the mobile wallet circuit 154 may present the user with various registration interfaces discussed above requesting, for example, scanned images of user documentation and the like. Alternatively, the mobile wallet circuit 154 may notify the financial institution computing system 130, which (e.g., via the identity verification circuit 139) may in turn transmit the registration interfaces to the user mobile device 110 and receive information input by the user into the interfaces.

In response to receiving user-input information, the identity verification circuit 139 may process the received information to ascertain the new mobile wallet user's identity. For example, if the user captured an image of a driver's license, the identity verification circuit 139 may use an image-processing algorithm to extract various user attributes (e.g., name, address, date of birth, etc.) from the image. Based on the extracted user attributes, the identity verification circuit 139 may retrieve additional user information from various other sources. For example, the identity verification circuit 139 may request a credit report from a credit bureau or other data service that accesses various government databases to formulate a profile of user information. As discussed above, this profile may be used to generate verification queries to transmit to the user mobile device 110 to be used to verify the user.

In some arrangements, in both the case of a new mobile wallet user and a previously registered mobile wallet user, additional information may be received from the user mobile device 110. For example, various APIs included in the third party integration circuit 114 of the mobile wallet client application 112 may configure the mobile wallet client application 112 to retrieve user data stored in association with third party client applications 116 and transmit the information to the financial institution computing system 130. Transmitted information may include, for example, user social media information, user content history (e.g., content that the user has accessed by a third party client application 116 associated with a content provider), and the like.

At process 1004, the user information received at process 1002 is assessed against predetermined criteria to determine the user's eligibility for a credit card offer. In some arrangements, the custom credit approval circuit 138 assesses information pertaining to a financial account held by the user at the financial institution. For example, in cases where the user has an account at the financial institution, the custom credit approval circuit 138 may assess the age of the user's financial account, as well as account balance trends to determine the user's eligibility for a credit card offer. In some arrangements, in cases of new mobile wallet users registering for an account, the custom credit approval circuit 138 may perform such an analysis on information contained in, for example, a credit report received from a credit bureau or other user information report. Information obtained pertaining to the user may be compared to threshold preconfigured by financial institution personnel to determine the user's eligibility for a credit card offer.

In some arrangements, the predetermined criteria used custom credit approval circuit 138 to access the received user information involves a process to pre-underwrite a customer for a certain level of credit. This process may be performed by accessing information stored at the financial institution computing system 130 or received from a credit bureau or other data sources. For example, for a user already holding a checking account at the financial institution, if the checking account receives a direct deposit from an employer, the custom credit approval circuit 138 may identify this as a verification of the user's income and employment. Alternatively, in the case of a new mobile wallet user registering for a new account, the custom credit approval circuit 138 may receive a scanned image of a recent paycheck from the user to serve as a verification of employment.

Having verified the user's employment or sources of income, the custom credit approval circuit 138 may further assess user account balance trends (e.g., of a checking account of a user) to project the user's ability to repay a given level of credit card debt. Further, based on the user's transaction history stored in the financial institution accounts database 134 or obtained through a credit report or other means, the custom credit approval circuit 138 may project a number of transactions that the user will use a new credit card for. Such a projection may be based on, for example, information in the user's transaction history describing payments made by the user to another financial institution for another credit card held by the user. For example, based on the amount of such payments, the custom credit approval circuit 138 may generate a projected number of user transactions. Further, such a projection may also incorporate historical data of other users having similar personal information (e.g., credit histories and the like) to the user. Based on this projected transaction number, a projected profitability for the financial institution of the new user credit card may be determined. If the projected profitability is above a predetermined threshold, for example, the financial institution may pre-underwrite the customer for a credit card.

At process 1006, it is determined if the user is eligible for a credit card offer. For example, if it is determined at process 1004 that the user information does not meet predetermined criteria for a credit card offer, the custom credit approval circuit 138 may determine that the user does not qualify for a credit card offer. In such a case, the method 1000 may end.

If the user is determined to be eligible for the credit card offer, a set of credit offer terms is selected for the customer in some arrangements. The custom credit approval circuit 138 may assign any of a series of standardized sets of credit offer terms to the customer. The standardized sets may differentiated from one another by the credit card terms (e.g., interest rates, credit limits, etc.) that they include. For example, a first standardized set may include a lower interest rate and a higher credit limit than another standardized set. In various arrangements, each standardized set may have a set of qualifications associated therewith. For example, the low interest rate set discussed above may require that the user have an existing account at the financial institution of a certain age, meet certain account balance threshold requirements, have a certain stream of positive cash flows (e.g., deposits) into the existing account, and the like. Accordingly, the user is eligible, the custom credit approval circuit 138 may compare information associated with the user's existing account with the qualifications to determine which standardized set of terms that the user qualifies for.

At process 1008, if a customer is determined to qualify for a credit card offer, a user credit preference is identified. In various arrangements, the custom credit approval circuit 138 may add to or modify the standardized set of terms selected for the user to individually tailor the credit card offer to the user. In this regard, the custom credit approval circuit 138 assesses any available information pertaining to the user (e.g., stored in the financial institution accounts database 134 or obtained from third parties like social media networks and the like) to determine at least one characteristic of a credit card that is tailored specifically to the mobile wallet user. In various examples, the particularized characteristic may be a financial reward category to associate with the credit card. To illustrate, the custom credit approval circuit 138 may assess the user's transaction history and determine that the user makes frequent purchases at a particular grocery store. In response to making such a determination, the custom credit approval circuit 138 may generate an individually-tailored financial reward program for the user whereby the user can earn rewards (e.g., cash back) by using the credit card to make purchases at the grocery store. Similar rewards may be generated using other forms of user information. For example, if the custom credit approval circuit 138 receives third party information pertaining to the user (e.g., from a social media platform), and determines that the user frequently makes posts pertaining to a particular topic (e.g., vacations), the custom credit approval circuit 138 may generate a reward pertaining to that topic (e.g., an airline miles reward).

In some arrangements, the user credit preference is based on an identified financial goal of the user. User financial goals may be related to user payment obligations or prospective purchases. For example, if the user's account information stored in the accounts database 134 indicates that the user is currently paying off a mortgage, the custom credit approval circuit 138 may determine that the user has a credit preference for a credit card reward that assists the user in paying off the mortgage (e.g., for each dollar the user spends with the new credit card, the user may earn a fixed credit towards a mortgage payment). Other rewards programs may similarly assist the user with other payment obligations (e.g., car loans, lines of credit, business loans, bill payments, and the like). In another example, the custom credit approval circuit 138 may identify a user prospective purchase based on received social media information and/or information stored in the accounts database 134. For example, if the information stored in the account database 134 indicates that the user is young and recently married, the custom credit approval circuit 138 may identify a home purchase as a prospective purchase for the user. An associated credit preference may be generated that enables the user to build up credit to qualify for a mortgage at a more favorable rate (e.g., by using the new credit card and making timely payments over a certain period of time, the user may qualify for a particular home loan). In another example, received social media information may indicate a prospective user purchase. If the received social media information indicates the user likes to travel, the custom credit approval circuit 138 may identify a travel-related financial reward to facilitate the user's traveling (e.g., airline rewards, hotel rewards, and the like).

In some arrangements, user credit preferences may include other aspects of the credit card offer. For example, if the custom credit approval circuit 138 determines that the user has a credit card account with another financial institution, the user credit preference may be a balance transfer offer at a particular interest rate. In various arrangements, the custom credit approval circuit 138 may determine that the user has a credit account at another financial institution based on the user's transaction history stored at the accounts database 134. For example, if the user makes regular payments to another financial institution, this may be an indication of another user credit account. Alternatively or additionally, the custom credit approval circuit 138 may identify an additional user credit account based on a credit report received from a credit bureau. Alternatively or additionally, the user may be able to take a picture of an existing credit card and transmit that information to the financial institution computing system 130 via the user's mobile wallet (e.g., in the registration process discussed above) to make the financial institution computing system 130 aware of another user credit card.

At process 1010, credit card offer terms are generated. Credit card offer terms may include, for example, general credit terms (e.g., interest rates, credit limits, rewards and the like) as well as the user credit preference generated at process 1008. In various arrangements, the custom credit approval circuit 138 generates credit card offer terms based on the information retrieved at process 1002. For example, based on various criteria met by the user's financial institution account maintained at the financial institution accounts database 134, the custom credit approval circuit 138 may generate a user interest rate and credit limit for a credit card to be offered to the user. Additionally, based on the identification of another user credit card, the custom credit approval circuit 138 may generate terms for an account balance transfer (e.g., for a particular amount at a particular interest rate) whereby the user can pay down the balance associated with the other credit card account with the new credit card offered by the financial institution. Additionally, the custom credit approval circuit 138 may generate a individually-tailored financial reward to offer the user. For example, if, based on information stored in the financial institution accounts database 134, the custom credit approval circuit 138 determines that the user is currently paying off a mortgage, the custom credit approval circuit 138 may generate a reward that assists the user in paying down the mortgage if the user uses the new credit card.

In various arrangements, in addition to determining the terms of the credit card to offer the user, the custom credit approval circuit 138 also generates a graphical depiction of the generated terms (or a set of mobile wallet interface parameters configured to cause the user mobile device 110 to present the user with such a depiction) at process 1010. For example, based on the generated terms, the custom credit approval circuit 138 may retrieve content (e.g., stored in a content database associated with the financial institution computing system 130 or a separate server system) that depicts the new credit card. The retrieved content may, for example, depict what a physical credit card would look like if it was issued to the user (e.g., include at least a portion of an account number) and depict the terms of the credit card offer to the user.

In some arrangements, the custom credit approval circuit 138 transmits data indicating the terms of the credit card offer. The data may be specifically formatted to induce a response by the mobile wallet client application 112 upon receipt. Upon receipt, the user mobile device 110 may incorporate the terms (e.g., as a listing) of the credit card offer into the user's mobile wallet interface as exemplified in FIG. 12 below. The user mobile device 110 may also present the user with a plurality of credit card display options that may be selectable by the user. For example, the user may be able to customize how the new credit card may be displayed upon the user's activation of the credit card options. The options may include, for example, the text of a user-generated name for the credit card, a numerical representation, a color scheme associated with the card, and the like. It should be noted that the user may similarly reconfigure the appearance of any graphical depiction of any payment vehicle (e.g., by hitting the settings button 538). Upon the user's selection of a particular option, the mobile wallet client application 112 may update the user's mobile wallet interfaces to include a depiction in accordance with the user's selected option.

At process 1012, a digital user credit card account is created. In some arrangements, once the user credit card offer terms are generated, the custom credit approval circuit 138 creates an entry in the financial institution accounts database 134 for the user. User identification information may be stored in association with the generated credit card offer terms as if the user has activated a credit card account with the generated terms. The custom credit approval circuit 138 may generate an account number and associate that number with the generated terms. Additionally, at this stage, the custom credit approval circuit 138 may store the digital user credit card account in association with an inactive status indicator. In various arrangements, the inactive status indicator may prevent the account from being used in any transaction until an activation preference is received from the user. Additionally, after creating the digital credit account, the custom credit approval circuit 138 may transmit a notification to the account management circuit 136 to initiate a sequence to generate a physical (e.g., plastic) credit card to be mailed to the new mobile wallet user for a physical card activation that can be performed separately from a digital activation via the user's mobile wallet.

At process 1014, a sequence is initiated to generate a token for the new customer credit card. In some arrangements, the custom credit approval circuit 138 transmits the newly-generated account number over the network 170 to the token service provider computing system 140. In various arrangements, the account number is transmitted in such a way that the account number is identified as a pre-approved digital credit card account. For example, a specifically formatted indicator may be transmitted to the token service provider computing system 140 that identifies the account as a preapproved digital account. Such an indicator may cause the token service provider computing system 140 to provision a token for the digital credit card account even though the account has not yet been activated by the user. For example, there may be an arrangement between the financial institution and the token service provider whereby the token service provider agrees to configure the token service provider computing system 140 to generate a token for account numbers transmitted in association with such an indicator. Accordingly, responsive to receiving the digital credit card account number, the token service provider computing system 140 generates a token for the account number and stores the token in a database (e.g., a token vault). The generated token is the transmitted back, for example, to the financial institution computing system 130 where it is stored in association with the digital user credit card account created at process 1012.

In some arrangements, process 1014 is omitted from the method 1000. For example, the new digital credit card account may be tokenized after the user indicates a preference to activate the account from within the user's mobile wallet (e.g., during the method 1100 discussed below).

At process 1016, the credit card offer terms and any tokens are transmitted. In some arrangements, the terms and token are transmitted over the network 170 to the mobile wallet computing system 150. In some arrangements, the custom credit approval circuit 138 communicates the generated offer terms to the mobile wallet circuit 154 for presentation to a user by methods described below. It should be understood that, in some arrangements, where, for example, the custom credit approval circuit 138 is provided in the mobile wallet circuit 154, the process 1016 may be omitted form the method 1000.

Figure 11:
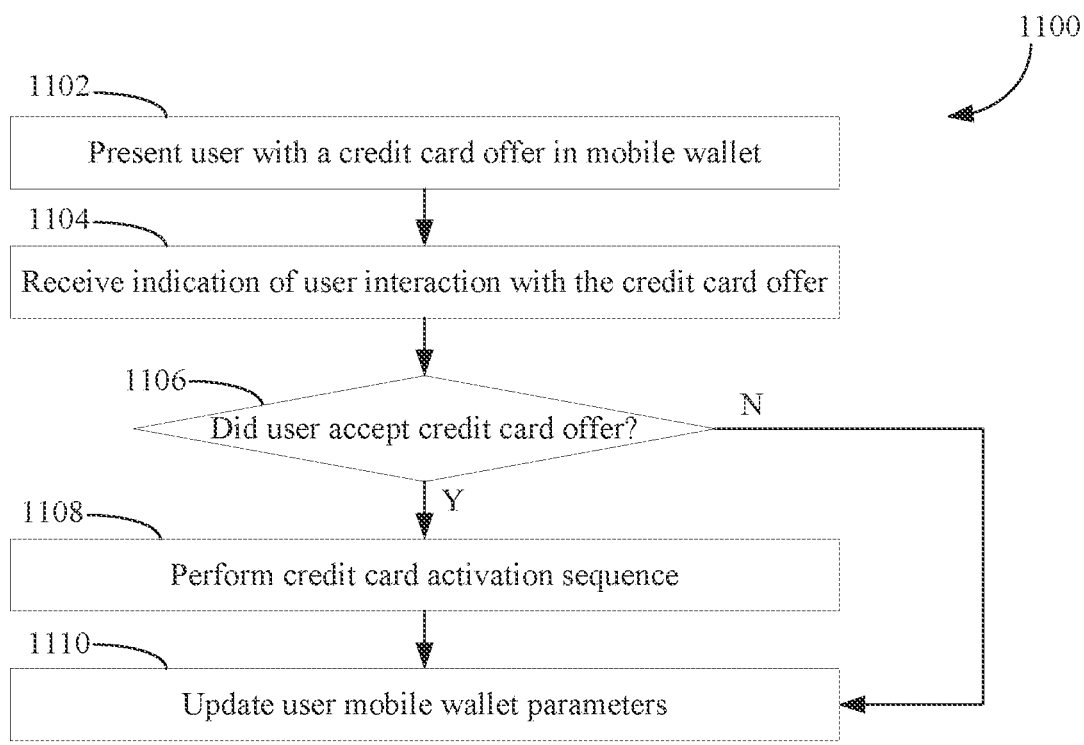
FIG. 11 is a flow diagram of a method of activating the credit card account generated through the method of FIG. 10, according to an example embodiment.

Referring now to FIG. 11, a flow diagram of a method 1100 of activating a user credit card for instant use in a user mobile wallet is shown according to an example embodiment. Similar to the methods 300 and 900 discussed above, the method 1000 may be performed by one or more components of FIGS. 1-2 such that reference may be made to these components in the explanation of the method 1100.

At process 1102, the credit card offer is presented to the user. In some arrangements, the custom credit approval circuit 138 initiates a sequence to communicate the credit offer to the user. This sequence may both provide the user with a push notification as well as result in the user being able to view the offered credit card in the user's mobile wallet. Such a process may involve a number of steps. First, after approving the user for a credit card offer and generating terms via the method 1000 discussed above, the custom credit approval circuit 138 may generate a push notification of the credit card offer. To do this, the custom credit approval circuit may construct a message containing at least some of the terms of the credit card offer discussed above. To ensure that the message is directed to the user mobile device 110, the custom credit approval circuit 138 may retrieve a unique identifier associated with the user's mobile wallet client application 112 from the financial institution accounts database 134 and package the unique identifier with the generated message. The custom credit approval circuit 138 may then transmit the package to a push notification service associated with the mobile wallet computing system 150, which may in turn transmit the push notification to the user mobile device 110. Alternatively, the financial institution computing system 130 may transmit the message to the mobile wallet computing system 150, which may in turn initiate communications with push notification service to transmit the notification to the user mobile device 110. Alternatively, there may be no push notification service, and the mobile wallet computing system 150 (e.g., via the mobile wallet circuit 154) or financial institution computing system 130 (e.g., via the account management circuit 136) transmits the push notification directly to the user mobile device 110.

In various arrangements, the mobile wallet computing system 150 may have an agreement with a push notification service whereby the push notification service may provide an API and/or SDK to be integrated into the mobile wallet client application 112 to facilitate the mobile wallet client application 112 communicating with the push notification service. Also in accordance with the agreement, when the user installs the mobile wallet client application 112 on the user mobile device 110, a device-specific unique identifier is assigned to the user by the mobile wallet computing system 150 or the app store from which the application was downloaded. This unique identifier is provided to the push notification service and stored such that, when the push notification service receives the message generated by the financial institution computing system 130 containing the credit card offer terms and the user's unique identifier, the push notification service "pushes" the message to the user mobile device 110. In various arrangements, the mobile wallet computing system 150 can perform any of the operations discussed above with respect to the push notification service.

When the user mobile device 110 receives the message generated by the financial institution computing system 130, the operating system or other software library of the user mobile device 110 may call a response function of the mobile wallet client application 112. The response function causes a viewable notification or message to be viewable on the user mobile device 110. The message may notify the user of the pre-approval for the credit card offer. Additionally, responsive to receiving the push notification, the mobile wallet client application 112 may update the user's interface parameters to include a graphical depiction of the terms of the credit card offer included in the received push notification. For example, the native mobile wallet client application 112 on the user mobile device 110 may include a credit card offer template. Responsive to receiving the push notification, the credit card template may be populated with the offer terms contained in the push notification and included in the first field of the user's mobile wallet interface. An example interface included such a depiction will be discussed below in relation to FIG. 12.

In another example, responsive to receiving the push notification, the mobile wallet client application 112 may transmit a credit-offer notification to the mobile wallet computing system 150 to receive more information pertaining to the credit card offer. The mobile wallet circuit 154 may transmit credit card offer information received from the financial institution computing system 130 to the user mobile device 110 responsive to receiving the credit-offer notification. The user mobile device 110 may receive the credit offer information, and, via the mobile wallet client application 112, incorporate a depiction of the credit offer information into the user's mobile wallet interfaces. As will be appreciated, this sequence (i.e. the mobile wallet computing system 150 transmitting information to the user mobile device 110) may be performed without the push notification process. For example, in some embodiments, the user is not notified of being pre-approved for the credit card offer. Rather, the credit card offer simply shows up as a payment vehicle in the first field of the user's mobile wallet interface, and is viewable by the user the next time the user activates the mobile wallet client application 112.

In some arrangements, process 1102 is performed when the user activates a newly-installed mobile wallet client application 112 on the user mobile device. For example, after a new mobile wallet user indicates a preference to register for a new account with the financial institution, performs the registration processes discussed above, and a new digital credit card account is created for the user via the method 1000 discussed above, the new user's mobile wallet is preconfigured to include a depiction of the user's new digital credit card account. Thus, upon activation of the mobile wallet client application 112, the user may be presented with the ability to activate the new digital credit account. This may occur well before the user receives any physical credit cards associated with the new account from the financial institution in the mail.

At process 1104, an indication of a user interaction with the presented credit card offer is received. For example, the user may view a mobile wallet interface (such as the interface 1200 discussed below in relation to FIG. 12) that includes the credit card offer. The first field of this mobile wallet interface may enable the user to indicate a preference as to the credit card offer (e.g., accept or reject the offer). The user may interact with the interface to indicate such a preference and, by so doing, provide inputs to the program logic of the mobile wallet client application 112 being executed by the processor of the user mobile device 110. The inputs may cause the user mobile device 110 to communicate the indicated preference to the financial institution computing system 130 over the network 170 (e.g., via an API) or the mobile wallet computing system 150. The mobile wallet computing system 150 may in turn communicate the user's indicated preference to the financial institution computing system 130.

At process 1106, it is determined if the user accepted the offer based on the preference received at process 1104. For example, the input provided by the user as a result of interacting with the credit card offer may vary depending on whether the user indicated an acceptance preference or a declination preference. Thus the financial institution computing system 130 (e.g., by the custom credit approval circuit 138 or the account management circuit 136) may determine if the user accepted the offer based on the nature the communication received from either the user mobile device 110 or the mobile wallet computing system 150.

At process 1108, in response to the user accepting the credit card offer, a credit card activation sequence is initiated. For example, responsive to receiving the notification of the user's acceptance of the offer, the account management circuit 136 may update the account database 134 to activate the user's new account. For example, the account management circuit 136 may remove the inactive status indicator discussed above from the user's digital credit card account to enable the account to be used for the completion of transactions. Additionally, after activating the user's account, the financial institution computing system 130 may notify the mobile wallet computing system 150.

In some arrangements, responsive to the user accepting the offer, a sequence to tokenize the digital credit card account is performed. The financial institution computing system 130 may perform similar steps as those discussed above in relation to process 1014 of the method 1000 discussed above and transmit any received tokens to the mobile wallet computing system 150.

At process 1110, the user's mobile wallet parameters are updated to reflect the activation of the new user credit card. In some arrangements, responsive to receiving an indication that the user's new credit card has been activated by the financial institution computing system 130, the mobile wallet circuit 154 may transmit an activation signal to the user mobile device 110. The activation signal may configure the mobile wallet client application 112 to incorporate various features into the mobile wallet interface associated with the new credit card. For example, the mobile wallet interface may include a payment button enabling the user to engage in mobile wallet transactions using the newly activated credit account and include the token received from the financial institution computing system 130.

It should be noted that, in accordance with the systems and methods disclosed herein, the processes 1104-1110 of the method 1000 discussed above (i.e., the time period between the user indicating a preference to activate the digital credit card account and the user's mobile wallet being updated to enable the user to perform a transaction with an account) take a relatively short amount of time to complete. In some embodiments, processes 1104-1110 take place in a matter of ten minutes or less. In other embodiments, processes 1104-1110 take a matter take places in a matter of five minutes or less. In yet still other embodiments, processes 1104-1110 take place in under ten seconds. In yet still other embodiments, processes 1104-1110 take place in a time period between two to four seconds.

To summarize the foregoing, in operation, the systems and methods disclosed herein enable the following example process to be performed for a user to activate a new account at the financial institution as well as a mobile wallet. A user visits a website associated with the financial institution and/or mobile wallet provider via the user mobile device 110 and indicates a preference to register for an account. In response, the mobile wallet computing system 150 transmits various information requests to the user. The requests may ask the user for images of a driver's license as well as an image of the user's face. The user activates a camera on the mobile device 110, takes the requested images, inputs any additional requested information (e.g., social security number), and causes the user mobile device 110 to transfer the user-input information to the mobile wallet computing system 150 and/or financial institution computing system 130. In turn, the user's identity is verified. For example, the financial institution computing system 130 may verify the authenticity of the user's driver's license by comparing the image of the user's license to a template and the image of the user's face, request information from other sources (e.g., credit bureaus, social media websites, mobile phone carriers, and the like), and transmit verification queries to the user based on the requested information to verify the identity of the user. Having verified the user's identity, the financial institution computing system 130 may request additional information from the user and/or other sources to pre-populate a credit application. Using the credit application data, the financial institution computing system 130 pre-underwrites the customer for a credit card by assessing the user's information with predetermined criteria. The financial institution computing system 130 then creates a digital credit card account number for the user, tokenizes the account number, and updates the user's mobile wallet interface parameters such that a depiction of the digital credit card account number shows up upon the user activating the user's new mobile wallet. The depiction may include an activation functionality enabling the user to activate the digital credit card account. Upon the user activating the account, the account is available for use within a matter of seconds.

Technically and beneficially, this process streamlines the process of activating a credit card. Rather than receiving a paper application in the mail or having to initiate the application process, the user is notified that they have been pre-approved. What is more, because the notification is linked to the user's mobile wallet client application 112, the user can immediately accept the offer by activating the mobile wallet client application (e.g., by pressing the received push notification), manipulating the mobile wallet interface to view the credit card offer (e.g., swiping the first field), and hitting "accept." Upon hitting "accept", the offered credit card is almost immediately available for use. In other words, rather than being notified of a credit card offer, having to fill out an application, and wait for an approval, the user activates a credit card and can use it almost instantly.

Figure 12:
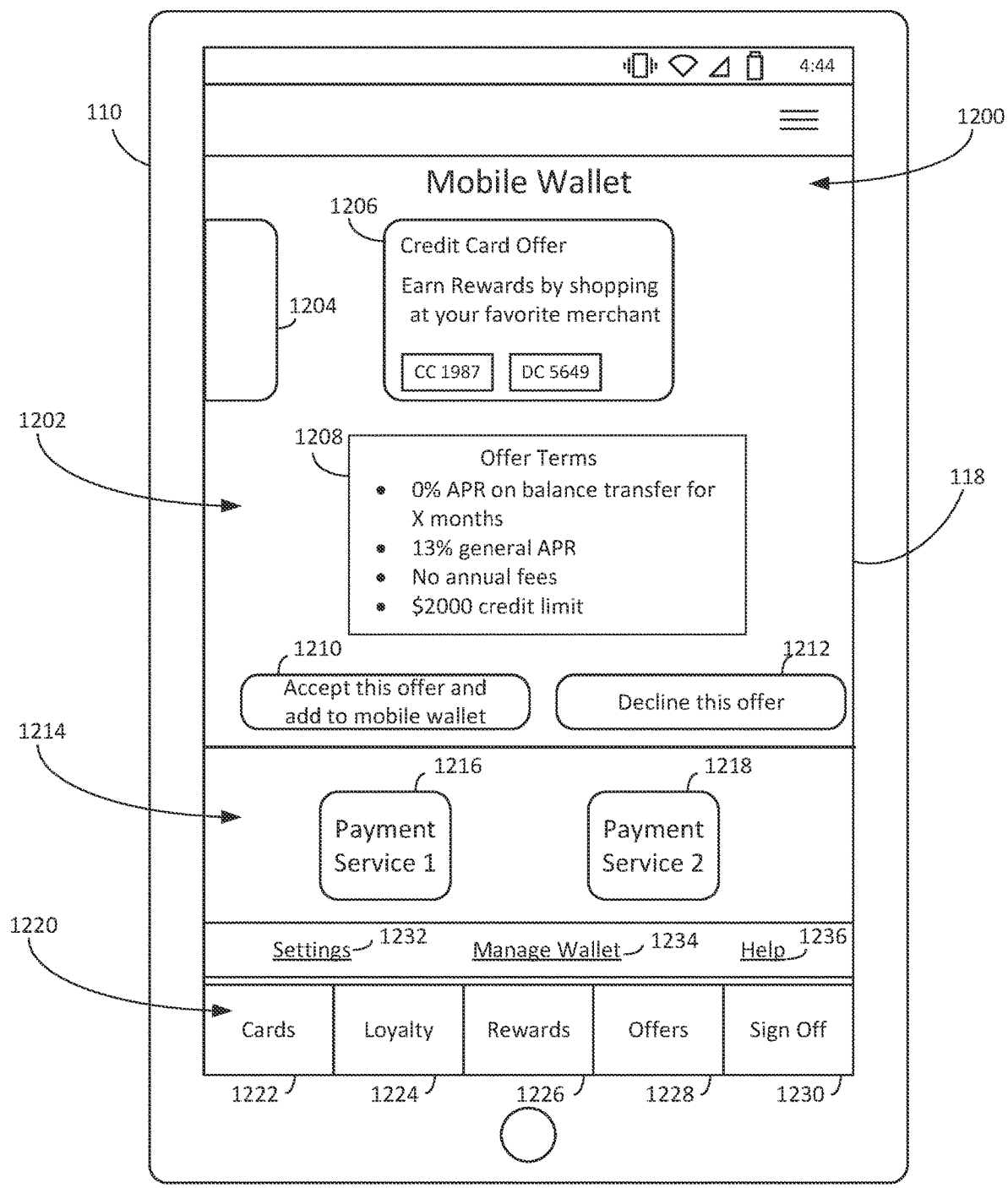
FIG. 12 is an example mobile wallet interface depicting a credit card offer, according to an example embodiment.

Turning now to FIG. 12, an example mobile wallet interface 1200 including a credit card offer displayed by the user mobile device 110 is shown according to an example embodiment. In various arrangements, the interface 1200 is what may be presented to a mobile wallet user after the user receives the push notification discussed above. In some arrangements, the interface may be shown irrespective of whether the user receives a push notification. For example, the interface 1200 may be viewable by the user after the mobile wallet computing system 150 receives the credit card offer terms (e.g., from either the financial institution computing system 130 or a custom credit approval circuit 138 at the mobile wallet computing system 150). For example, the interface 1200 may be viewable after user mobile device 110 receives credit offer information from either the mobile wallet circuit 154 or the financial institution computing system 130.

As shown, the mobile wallet interface 1200 includes a first field 1202, a second field 1214, and a third field 1220. The third field 1220 includes elements 1222-1236 similar to those elements 528-542 discussed above with respect to the interface 500 shown in FIG. 5A. As shown, the first field 1202 includes a payment vehicle depiction 1204, a credit card offer depiction 1206, a terms window 1208, an acceptance button 1210, and a decline button 1212. The payment vehicle depiction 1204 may include a graphical depiction of a payment vehicle that the user has provisioned for use in a mobile wallet. In various arrangements, the user may select the payment vehicle depicted by the payment vehicle depiction 1204 by manipulating (e.g., swiping, pressing, and the like) the first field 1202 as discussed above. The credit card offer depiction 1206 presents the user with a depiction of a credit card being offered to the user. As shown, the credit card offer depiction 1206 includes a description of a characteristic of the credit card particularly selected for the user (e.g., based on the user credit preference identified by the custom credit approval circuit 138 during the method 1000 discussed above with respect to FIG. 10). The terms window 1208 presents the user with the terms associated with the offered credit card. By pressing either the acceptance button 1210 or the decline button 1212, the user can indicate a preference as to whether the user wishes to accept the offered credit card. In response to the user pressing the acceptance button 1210, the user mobile device 110 may transmit an acceptance notification to the mobile wallet computing system 150 or financial institution computing system 130, which may perform steps (e.g., processes 1108 and 1110 discussed above with respect to FIG. 11) to enable the user to perform mobile wallet transactions with the new credit card. In response to the user selecting the decline button 1212, the user mobile device 110 may transmit a denial notification to the mobile wallet computing system 150 or financial institution computing system 130, which may be configured to update the user's mobile wallet account so that the offered credit card is no longer viewable by the user.

As shown, the interface 1200 includes a second field 1214 that includes a depiction of a first payment service 1216 and a depiction of a second payment service 1218. The depictions 1216 and 1218 may be similar to the depictions of the payment services discussed above with respect to FIGS. 5A-5B. In some arrangements, responsive to user selection of either of the depictions 1216 and 1218, the user may be brought to different interfaces informing the user about the services depicted. Even though the credit card has not yet been activated, and is thus unavailable for use with the depicted payment service, the depictions 1216 and 1218 may be services that would be compatible with the offered credit card if accepted by the user. Thus, the interface 1200 presents the users with additional functionalities that may be available to the user via the mobile wallet if the user activates the offered credit card.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A mobile device, comprising:
   a processor; and
   a memory coupled to the processor, the memory having a client application stored thereon, the client application including instructions executable by the processor that cause the processor to:
   receive a user input to access the client application;
   identify a first transaction card and a second transaction card held by a user responsive to receiving the user input, wherein the first transaction card is activated such that the first transaction card is associated with a first token and useable in transactions, and wherein the second transaction card is deactivated such that the second transaction card is unusable in transactions;
   present an interface to the user, the interface including a first depiction of the first transaction card and a second depiction of the second transaction card, wherein the second depiction includes a contrasting aspect relative to the first depiction to indicate that the second transaction card is deactivated; and receive an input to activate the second transaction card thereby (i) tokenizing the second transaction card for transactions and (ii) reducing or removing the contrasting aspect of the second depiction relative to the first depiction to indicate an activation of the second transaction card.

2. The mobile device of claim 1, wherein the contrasting aspect is a color scheme difference between the first depiction and the second depiction.

3. The mobile device of claim 2, wherein the first depiction is presented in color and the second depiction is presented in grayscale.

4. The mobile device of claim 1, wherein the first depiction includes a payment feature configured to transmit the first token to a recipient when the user interacts with the payment feature.

5. The mobile device of claim 1, wherein the second depiction includes a deactivation notification portion.

6. The mobile device of claim 5, wherein the interface includes an account selection portion configured to receive a user selection of either the first depiction or the second depiction, wherein both the first depiction and the second depiction are included in the account selection portion.

7. The mobile device of claim 6, wherein a payment feature of the first depiction is only viewable after the mobile device receives a user selection of the first depiction, wherein the deactivation notification portion of the second depiction is only viewable after the mobile device receives a user selection of the second depiction.

8. The mobile device of claim 5, wherein the instructions further cause the processor to:

receive an indication of a user interaction with an activation feature configured to activate the second transaction card;

transmit a user activation preference to an institution associated with the second transaction card;

receive an activation notification for the second transaction card indicating that a second token is associated with the second transaction card; and update the interface to remove the deactivation notification portion and the activation feature, and add a payment feature to the second depiction configured to transmit the second token to a recipient when the user interacts with the payment feature.

9. A method, comprising receiving, by a mobile device, a user input to activate a client application;

identifying, by the mobile device, a first transaction card and a second transaction card held by a user responsive to receiving the user input, wherein the first transaction card is activated such that the first transaction card is associated with a first token and useable in transactions, and wherein the second transaction card is deactivated such that the second transaction card is unusable in transactions;

presenting, by the mobile device, an interface to the user, the interface including a first depiction of the first transaction card and a second depiction of the second transaction card, wherein the second depiction includes a contrasting aspect relative to the first depiction to indicate that the second transaction card is deactivated; and receiving, by the mobile device, an input to activate the second transaction card thereby (i) tokenizing the second transaction card for transactions and (ii) reducing or removing the contrasting aspect of the second depiction relative to the first depiction to indicate an activation of the second transaction card.

10. The method of claim 9, wherein the contrasting aspect is a color scheme difference between the first depiction and the second depiction.

11. The method of claim 10, wherein the first depiction is presented in color and the second depiction is presented in grayscale.

12. The method of claim 9, wherein the first depiction includes a first payment feature configured to transmit the first token to a recipient when the user interacts with the first payment feature.

13. The method of claim 9, wherein the second depiction includes deactivation notification portion.

14. The method of claim 13, wherein the interface includes an account selection portion configured to receive a user selection of either the first depiction or the second depiction, wherein both the first depiction and the second depiction are included in the account selection portion.

15. The method of claim 14, wherein a payment feature of the first depiction is only viewable after the mobile device receives a user selection of the first depiction, wherein the deactivation notification portion of the second depiction is only viewable after the mobile device receives a user selection of the second depiction.

16. The method of claim 15, further comprising:

receiving, by the mobile device, an indication of a user interaction with an activation feature configured to activate the second transaction card;

transmitting, by the mobile device, a user activation preference to a financial institution associated with the second transaction card;

receiving, by the mobile device, an activation notification for the second transaction card indicating that a second token is associated with the second transaction card; and updating the interface to remove the deactivation notification portion and the activation feature, and add a second payment feature to the second depiction configured to transmit the second token to a recipient when the user interacts with the second payment feature.

17. A computing system, comprising:

one or more processing circuits comprising one or more processors and one or more memory devices, the one or more processing circuits structured to:

receive, via a user device associated with a user, a user input;

identify, responsive to the user input, a first payment account and a second payment account held by the user, wherein the first payment account is activated such that the first payment account is associated with a first token and useable in transactions, and wherein the second payment account is deactivated such that the second payment account is unusable in transactions;

generate, based on the user input, a screen display including a first depiction of the first payment account and a second depiction of the second payment account, wherein the second depiction includes a contrasting aspect relative to the first depiction to indicate that the second payment account is deactivated;

provide, to the user device, the screen display;

receive, via the user device, an input to activate the second payment account;

tokenize, responsive to the input to activate the second payment account, the second payment account for transactions; and update, responsive to the input to activate the second payment account, the screen display to reduce or remove the contrasting aspect of the second depiction relative to the first depiction to indicate an activation of the second payment account.

18. The computing system of claim 17, wherein the second depiction includes a deactivation portion.

19. The computing system of claim 18, wherein the screen display includes an account selection portion configured to receive a user selection of either the first depiction or the second depiction, wherein both the first depiction and the second depiction are included in the account selection portion.

20. The computing system of claim 19, wherein a payment feature of the first depiction is only viewable after the user device receives a user selection of the first depiction, wherein the deactivation portion of the second depiction is only viewable after the user device receives a user selection of the second depiction.

\* \* \* \* \*